United States Patent
Andreou et al.

(10) Patent No.: US 11,295,119 B2
(45) Date of Patent: Apr. 5, 2022

(54) SYSTEMS AND METHOD FOR ACTION RECOGNITION USING MICRO-DOPPLER SIGNATURES AND RECURRENT NEURAL NETWORKS

(71) Applicant: THE JOHNS HOPKINS UNIVERSITY, Baltimore, MD (US)

(72) Inventors: Andreas G. Andreou, Baltimore, MD (US); Kayode Sanni, Pikesville, MD (US); Thomas S. Murray, Odenton, MD (US); Daniel R. Mendat, Baltimore, MD (US); Philippe O. Pouliquen, Baltimore, MD (US)

(73) Assignee: The Johns Hopkins University, Baltimore (MD)

( * ) Notice: Subject to any disclaimer, the term of this patent is extended or adjusted under 35 U.S.C. 154(b) by 267 days.

(21) Appl. No.: 16/626,591

(22) PCT Filed: Jul. 2, 2018

(86) PCT No.: PCT/US2018/040656
§ 371 (c)(1),
(2) Date: Dec. 26, 2019

(87) PCT Pub. No.: WO2019/006473
PCT Pub. Date: Jan. 3, 2019

(65) Prior Publication Data
US 2020/0160046 A1    May 21, 2020

Related U.S. Application Data

(60) Provisional application No. 62/528,022, filed on Jun. 30, 2017.

(51) Int. Cl.
*G06K 9/00* (2006.01)
*G06N 3/04* (2006.01)
(Continued)

(52) U.S. Cl.
CPC ..... *G06K 9/00348* (2013.01); *G06K 9/00053* (2013.01); *G06N 3/0454* (2013.01); *G06N 3/08* (2013.01); *G10L 15/16* (2013.01)

(58) Field of Classification Search
CPC ........... G06K 9/00348; G06K 9/00053; G06N 3/0454; G06N 3/08; G10L 15/16
See application file for complete search history.

(56) References Cited

U.S. PATENT DOCUMENTS

| | | | |
|---|---|---|---|
| 2011/0032139 A1* | 2/2011 | Benitez | G01S 13/56 342/28 |
| 2013/0041856 A1* | 2/2013 | Benitez | G01S 13/867 706/12 |

(Continued)

OTHER PUBLICATIONS

L. Du, L. Li, B. Wang and J. Xiao, "Micro-Doppler Feature Extraction Based on Time-Frequency Spectrogram for Ground Moving Targets Classification With Low-Resolution Radar," in IEEE Sensors Journal, vol. 16, No. 10, pp. 3756-3763, May 15, 2016, doi: 10.1109/JSEN.2016.2538790. (Year: 2016).*

(Continued)

*Primary Examiner* — Fayyaz Alam
(74) *Attorney, Agent, or Firm* — Johns Hopkins Technology Ventures

(57) ABSTRACT

The present disclosure may be embodied as systems and methods for action recognition developed using a multi-modal dataset that incorporates both visual data, which facilitates the accurate tracking of movement, and active acoustic data, which captures the micro-Doppler modulations induced by the motion. The dataset includes twenty-one actions and focuses on examples of orientational symmetry that a single active ultrasound sensor should have the most difficulty discriminating. The combined results from three independent ultrasound sensors are encouraging, and provide a foundation to explore the use of data from multiple viewpoints to resolve the orientational ambiguity in action recognition. In various embodiments, recurrent neural networks using long short-term memory (LSTM) or hidden Markov models (HMMs) are disclosed for use in action recognition, for example, human action recognition, from micro-Doppler signatures.

17 Claims, 41 Drawing Sheets

(51) Int. Cl.
*G06N 3/08* (2006.01)
*G10L 15/16* (2006.01)

(56) References Cited

U.S. PATENT DOCUMENTS

| | | |
|---|---|---|
| 2015/0359467 A1* | 12/2015 | Tran ................. A61B 5/1113 600/301 |
| 2016/0180195 A1 | 6/2016 | Martinson et al. |
| 2017/0052596 A1 | 2/2017 | Li |
| 2017/0173262 A1 | 6/2017 | Veltz |
| 2018/0106897 A1* | 4/2018 | Shouldice ............ A61B 5/0507 |
| 2018/0268844 A1* | 9/2018 | Whalen ............... G10L 21/0388 |
| 2018/0289313 A1* | 10/2018 | Inan ................. A61B 5/0537 |

OTHER PUBLICATIONS

F. H. C. Tivive, A. Bouzerdoum and M. G. Amin, "Automatic human motion classification from Doppler spectrograms," 2010 2nd International Workshop on Cognitive Information Processing, 2010, pp. 237-242, doi: 10.1109/CIP.2010.5604253. (Year: 2010).*

M. O. Padar, A. E. Ertan and Ç. ĝ. Candan, "Classification of human motion using radar micro-Doppler signatures with hidden Markov models," 2016 IEEE Radar Conference (RadarConf), 2016, pp. 1-6, doi: 10.1109/RADAR.2016.7485201. (Year: 2016).*

* cited by examiner

SYSTEMS AND METHOD FOR ACTION RECOGNITION USING MICRO-DOPPLER SIGNATURES AND RECURRENT NEURAL NETWORKS

CROSS-REFERENCE TO RELATED APPLICATIONS

This application is a 35 U.S.C. § 371 U.S. national entry of International Application PCT/US2018/040656, having an international filing date of Jul. 2, 2018, which claims the benefit of U.S. Provisional Application No. 62/528,022, filed Jun. 30, 2017, the content of each of the aforementioned applications is herein incorporated by reference in their entirety.

STATEMENT REGARDING FEDERALLY SPONSORED RESEARCH

This invention was made with government support under contract no. N000141010278 awarded by the Office of Naval Research, contract no. SMA 1248056 awarded by the National Science Foundation, and contract no. SCH-INT 1344772 awarded by the National Science Foundation. The government has certain rights in the invention.

FIELD OF THE DISCLOSURE

The present disclosure relates to systems and methods for action recognition.

BACKGROUND OF THE DISCLOSURE

Actions, for example, human actions, range from simple motions, such as a hand wave, to complex sequences composed of many intermediate actions, such as figure skating. Every day, each of us performs many actions, even creating new actions to accomplish a novel task. Moreover, we are able to recognize and interact with other people because we can interpret their actions. Our brains enable all of this functionality, and they are unparalleled in their ability to process the world around us. Actions occur in three dimensions. As such, the perceived characteristics of these actions are affected by an observer's relative orientation and scale. Context also matters, as actions are highly variable based on the properties of the object performing the action as well as any objects that may be the target of the action. For example, chopping a soft vegetable like a tomato requires significantly less force than chopping a carrot.

In the field of computer vision, the engineering of systems for human activity recognition has seen a dramatic growth over the last decade. Fueled by application needs in web-video search and retrieval, surveillance, health and wellness, human computer interfaces, and computer gaming, as well as advances in sensor technology, computing, and algorithm development has resulted in impressive system performance in focused application domains. Progress in the field was advanced with the development of standard databases in specific domains such as KTH (staged human actions in video), UCF101 (human actions from videos in the wild), HMDB51 (human motion recognition from video), and VIRAT (activity recognition in surveillance video). Open research community challenges and competitions such as LIRIS/ICPR2012 and THUMOS have also helped to fuel advancement.

Actions occur in three-dimensional space and evolve over time. Most modern action recognition systems are based on visual data. Single RGB images capture a two-dimensional projection of the spatial arrangement of the human body in a scene. RGB video sequences capture the temporal evolution of those two-dimensional projections. Even more complete information can be gathered using RGB-Depth (RGB-D) videos that can provide the temporal evolution of a human body in three dimensions. Most of the state of the art systems are based on "bag-of-features" local image descriptors derived from 2D images or 2D video volumes used in conjunction with a classifier, often a support vector machine. The latter approaches, which employ low-level features/representations, are simple and yield good results, but have a drawback in that they do not include prior knowledge about the spatial-temporal structure of the human body. Additionally, the visual/action words are not necessarily discriminative in the human action space. Thus, current research in the field is moving towards more structured approaches using mid-level representations that can capture the complexity of real world applications. It is worth noting that the now-popular deep network structures can be viewed as creating discriminant mid-level representations. Of particular interest are techniques for action recognition that do not employ cameras (e.g., for privacy concerns).

BRIEF SUMMARY OF THE DISCLOSURE

The present disclosure may be embodied as systems and methods for action recognition developed using a multi-modal dataset that incorporates both visual data, which facilitates the accurate tracking of movement, and active acoustic data, which captures the micro-Doppler modulations induced by the motion. The dataset includes twenty-one actions and focuses on examples of orientational symmetry that a single active ultrasound sensor should have the most difficulty discriminating. The combined results from three independent ultrasound sensors are encouraging, and provide a foundation to explore the use of data from multiple viewpoints to resolve the orientational ambiguity in action recognition.

In some embodiments, long short-term memory (LSTM) recurrent neural networks are disclosed for use in action recognition, for example, human action recognition, from micro-Doppler signatures. The recurrent neural network model was evaluated using the Johns Hopkins MultiModal Action (JHUMMA) dataset. In testing some embodiments, only the active acoustic micro-Doppler signatures were used. Classification performance was compared using hidden Markov model (HMM) systems trained on both micro-Doppler sensor and Kinect data with LSTM classification trained only on the micro-Doppler signatures. For HMM systems the performance of product of expert based systems and systems trained on concatenated sensor data was evaluated. By testing with leave one user out (LOUO) cross-validation, the ability of these systems to generalize to new users was verified.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
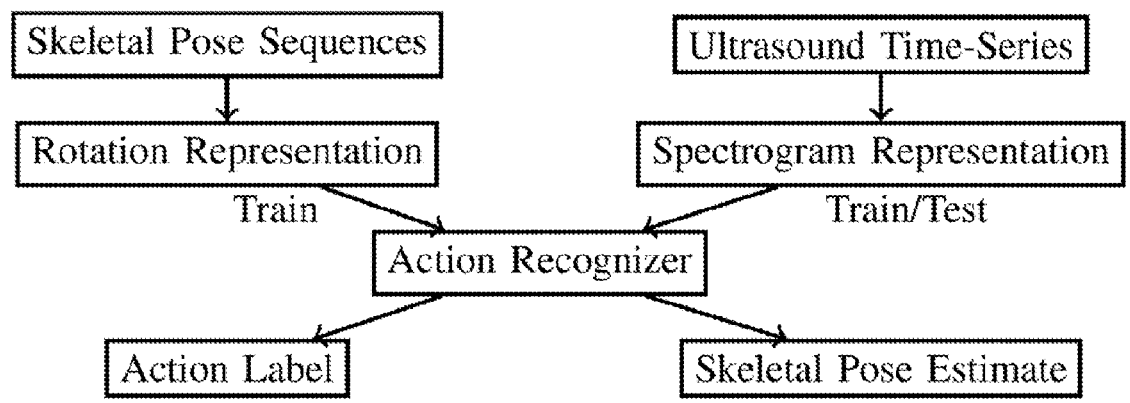
FIG. 1: Schematic of the proposed data flow in the action recognizer.
Figure 2:
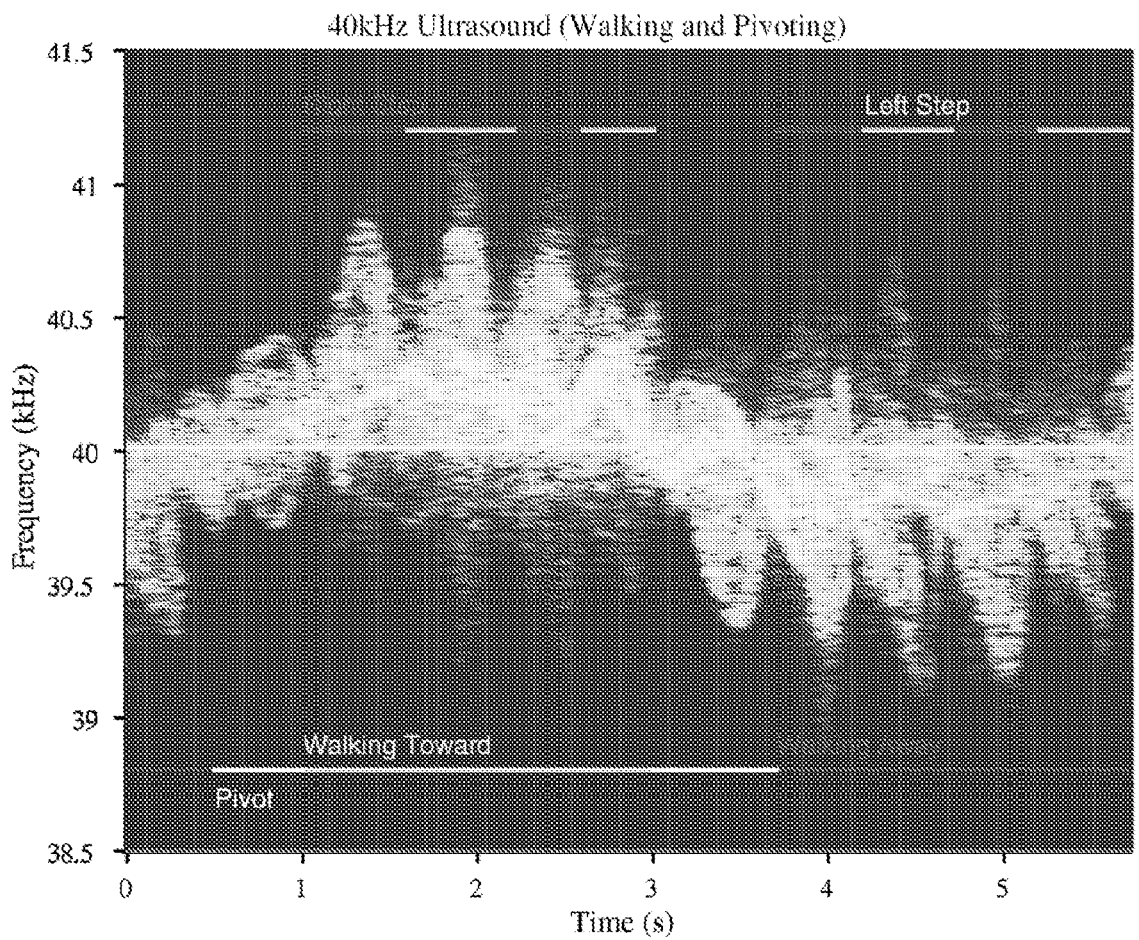
FIG. 2: Annotated spectrogram representation of Doppler modulations for a human walking toward an ultrasound sensor, pivoting, and walking back away from it.

In a first aspect, we present methods to address the problem of doing inference from data in multiple modalities where there exists large amounts of low-dimensional data complementary to a much smaller set of high-dimensional data. In this instance, the low-dimensional time-series data are active acoustics from a micro-Doppler sonar sensor system that include no or very limited spatial information, and the high-dimensional data are RGB-Depth data from a 3D point cloud sensor. The task is action recognition from the micro-Doppler data. To accomplish this, statistical models, trained simultaneously on both the micro-Doppler modulations induced by actions (e.g., human actions) and symbolic representations of skeletal poses, derived from the 3D point cloud data, are developed. This simultaneous training enables the model to learn relations between the rich temporal structure of the micro-Doppler modulations and the high-dimensional pose sequences of human action. During runtime, embodiments of the model may rely purely on the active acoustic sonar data to infer the human action.

In another aspect of this disclosure, recurrent neural networks, and specifically the long short-term memory (LSTM) model, are used for action recognition using micro-Doppler signatures. The LSTM classifiers used in the present disclosure outperform hidden Markov model (HMM)-based classifiers by substantial margins. Furthermore, the LSTM classifiers are trained without using the Kinect data required in the HMM models. In addition, we have found that a single classifier using a concatenation of data from each sensor can outperform a product of experts-based model.

The presently-disclosed techniques are described with reference to ultrasound sensors solely for clarity, and the techniques are applicable to other sensing modalities such as, for example, millimeter wave electromagnetic radar devices. The use of such other sensing modalities are within the scope of the present disclosure.

The Doppler and Micro-Doppler Effects

In 1842, Christian Doppler postulated that the frequency of waves emanating from a moving object relative to a stationary or moving observer would appear to be shifted, a principle later named the Doppler effect. While Doppler originally envisioned this principle being applied to electromagnetic waves (light), the first experimental observation of this phenomenon was done with acoustic waves. If the object itself contains moving parts, each part contributes its own Doppler shift proportional to the object's radial velocity component with respect to the receiver. All of the scattered waves are additive, and the resulting modulation is a superposition of the individual components known as the micro-Doppler effect.

Assuming that there are N moving point masses in a scene where a pure tone with frequency $f_c$ is transmitted, then the scattered signal seen by the receiver is $$s_{receiver}(t) = \sum_{i=1}^{N} A_i(t) \cdot \sin(2\pi f_c t + \phi_i(t)). \quad (1)$$

Each point mass scatters the pure tone and modulates the frequency by $$f_i = 2 \frac{v_i}{c_s} f_c,$$

where $v_i$ is the radial component of the velocity and $c_s$ is the speed of sound. The amplitude of each component, $A_i$, depends on the scattering surface and the range of the point scatterer. There is also a phase shift $\phi_i(t)$ that depends on the range of the point mass. For ultrasound systems, the scattered wavelengths are typically on the order of 10 mm, which allows relatively fine-grained objects on the order of a couple millimeters to scatter the sound and produce modulations. Unfortunately, the short wavelength also means that the phase shift is not useful for extracting range information because it aliases after traveling a single wavelength. In comparison, micro-wave systems transmit wavelengths that are in the range of several centimeters. This means that acoustic systems are capable of resolving motion from smaller objects.

The frequency spectrum of acoustic or electromagnetic waves scattered from a walking person is a complex time-frequency representation of human gait. In the case of a walking person, the torso, each arm section, and each leg section are all moving, and these individual movements each span a continuous range of velocities ranging from the slowest part (typically the proximal end) to the fastest (usually the distal end). The Doppler signature for such a complex object has infinite time-dependent frequency-shifted components corresponding to the velocity ranges of the torso and individual limbs as a function of time. The time-domain micro-Doppler signal exhibits a complex structure that evolves in time. Therefore, a time-frequency spectrogram representation, having a sequence of windowed spectral representations, namely the short-time Fourier transform (STFT), is more convenient for analyzing the changing spectrum of micro-Doppler signatures over time.

The electromagnetic micro-Doppler effect has been exploited in radar applications and in gait recognition experiments. The analysis of electromagnetic signatures from humans in forest environments was recently reported. The simplicity and cost-effectiveness of the sonar system in conjunction with its advantage in spatial resolution, which is millimeter for sound waves compared to centimeter for electromagnetic waves, has led to the exploration of its use in different applications ranging from human identification and gender recognition, speaker identification, gesture recognition, transport mode, and activity and behavior classification. However, most previous efforts to use sonar micro-Doppler were essentially pilot studies. This is partly because there have been no datasets comparable to the standard datasets in the vision community, which facilitate algorithm exploration in a systematic way.

Figure 40:
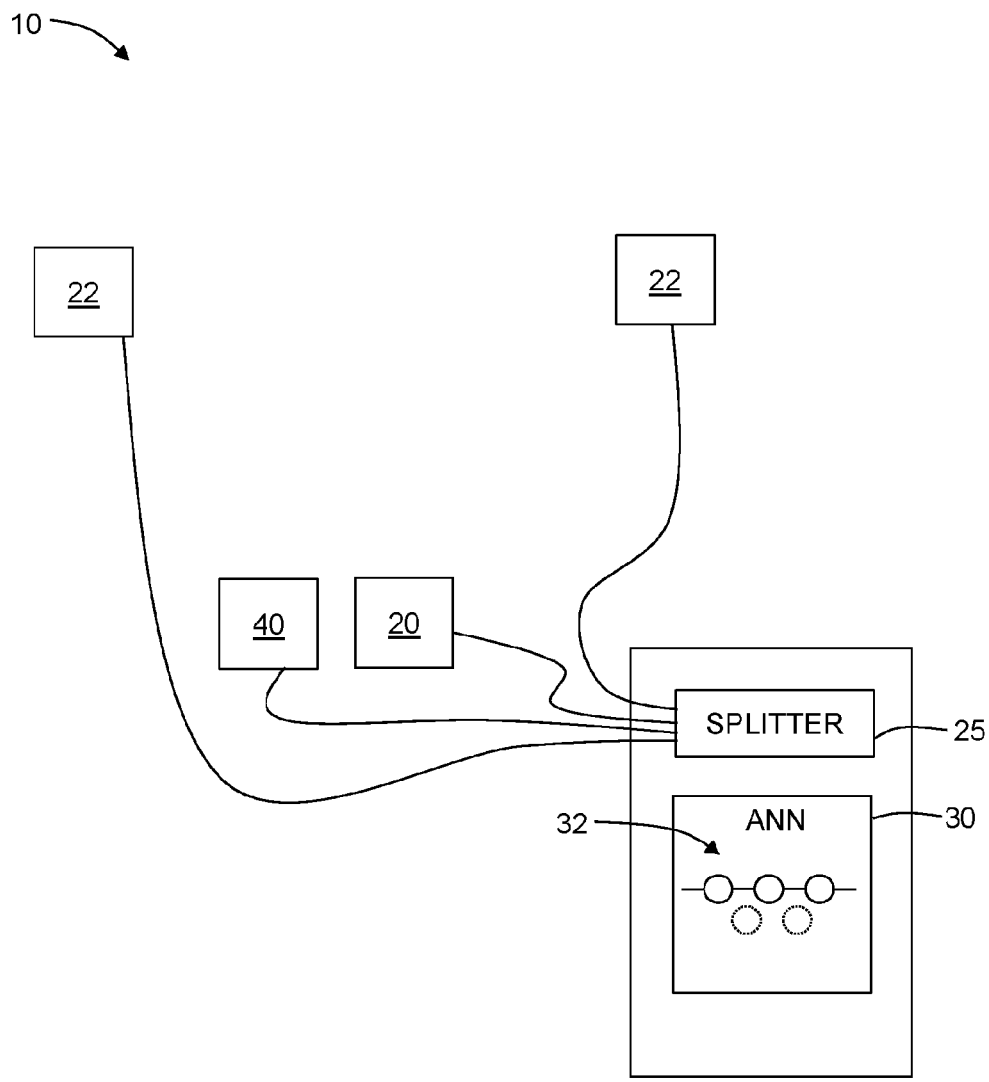
FIG. 40 is a diagram of a system according to an embodiment of the present disclosure.

The present disclosure may be embodied as a system 10 for action recognition of sensed motion (see, e.g., FIG. 40). A first micro-Doppler sensor 20 is configured to produce a sprectrogram of a sensed motion. The first micro-Doppler sensor 20 may be, for example, an ultrasound sensor. A splitter 25 is configured to receive a spectrogram from the first micro-Doppler sensor 20 and segment the spectrogram into a sequence of spectrogram slices. In this way, the sequence of spectrogram slices will comprise a plurality of time-based slices, each having a finite duration. The duration of each slice may be pre-determined (e.g., the splitter 25 being configured to segment into slices of pre-determined duration).

The system 10 further comprises an artificial neural network (ANN) 30 having a recognition layer 32 configured to receive a sequence of spectrogram slices from the splitter 25 as an input vector. The ANN 30 classifies sensed motion represented by the spectrogram slices into a recognized action. In some embodiments, the ANN 30 is a recurrent neural network (as further described in the exemplary embodiment sections below).

In some embodiments, the ANN 30 is a recurrent neural network wherein the recognition layer 32 comprises a plurality of hidden Markov models (HMMs). Each HMM of the plurality of HMMs corresponds to a hidden sequence of skeletal poses and a visible sequence of spectrogram slice prototypes. In this way, each combination of skeletal pose sequence (e.g., of a known dictionary of skeletal poses) and spectrogram slice sequence (e.g., of a known alphabet of slices) has a corresponding HMM. The ANN may further comprise a Viterbi module configured to receive a plurality of spectrogram slice prototypes and to find a most likely sequence of skeletal pose prototypes.

In another embodiment, the ANN is a recurrent neural network where the recognition layer comprises one or more long short-term memory (LSTM) layers. Each LSTM layer may comprise a plurality of hidden nodes. For example, an LSTM layer may comprise 800-1,200 hidden nodes. In some embodiments, an LSTM may have fewer than 800 hidden nodes. In other embodiments, an LSTM may have more than 1,200 hidden layers. In a particular embodiment, a recognition layer comprises one LSTM layer having 1,200 hidden nodes. In another particular embodiment, a recognition layer comprises two LSTM layers, each having 800 hidden nodes. Other embodiments (having more or less layers and/or more or less hidden nodes) may be used. In another embodiment, an ANN of a system according to the present disclosure is a convolutional deep-belief network.

In some embodiments, the system 10 includes one or more additional micro-Doppler sensors 22. Each additional micro-Doppler sensor 22 is configured to produce a spectrogram of the sensed motion. For example, each additional micro-Doppler sensor 22 may be configured to sense the motion from a position which differs from a position of the first micro-Doppler sensor 20. In such embodiments, the splitter may be further configured to receive a spectrogram from each of the micro-Doppler sensors 20, 22, segment each spectrogram into a sequence of spectrogram slices, and concatenate the sequences of spectrogram slices as an input vector for the recognition layer. In an alternative configuration, the system 10 may have multiple splitters, each corresponding to a micro-Doppler sensor. The multiple splitters may segment the respective spectrograms from the corresponding micro-Doppler sensor. Such an embodiment may include a recognition layer 32 configured to receive each input vector. For example, the recognition layer may comprise a set of HMMs for each input vector, where each set of HMMs corresponds to a hidden sequence of skeletal poses and a visible sequence of spectrogram slice prototypes.

In some embodiments, the system 10 comprises a motion sensor 40 configured to produce RGB-D data of a sensed motion. The motion sensor 40 may be, for example, a Microsoft Kinect sensor or any other suitable sensor. In such an embodiment, the input vector may further comprise RGB-D data from the motion sensor. Alternatively, the RGB-D data may be provide to a recognition layer separate from the input vector. In some embodiments, the recognition layer is configured to receive RGB-D data from a motion sensor and regard the skeletal poses represented by the RGB-D data as latent states.

Figure 41:
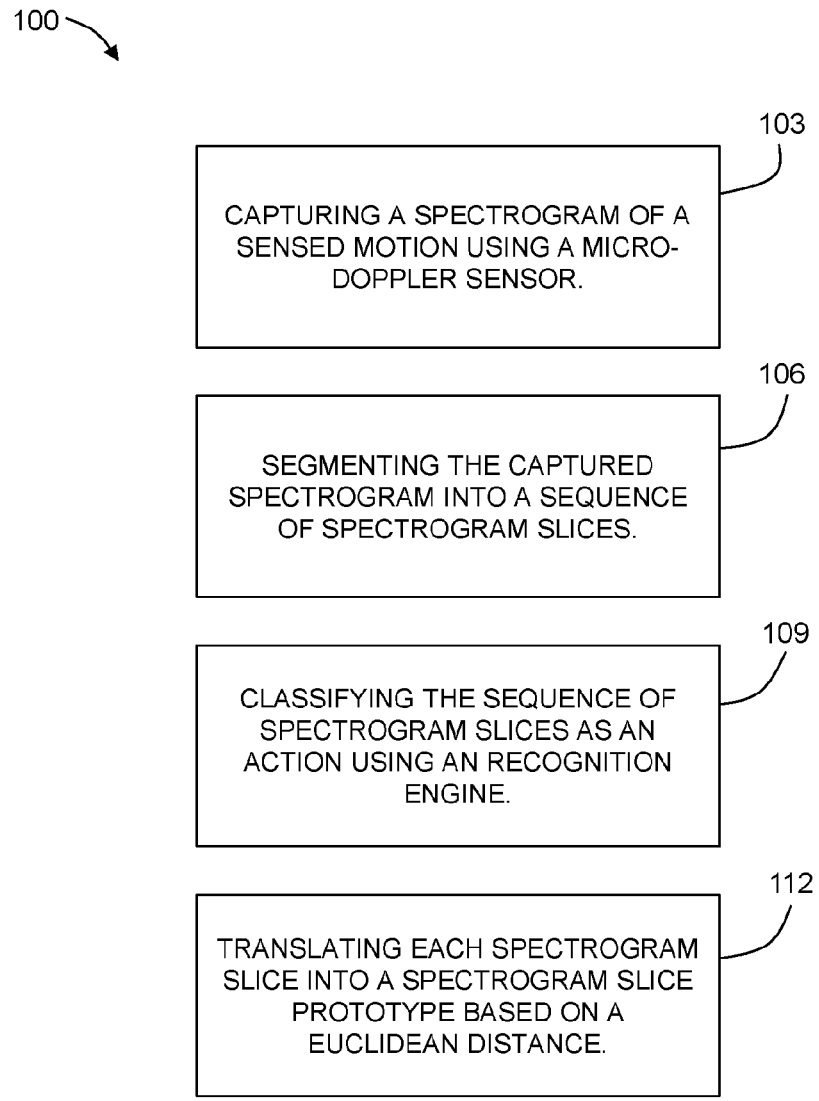
FIG. 41 is a chart depicting a method according to another embodiment of the present disclosure.

In another aspect, the present disclosure may be embodied as a method 100 for action recognition of sensed motion (see, e.g., FIG. 41). The method 100 comprises capturing 103 a spectrogram of a sensed motion using a micro-Doppler sensor. The captured 103 spectrogram is segmented 106 into a sequence of spectrogram slices. Each spectrogram slice may have a pre-determined time period (duration). The sequence of spectrogram slices is classified 109 as an action by way of an ANN having a recognition layer. The recognition layer is configured to receive the sequence of spectrogram slices as an input vector. The method 100 may further include translating 112 each spectrogram slice of the sequence of spectrogram slices into a spectrogram slice prototype based on the Euclidean distance between each spectrogram slice and each spectrogram slice prototype.

In some embodiments, the recognition layer comprises plurality of HMMs, each HMM corresponding to a hidden sequence of skeletal poses and a visible sequence of spectrogram slice prototypes. The step of classifying 109 the sequence of spectrogram slices may further comprise computing, using each HMM, a most likely sequence of hidden skeletal poses. A log-likelihood may be computed for each of the most likely sequences of hidden sequence of skeletal poses and the visible sequence of spectrogram slice prototypes, and an action may be selected based on the computed log-likelihoods. In some embodiments, a Viterbi algorithm is used to compute a maximum a posteriori (MAP) estimate.

The disclosure is illustrated and further described in the following sections each discussing one or more exemplary embodiments. The exemplary embodiments are intended to be illustrative and not limiting in any way.

Hidden Markov Models Exemplary Embodiment

The present embodiment provides an approach to action recognition (depicted in FIG. 1) that builds on a hidden Markov model (HMM) framework. Statistical models, trained simultaneously on both the micro-Doppler modulations induced by human actions and symbolic representations of skeletal poses, are developed. This enables the model to learn relations between the low-dimensional, but rich, temporal structure of the micro-Doppler modulations and the high-dimensional pose sequences of human action from 3D video. During runtime, the model may then rely purely on the active acoustic data to infer the human action. This approach utilizes a simple graphical model to capture the temporal sequences of skeletal poses and acoustic modulations and allows for the use of efficient inference algorithms.

Action Recognition Using the Micro-Doppler Effect

Figure 3:
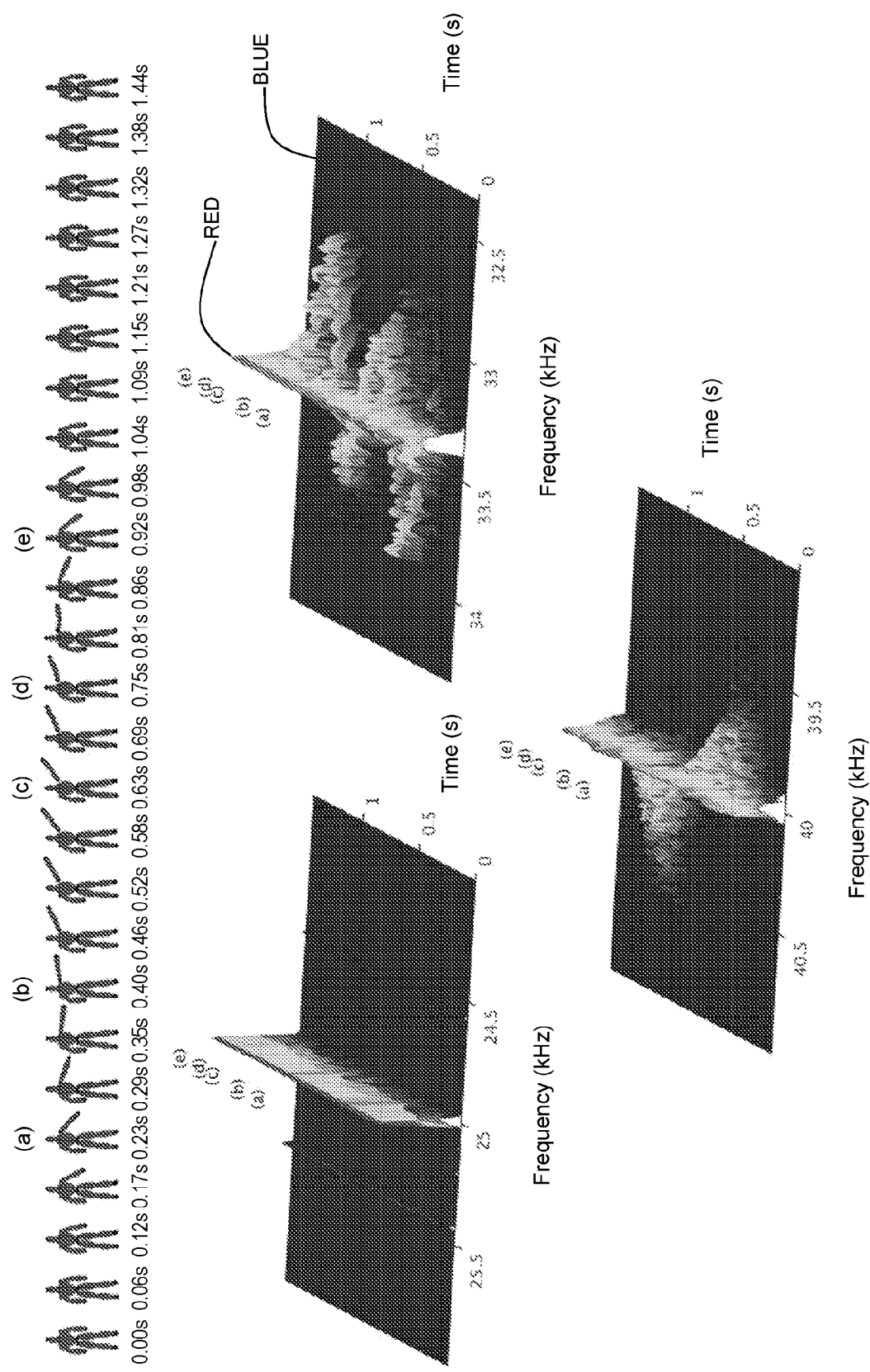
FIG. 3: Time evolution of action "Left-hand raise side" and its representation in the continuous modulation spectra of the three micro-Doppler units. The absence of significant modulations in the 25 kHz sensor (left spectrogram) is due to occlusion from the body.

While the Doppler effect is very specific to sensing motion, there are still many challenges associated with exploiting it to sense and identify actions. At a fundamental level, real actions are sequences of motion that evolve in time and three-dimensional space. However, the micro-Doppler modulations recorded by a single active sonar sensor are one-dimensional time-series. The modulations of a pure tone used to sense a complex moving scene do not capture much in the way of range or spatial information. Over a given time window, the frequency modulations provide a histogram of the velocities present in the scene. Fortunately, due to the physical limitations of most multi-component objects, such as the human body, the realizable set of actions is heavily constrained. In the case of a human, the scattering components are linked, rigid bodies, which constrain the space of human action and induce distinctive temporal structure in the modulations across a sequence of consecutive windows. This is a much more structured situation than the arbitrary sum of point masses expressed in Equation (1). FIG. 3 demonstrates the structured acoustic modulations induced by hand raises, recorded by ultrasound units placed around the person.

Another challenge is that many moving objects have symmetry in their motion. For example, a pendulum may swing from side to side and a human body may move its right or left arm. Distinguishing between these actions can be very challenging for a single sonar sensor, located at the line of symmetry, due to paucity of spatial information in the micro-Doppler modulations. One way to overcome this limitation is to use multiple sensor units arranged so that no single line of symmetry is common to all the sensors. In this section, we describe a new dataset of active acoustic and RGB-D recordings of human actions. The data was collected with a data acquisition system designed to integrate multiple acoustic sensors with very accurate temporal resolution. Leveraging this system allows for synchronized data collection with multiple sonar units that will help alleviate ambiguities due to spatial symmetry.

Although the space of possible human motions is quite large, there are a lot of constraints placed on actions by the physical limitations and structure of the human body. In theory, a model that captures the precise physical constraints of human joints and dimensions could be used to bias the decisions of an action recognizer that operates on impoverished acoustic signals. This approach leverages prior knowledge about the task and models the physics of the environment.

Additionally, the physics behind the Doppler effect are well understood. By incorporating prior knowledge about the interactions between the sensor and the environment, models can be developed that account for the interaction between the environment and the acoustics to extract as much information as possible from the data recorded by a given sensor. Models can also take advantage of the geometry of the sensor array in the environment to combine information from multiple sensors.

The Johns Hopkins University multimodal action (JHUMMA) dataset was used with experimental embodiments. Three ultrasound sensors and a Kinect RGB-D sensor were used to record joint multimodal data of ten unique actors performing a set of actions. The dataset was created in an auditorium because it is a large open space and there are curtains on the stage where the data was collected. These features both reduce the number and strength of uninteresting reflections of the ultrasound carriers off static objects.

Figure 4:
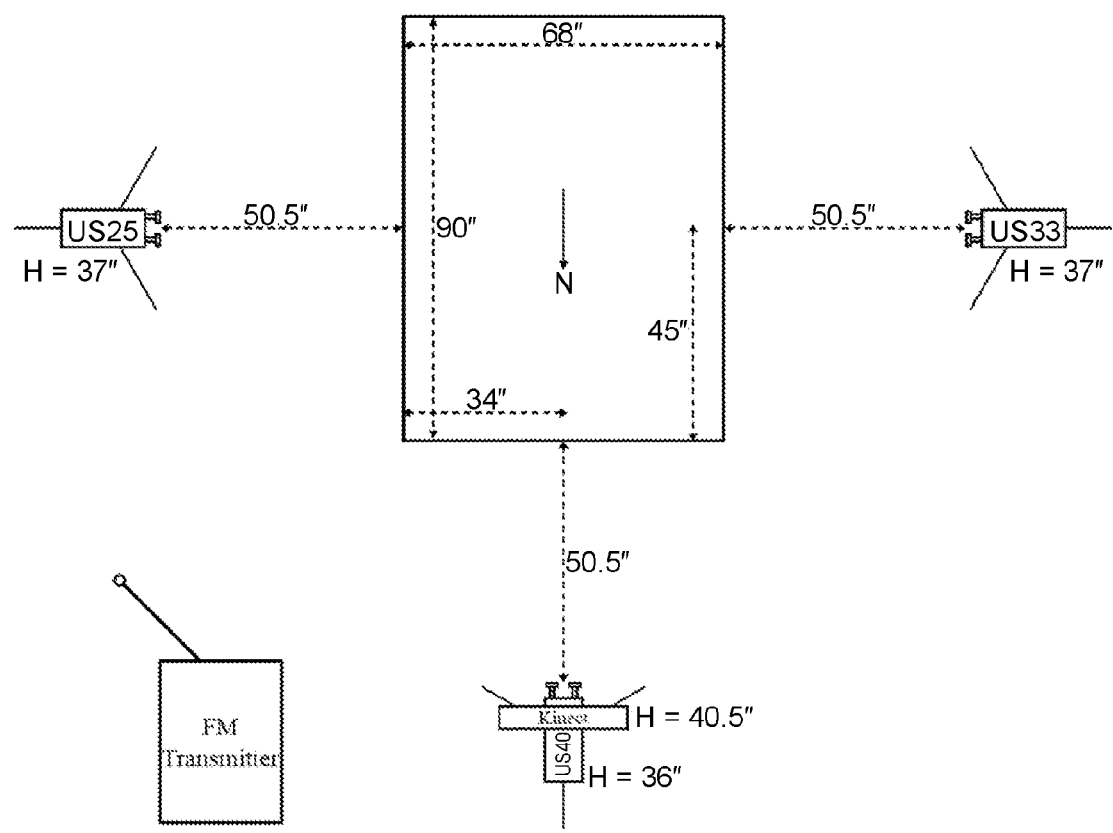
FIG. 4: Experimental setup for the JHUMMA data collection.

FIG. 4 illustrates the configuration of the various sensors used for the data collection. The bounding box, which corresponds to the area where the Kinect sensor reliably tracks a human, was marked on the auditorium stage to guide the actors. All actions were confined to this space and the orientation of the actions and sensors is referenced to a virtual "North", which was defined as the orientation of an actor facing the Kinect sensor. The Kinect sensor was placed directly on top of a 40 kHz ultrasound sensor (US40). A 25 kHz ultrasound sensor (US25) was placed to the east and a 33 kHz ultrasound sensor (US33) was placed to the west.

Figure 5A:
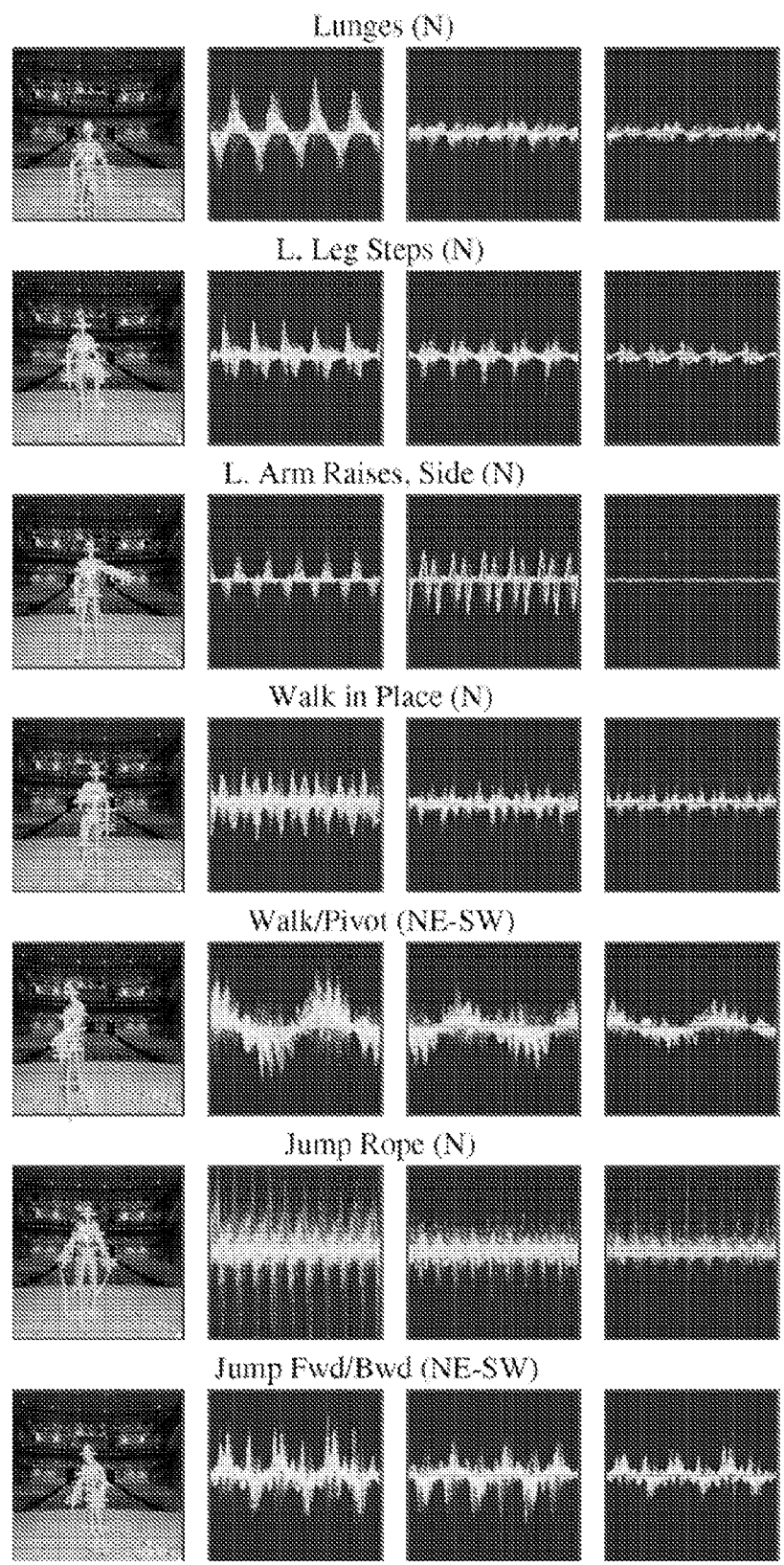
FIGS. 5A-5C: Examples of the twenty-one actions contained in the JHUMMA dataset. An RGB color image, along with the 2D skeleton tracked by the Kinect sensor, as well as the acoustic modulations from each of the three ultrasound sensors, is shown for each action. The spectrogram in the second image of each row was generated from ultrasound data recorded by the 40 kHz sensor, the spectrogram in the third image was generated from ultrasound data recorded by the 33 kHz sensor, and the spectrogram in the fourth image was generated from ultrasound data recorded by the 25 kHz sensor. The time window used to select the ultrasound data for each actions is the same for each sensor and the Kinect frames are all from within these windows. The window duration is fixed at just under nine seconds for each action. The displayed frequency content has a bandwidth of 2 kHz centered on the respective carrier frequency of each ultrasound unit. The time and frequency markings are omitted for clarity.
Figure 5B:
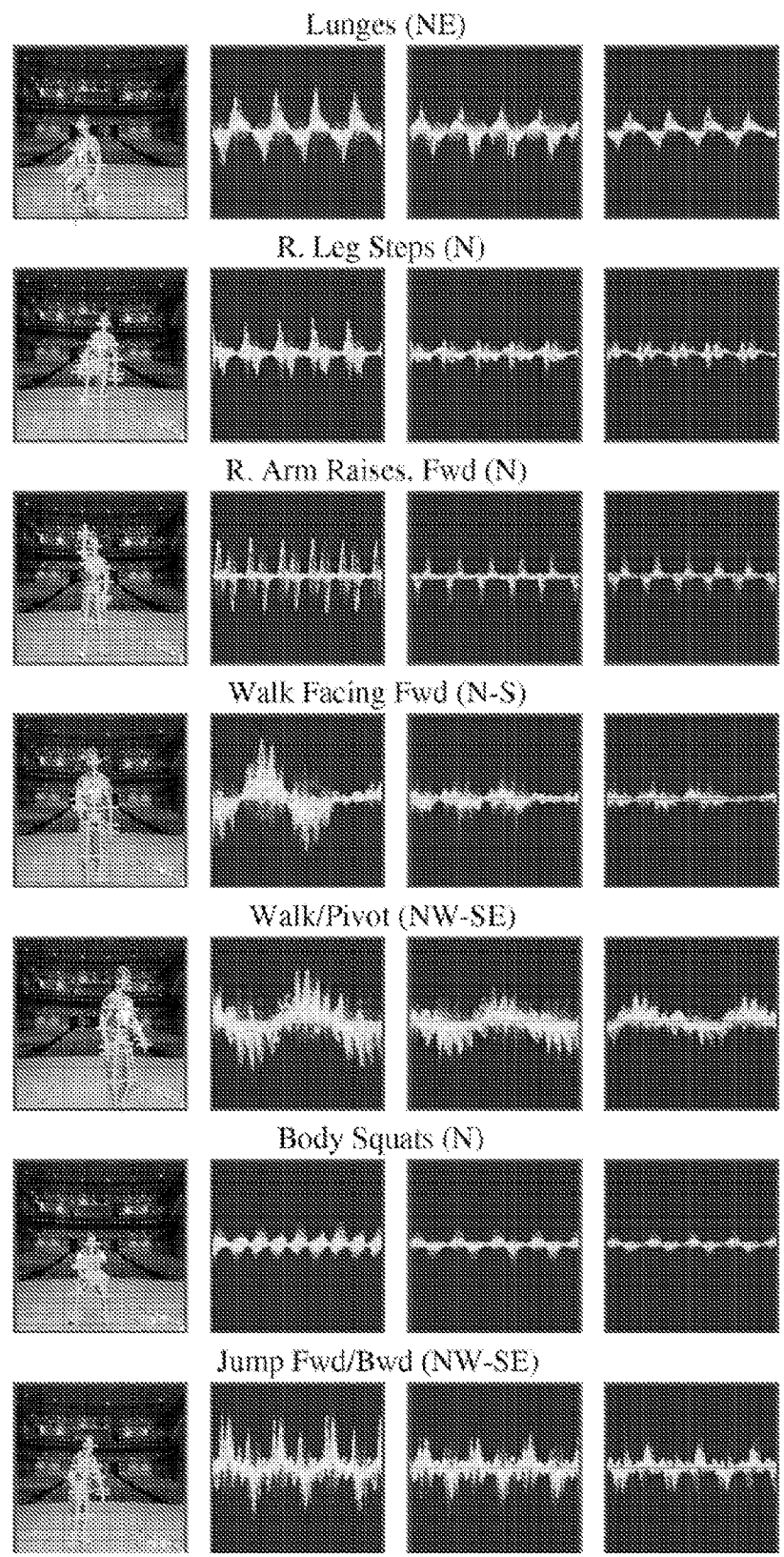
Figure 5C:
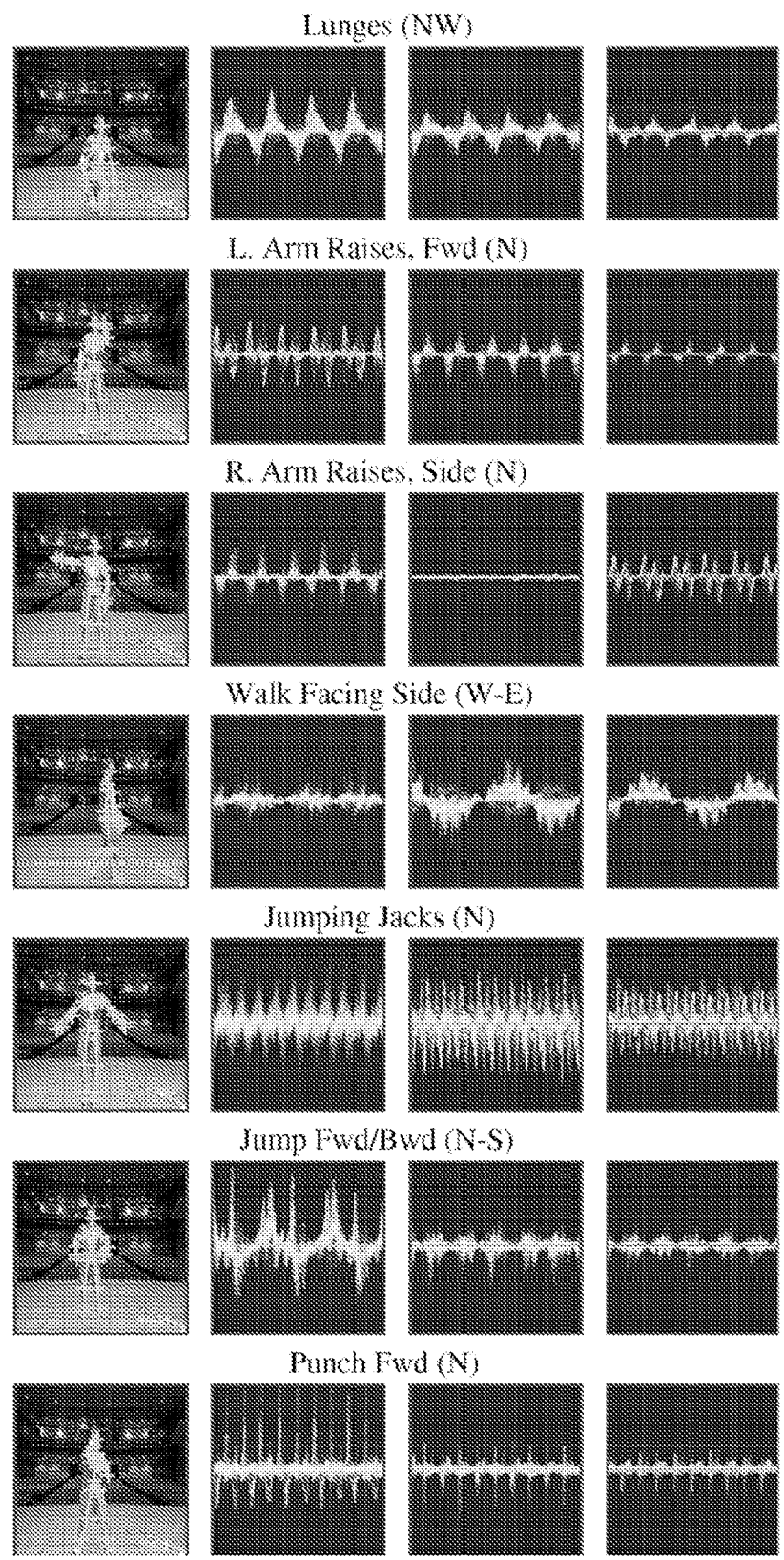

FIG. 5 shows snapshots of the data recorded in the JHUMMA dataset during a single trial of each action. The first image associated with each action was captured by the Kinect sensor's color imager and the two-dimensional skeleton track has been superimposed on top of the image. The skeletal poses used in this work are based off of 3D skeletons extracted from the RGB-D video on a frame by frame basis. The other three images associated with each action show time-frequency spectrogram representations of the acoustic data. The FFT window is set to 214 samples, which corresponds to just over 0.1638 seconds. However, there is an 80% overlap between successive FFT windows, so the time window advances by approximately 0.0328 seconds between consecutive spectrogram slices. The spectrogram slices have also been limited to a bandwidth of 2 kHz centered on the carrier frequency of the respective ultrasound sensor.

For human action recognition applications, it may be desirable to develop systems capable of recognizing a particular action regardless of where it occurs in the global coordinate system. When training these systems it is advantageous to consider the hip-center as the origin for the skeleton at each frame. By referencing all other joints in a given frame to the position of the hip-center, the skeletal pose can be captured independently from the skeleton's global position. This skeletal pose representation provides translation invariance in the global coordinate system, which can greatly simplify the problem of recognizing a particular pose regardless of where a human is relative to the Kinect sensor. Storing the global position of the hip-center maintains all the necessary information to reconstruct the recorded scene exactly.

Furthermore, it is advantageous for a human action recognition algorithm to be trained on skeletal poses collected from multiple subjects. One problem with the Cartesian coordinates produced by the Kinect is the dependence on the height and limb lengths of an individual person. A very tall person and a very short person can perform the same action and generate very different Cartesian joint coordinates even once the pose is adjusted to account for translation of the hip-center. However, the angle of the limbs as two people perform the same action is often much more consistent, even when their limbs are different lengths.

Figure 6:
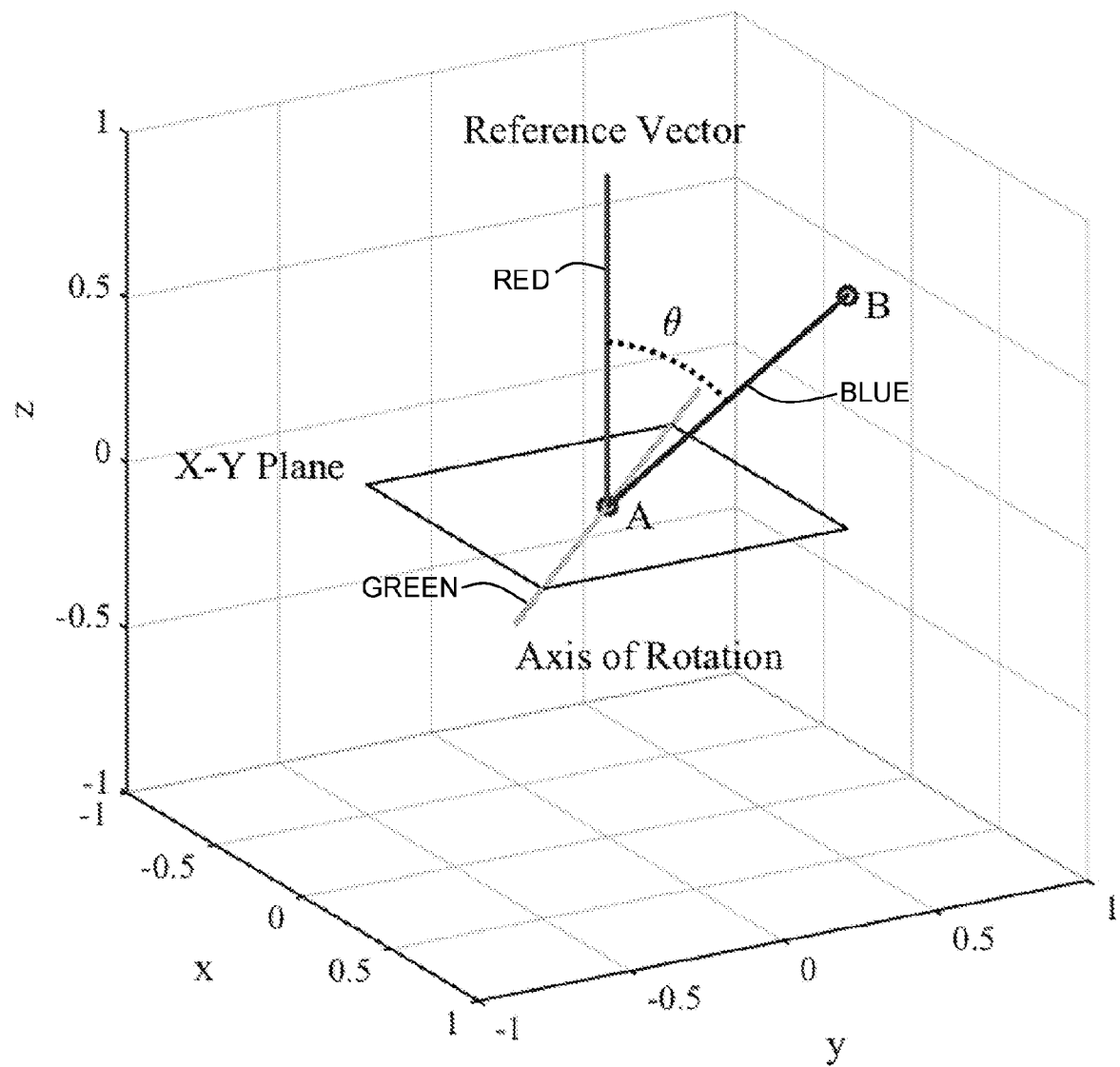
FIG. 6: Components of the rotation representation for a single limb.

To leverage this invariance, a skeleton can be represented using the rotation of individual limbs instead of the Cartesian coordinates of their constituent joints. The rotation representation may be composed of two objects—an axis of rotation and an angle of rotation, θ. FIG. 6 illustrates these components for a single limb. Each limb (blue line) is defined by two points, referred to as joint A and joint B. By convention, joint A is closer to the hip-center on the skeletal connection tree. The positive z-axis is used as a reference vector (red vector). The axis of rotation is the vector around which the limb must be rotated to match the reference. Due to the choice of reference, this axis is always constrained to the x-y plane.

Action Recognition Model

Assuming that an appropriate dictionary of skeletal poses, $\mathcal{H}$, exists, the sequence of skeletal motion that results in human action can be approximated by $H = h_0, \ldots, h_T$, where $h_T \in \mathcal{H}$. If we are also given an appropriate acoustic alphabet, $V$, of acoustic spectrogram slices, then a spectrogram can then be described as $V = v_0, \ldots, v_T$, where $v_T \in V$. The methodology for generating the dictionary of skeletal poses and alphabet of acoustic modulations is developed below under the headings "Skeletal Pose State Space Model" (Section E) and "Doppler Modulation Observation Model" (Section F). A set of action class labels, $\mathcal{C}$ enumerates the twenty-one actions in the JHUMMA dataset. Each sequence $H$ is generated by an action, $a \in \mathcal{C}$, that modifies the parameters of the probability distributions accordingly.

The goal of the action recognizer is to estimate the most likely action that produced the visible sequence $V$ of spectrogram slices. This can be expressed as $$\hat{a} = \arg\max_a \left( \max_H P_a(V, H) \right) \qquad (2)$$
$$= \arg\max_a \left( \max_H P_a(V \mid H) P_a(H) \right),$$

where the joint distribution of a skeletal pose sequence and a spectrogram, $P_a(V, H)$, is decomposed into a product of the skeletal pose sequence model, $P_a(H)$, and the active acoustic model, $P_a(V \mid H)$, for a particular action class a.

Figure 7:
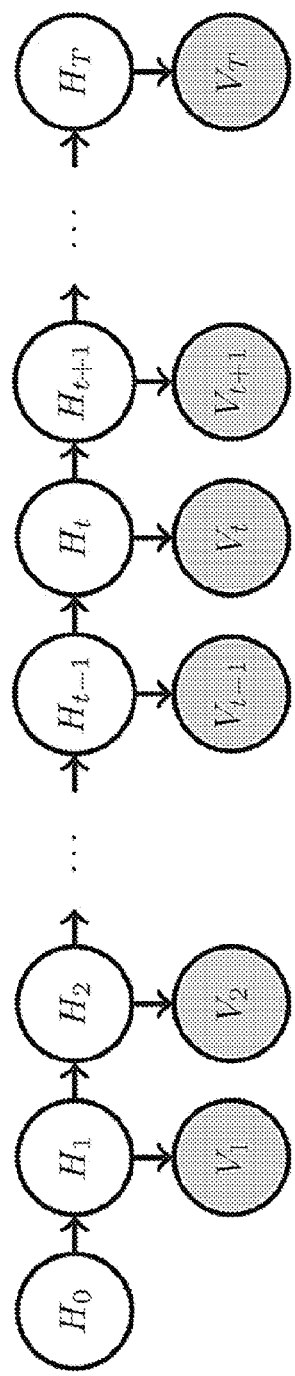
FIG. 7: Structure of the HMM used to capture sequences of Doppler modulations given a hidden sequence of skeletal poses.

A hidden Markov model (HMM) can be used to model a single pair of visible and hidden sequences. In order to leverage this model for recognizing actions, a set of HMM parameters are each trained separately on the portions of the training data that contain examples of a single action, a. When a new test sequence of acoustic spectrogram slices, V, is observed, each of the individual action HMMs are used to predict the most likely sequence, H, of unobserved skeletal poses. Computing the likelihoods of the sequences produced using each set of action parameters allows the models to predict the most likely action a by choosing the model that produces the most likely sequence. An HMM is an extension of a Markov chain where the random variables in the Markov sequence are considered hidden, or latent, and not observed. Instead, an additional visible random variable is observed at each step in the sequence. The visible random variable is conditionally independent of all the other hidden and visible random variables given the hidden variable at that step. FIG. 7 depicts the basic structure of the HMM used to represent the active acoustic action model. HMMs have been extensively used in speech recognition, but their ability to capture the dynamics of the actions have also made them attractive for action recognition. There are actually three independent sets of ultrasound observations in the JHUMMA dataset. In order to investigate the effects of using active acoustics from different orientations, three separate sets of HMMs are developed, one for each ultrasound sensor. While they can all share the same skeletal pose state space built upon the Kinect sensor data, their observation state spaces are all unique, requiring independent sets of parameters.

In addition to the hidden sequence encoded by the variables $H=h_0, \ldots, h_T$ and the visible sequence encoded by the variables $V=v_0, \ldots, v_T$, the HMM also has a start state $H_0$ that may be used to encode a set of prior probabilities indicating the likelihood that a chain starts in each state.

This HMM encodes the structure of the sub-motion and spectrogram slice sequences for a specific action a in the action recognition model if the sub-motions are assumed to adhere to the Markov property. Under this condition, the joint probability of the HMM can be decomposed as $$P_a(H_a, V) = P_a(V|H) \cdot P_a(H) = \Pi_{t=1}^T P_a(V_t|H_t) \cdot P_a(H_0) \Pi_{t=1}^T P_a(H_t|H_{t-1}). \quad (3)$$

The factorization of the joint distribution is also captured by the conditional independence assumptions encoded in the graphical structure of the HMM. The HMM is a generative probabilistic model of the active acoustic modulations and models the full joint probability distribution instead of just the discriminative class conditional distribution $P_a(H|V)$.

The HMM parameters for action a are $\theta_a = (\pi_a, A_a, B_a)$, where $\pi_a$ is the vector of hidden state priors, $A_a$ is the matrix of transition probabilities between the hidden skeletal pose states, and $B_a$ is the matrix of emission probabilities of spectrogram slices from each of the hidden states. There are $|\mathcal{H}|$ hidden skeletal pose states and $|V|$ visible spectrogram slice states. If $i \in \{1, \ldots, |\mathcal{H}|\}$ indexes into the set of possible hidden states, then the elements of the state prior vector are, $$\pi_a(i) = P_a(H_0=i). \quad (4)$$

If $i,j \in \{1, \ldots, |\mathcal{H}|\}$ both index into the set of possible hidden states, then the elements of the transition matrix are, $$A_a(i,j) = P_a(H_t=j|H_{t-1}=i). \quad (5)$$

If $i \in \{1, \ldots, |\mathcal{H}|\}$ indexes into the set of possible hidden states and $k \in \{1, \ldots, |V|\}$, then the elements of the emission matrix are, $$B_a(i,k) = P_a(V_t=k|H_t=i). \quad (6)$$

A. Training the HMM Parameters

The JHUMMA dataset contains joint examples of both the hidden skeletal pose sequences and the visible spectrogram slices that can be used train the parameters for each class of actions. Under this fully supervised setting, the parameters for the HMM can be learned via closed-form maximum likelihood estimates (MLE). To derive the MLE estimates, consider the joint probability of a training example, (V=v, H=h), where both the hidden and visible variables are known. Using Equation (3) gives the probability of the training example, $$P_a(H=h, V=v) = \prod_{t=1}^T B_a(H_t, V_t) \times \quad (7)$$

$$\prod_{t=1}^T A_a(H_{t-1}, H_t) \times \pi_a(H_0)$$

$$= \prod_{t=1}^T \prod_{i=1}^{|\mathcal{H}|} \prod_{k=1}^{|V|} B_a(i, k)^{\mathbb{1}(H_t=i, V_t=k)} \times$$

$$\prod_{t=1}^T \prod_{i=1}^{|\mathcal{H}|} \prod_{j=1}^{|\mathcal{H}|} A_a(i, j)^{\mathbb{1}(H_{t-1}=i, H_t=j)} \times$$

$$\prod_{i=1}^{|\mathcal{H}|} \pi_a(i)^{\mathbb{1}(H_0=i)}. \quad (8)$$

The parameters $\theta_a$ have been substituted for the appropriate probability distributions and the indicator function $\mathbb{1}$ is used to specify the number of times each probability term occurs. The probability of L independent training sequences is simply $\Pi_{l=1}^L P_a(H=h_l, V=v_l)$. Taking the log of this distribution yields, $$\sum_{l=1}^L \log P_a(H=h_l, V=v_l) = \quad (9)$$

$$\sum_{i=1}^{|\mathcal{H}|} \sum_{k=1}^{|V|} N_{ik} \log B_a(i,k) + \sum_{i=1}^{|\mathcal{H}|} \sum_{j=1}^{|\mathcal{H}|} N_{ij} \log A_a(i,j) + \sum_{i=1}^{|\mathcal{H}|} N_i \log \pi_a(i).$$

Here the emission counts across the training set are defined as, $$N_{ik} = \sum_{l=1}^L \sum_{t=1}^T \mathbb{1}(H_{l,t}=i, V_{l,t}=k). \quad (10)$$

The transition counts across the training data are defined as, $$N_{ij} = \sum_{l=1}^L \sum_{t=1}^T \mathbb{1}(H_{l,t}=j, H_{l,t-1}=i). \quad (11)$$

The prior counts across the training data are defined as, $$N_i = \sum_{l=1}^L \mathbb{1}(H_{l,0}=i). \quad (12)$$

It is necessary to add additional constraints via Lagrange's multiplier. Essentially, the fact that the parameters are also proper probability distributions, and therefore sum to unity, must be enforced. That is, $\sum_{i=1}^{|\mathcal{H}|} \pi_a(i)=1$, $\sum_{j=1}^{|\mathcal{H}|} A(i,j)=1$, and $\sum_{k=1}^{|\mathcal{V}|} B(i,k)=1$. To find the MLE estimates for the various parameters, first add the appropnate constraint to the log-likelihood in Equation (9). Let $\lambda$ be the Lagrange multiplier coefficient. Then take the partial derivatives of the constrained log-likelihood with respect to both the parameter of interest and $\lambda$. This results in two equations and two unknowns. Solving the system of equations for the state prior probabilities yields, $$\hat{\pi}_a(i) = \frac{N_i}{\sum_{i'=1}^{|\mathcal{H}|} N_{i'}}. \tag{13}$$

Solving for the transition probabilities yields, $$\hat{A}_a(i,j) = \frac{N_{ij}}{\sum_{j'=1}^{|\mathcal{H}|} N_{ij'}}. \tag{14}$$

Solving for the emission probabilities yields, $$\hat{B}_a(i,k) = \frac{N_{ik}}{\sum_{k'=1}^{|\mathcal{V}|} N_{ik'}}. \tag{15}$$

Under the supervised training paradigm, finding the MLE estimates for the HMM parameters can be described as counting the number of times the relevant event occurred in the training data and normalizing the results into proper distributions. To train one set of HMM parameters for each action $a \in \mathcal{C}$, the training data may be split according to the action that generated it, and the parameters for each action are trained solely on the associated training data.

Many of the possible hidden state transitions and visible observation combinations were never observed in the training sets. To alleviate this, add-one smoothing can be applied to the MLE estimates. This technique amounts to adding one phantom count to each element prior to normalization.

B. Finding the Most Likely Hidden Sequence in a Hidden Markov Model

Given the trained parameters for an HMM and a test sequence of observations, the Viterbi algorithm can be used to find the most likely sequence of hidden states. The Viterbi algorithm is a dynamic programming technique to efficiently compute the maximum a posteriori (MAP) probability estimate of the most likely sequence in a chain-structured graphical model, such as the HMM.

The Viterbi algorithm is composed of a forward pass through all possible sequences of states where the likelihood of ending up in state $j \in \{1, \ldots, |\mathcal{H}|\}$ at time $t \in \{1, \ldots, T\}$ is computed for each state. Given an observed sequence $V_1=k_1, \ldots, V_T=k_T$, the likelihood $\delta_t(j)$ of a state j, at each time step t, can be computed based on the likelihoods of the states at the previous time step t−1, the transition probabilities between the states and the probability that each state emits the current observed symbol $k_t$, $$\delta_t(j) = \max_{i=2,\ldots,|\mathcal{H}|} \delta_{t-1}(i) A(i,j) B(j, k_t). \tag{16}$$

The forward pass can be initialized using the prior probability of each state such that, $$\delta_1(j) = \max \pi(i) A(i,j) B(j, k_1). \tag{17}$$

In addition to tracking the likelihood of each state, the previous state that gave rise to the likelihood is also tracked.

$$\alpha_t(j) = \operatorname*{argmax}_{i=1,\ldots,|\mathcal{H}|} \delta_{t-1}(i) A(i,j) B(j, k_t). \tag{18}$$

The Viterbi algorithm for an HMM terminates once the final time step T is reached. At this point the sequence of most likely states can be traced backwards through time. Beginning at time step T, the most likely state is $$h_T^* = \operatorname*{argmax}_{i=1,\ldots,|\mathcal{H}|} \delta_T(i), \tag{19}$$

and the sequence is unrolled using the previous states that were tracked. Thus, $$h_t^* = \alpha_{t+1}(h_{t+1}^*), \tag{20}$$

where t<T.

C. Splitting the JHUMMA Dataset into Examples and Batches

The JHUMMA dataset provides a perfect foundation for building HMMs that jointly model sequences of skeletal poses and sequences of Doppler-modulations and to evaluate their ability to classify actions sequences. There are twenty-one distinct types of actions captured in the JHUMMA dataset and the performance of the HMM model is evaluated on the task of classifying these action categories.

The JHUMMA dataset contains a sequence of spectrogram slices for each of the three ultrasound sensors and a sequence of skeletal frames for each of the actions performed during each of the thirteen trials. Unfortunately, each of these coarsely labeled sequences contains multiple repetitions of the same action. Nominally, each sequence contains ten repetitions, although there are several instances where the actor lost track of the count. To generate test sequences suitable for training and testing HMMs, each sequence was split into ten examples of equal numbers of consecutive frames. Any remaining frames were appended to the last example so that temporal cohesion was maintained.

Five batches of training and testing data were set up for cross-validation. For each action/trial pair, two of the ten data sequences were randomly selected as test examples, while the remaining eight were selected as training examples. The random permutations were constructed such that each of the ten examples serves as a test sequence in exactly one of the five batches. One of the actors accidentally skipped three actions, so there are precisely 2,160 training examples and 540 test examples in each batch.

D. Learning Cluster Prototypes

The K-means algorithm is a common method for performing vector quantization, a technique for modeling probability densities based on the location of prototype vectors. The idea behind K-means was first proposed as least squares quantization in pulse-code modulation (PCM). In Sections E and F, the details of using K-means to learn prototype clusters for both the skeletal poses and spectrogram slices are described. Here, the basic technique is developed for performing unsupervised clustering.

Let $X = x, \ldots, x_N$ be a set of unlabeled training data, where each $x_i \in \mathbb{R}^D$. Define a set of $j = \{1, \ldots, K\}$ cluster prototypes $\mu_j \in \mathbb{R}^D$. A types may be initialized using the K-means++ algorithm, which randomly selects one of the data points from X to be the first cluster prototype and selects subsequent points, one at a time, from X to be initial cluster prototypes with probability inversely proportional to their distance from the nearest existing selected prototype.

Once all K of the clusters have been initialized, the training data points may all be assigned to the nearest cluster. In an exemplary embodiment, the distance between any data point in the training set and any cluster mean is given by $$d(x_i, \mu_j) = \sqrt{\sum_{d=1}^{D} (x_d - \mu_d)^2}, \quad (21)$$

the Euclidean distance in D-dimensional space. Once the cluster assignment is complete, the cluster prototypes are updated by computing the mean value of all the data points in the cluster assignment. Then, using these new cluster prototypes, the procedure is repeated. An exemplary stopping criterion is generally when no data points change clusters in successive iterations.

In an exemplary embodiment, the K-means algorithm was performed four times with different random data points used for the K-means++ cluster initialization. The decision to use four starting points was based on the number of available independent CPU cores. The number of iterations was also capped at 750, although the cluster prototypes converged before that in all cases.

E. Skeletal Pose State Space Model

One limitation of the HMM is that it is built on a finite state space. Unfortunately, the skeletal poses derived from the Kinect data are more accurately represented in continuous space. In order to generate a finite latent space of skeletal poses suitable for training the HMMs, the K-means algorithm may be employed to discover unsupervised clusters suitable for quantizing the vector space of skeletal poses.

Ideally, the model for the hidden state variables would capture the skeletal pose precisely at a given instant in time. However, one limitation of the HMM is that the state space is finite, so there must be a finite number of hidden states. In an exemplary embodiment, the approach taken is to find a set of skeletal poses that suitably approximate the space of skeletons recorded by the Kinect sensor in the JHUMMA dataset. This was accomplished through unsupervised clustering, using the K-means algorithm described in Section D, to find cluster prototypes of a given batch. The process was then repeated separately for the training data in each of the cross-validation datasets. The principle parameter involved with this method is the degree to which the training skeletons are quantized, which is the number of skeletal clusters, K. The hidden state variables $H_t$ take on values $h_t \in \{1, \ldots, K\}$, which index the set of skeletal pose clusters.

The skeletal poses from the Kinect were adapted in three ways to simplify the problem and facilitate clusterings that captured the most important information. The first adaptation was to remove the translation of the hip joint from the features included in the skeletal clusters. As discussed above, this provides translation invariance, so that the pose clusters that are learned are applicable to any location in the dataset. It would be prohibitively expensive to produce and label a dataset extensive enough to support learning individual clusterings for different spatial areas.

The second adaptation was to remove the hand and feet joints from the skeletal poses. Studying the Kinect data in the JHUMMA dataset reveals that the hands and feet tend to be the noisiest joint estimates. The feet in particular tend to exhibit a significant amount of jitter from frame to frame. Removing these joints prevents the learned skeletal clusters from spending any modeling power accounting for the jitter in these noisy joints. It also has the added benefit of reducing prototypes given all of the skeletal frames in the training data the dimensionality of the skeletal pose features, which is also the dimension of the cluster space. Removing the hands and feet left only sixteen joints in the abbreviated skeleton structure.

The third adaptation was to use the rotation representation of the skeletal pose, described above. This allows all of the training data, regardless of the actor, to be merged together. The skeletal poses are clustered in limb rotation space, which is more amenable to cross-training between actors than Cartesian joint coordinates. The limb rotations are referenced to the vertical and only take on values in the range of 0 radians, which corresponds to straight up, to $\pi$ radians, which corresponds to straight down. In this representation, the discontinuity between 0 radians and $2\pi$ radians is avoided, so the Euclidean distance remains a natural choice of metric. Applying all three of these adaptations resulted in each skeletal pose being represented by a 45-dimensional feature vector.

Figure 8:
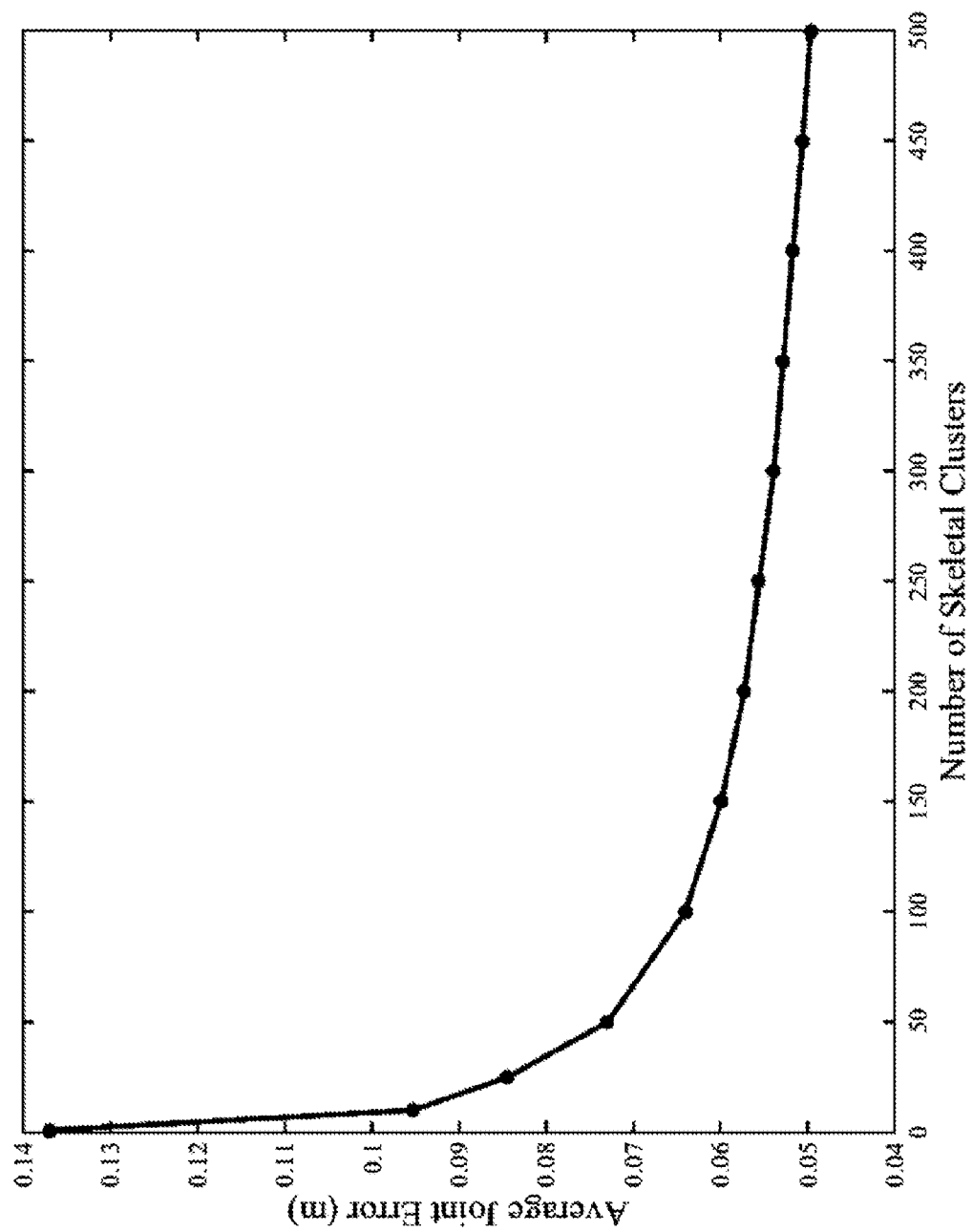
FIG. 8: Comparison of the error between each skeletal frame in the training data and the associated skeletal cluster for various numbers of clusters.

In order to explore the effect of different quantization levels in the pose space, the K-means clustering procedure was performed for various numbers of clusters on the first batch of data. FIG. 8 shows the average joint error for each set of skeletal pose clusters. The error was calculated by computing the distance between each joint in each skeletal frame of the training data and the corresponding joint in the cluster mean that the training frame was associated with. For the purposes of computing the error, the rotation representation of the cluster mean was transformed back into Cartesian coordinates. The error was summarized by averaging across each of the 16 joints in each of the 225,483 training frames, which were pooled across all thirteen trials and 21 actions in the first batch of data.

The curve in FIG. 8 illustrates a tradeoff between model complexity and accuracy. As the number of skeletal clusters increases, the clusters do a better job of approximating the training data, so the error decreases. However, more clusters require more model parameters to be estimated. Unless otherwise specified, the data shown in the following sections was generated using 200 skeletal clusters, which errs on the side of accurately modeling the skeletal poses with a more complex model.

Figure 9:
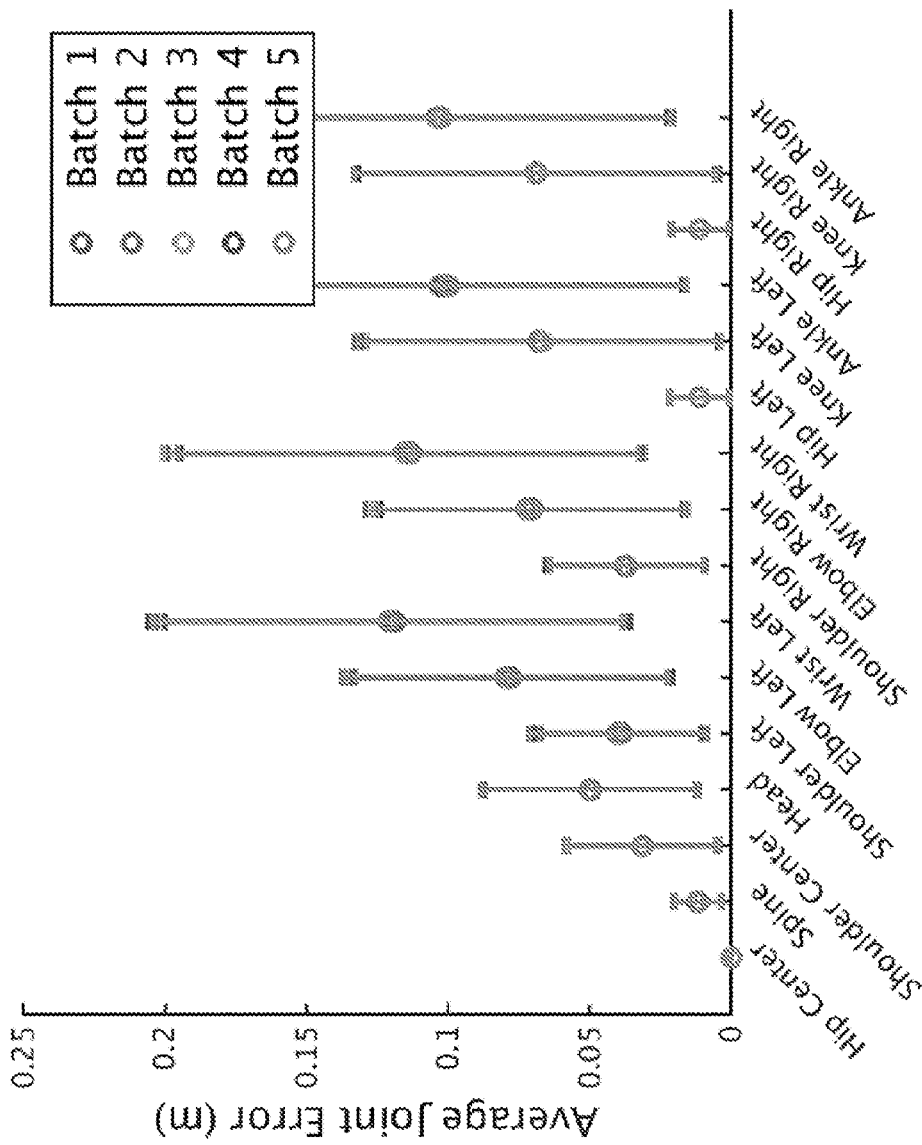
FIG. 9: Comparison of the error between each skeletal joint in the training data and the closest skeletal cluster for each data batch. The number of skeletal clusters was fixed at 200.

In order to confirm that the training data in each cross-validation batch produced similar quantization results, the error of each joint was investigated. The error was computed as the Euclidean distance from each joint in the training data relative to the corresponding joint in the associated skeletal cluster. FIG. 9 shows the error for each of the 16 joints, averaged across all of the training examples in each of the five batches. The error bars in FIG. 9 correspond to one standard deviation of the joint errors.

As mentioned earlier, the hip translation was removed from the representation, so all of the hip joints were fixed to the origin when the other joint errors were computed, which is why they appear to have zero error. It is also interesting to note that the wrist and ankle joints have significantly higher error and variance than the others. This makes sense because they tend to move more during actions. They are also more likely to be tracked erroneously by the Kinect.

This result supports the decision to omit the hand and foot joints, which were even more unreliable.

Figure 10:
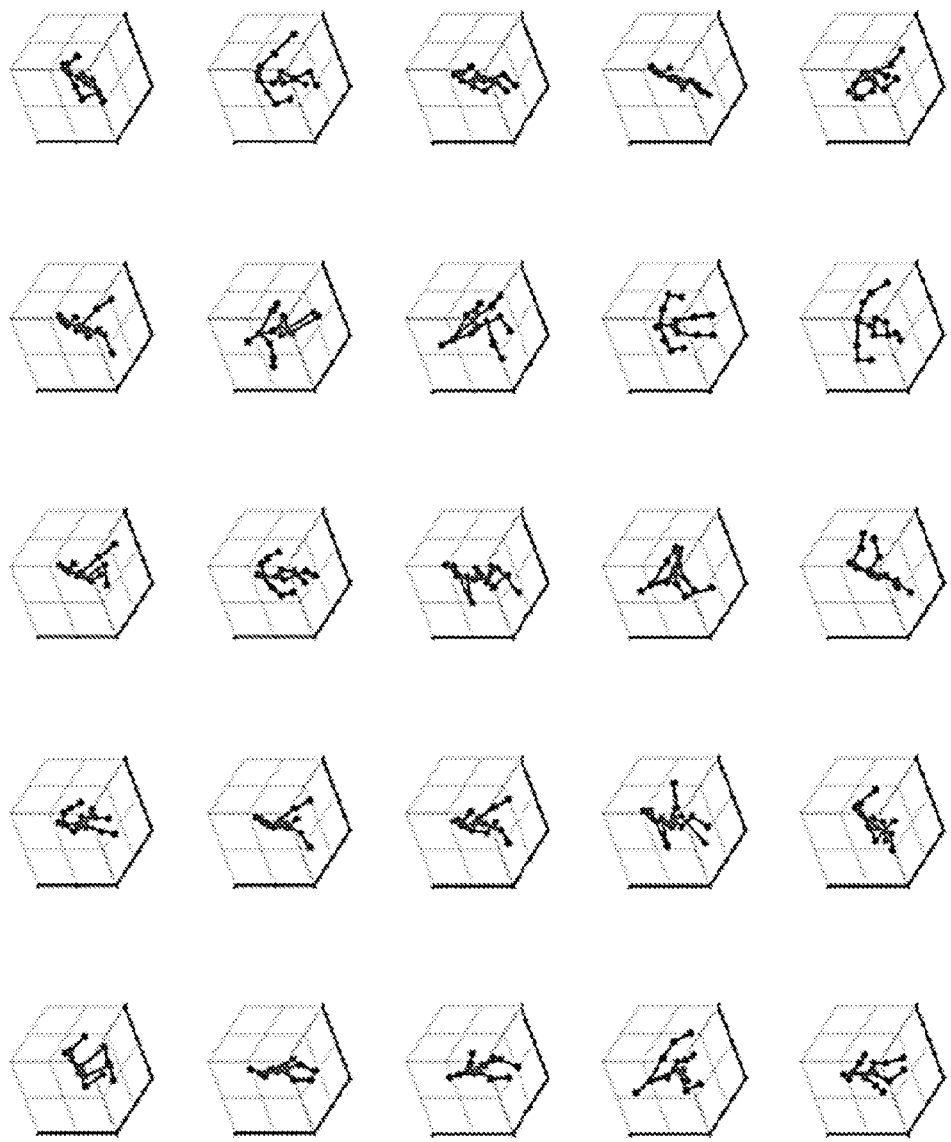
FIG. 10: A random sampling of 25 of the 200 skeletal clusters learned from the first batch of training data.

FIG. 10 shows a random sampling of the skeletal pose clusters learned from the first batch of cross-validation data. These poses appear to be relatively diverse and interesting, indicating that the unsupervised clustering approach is at least reasonable.

Figure 11:
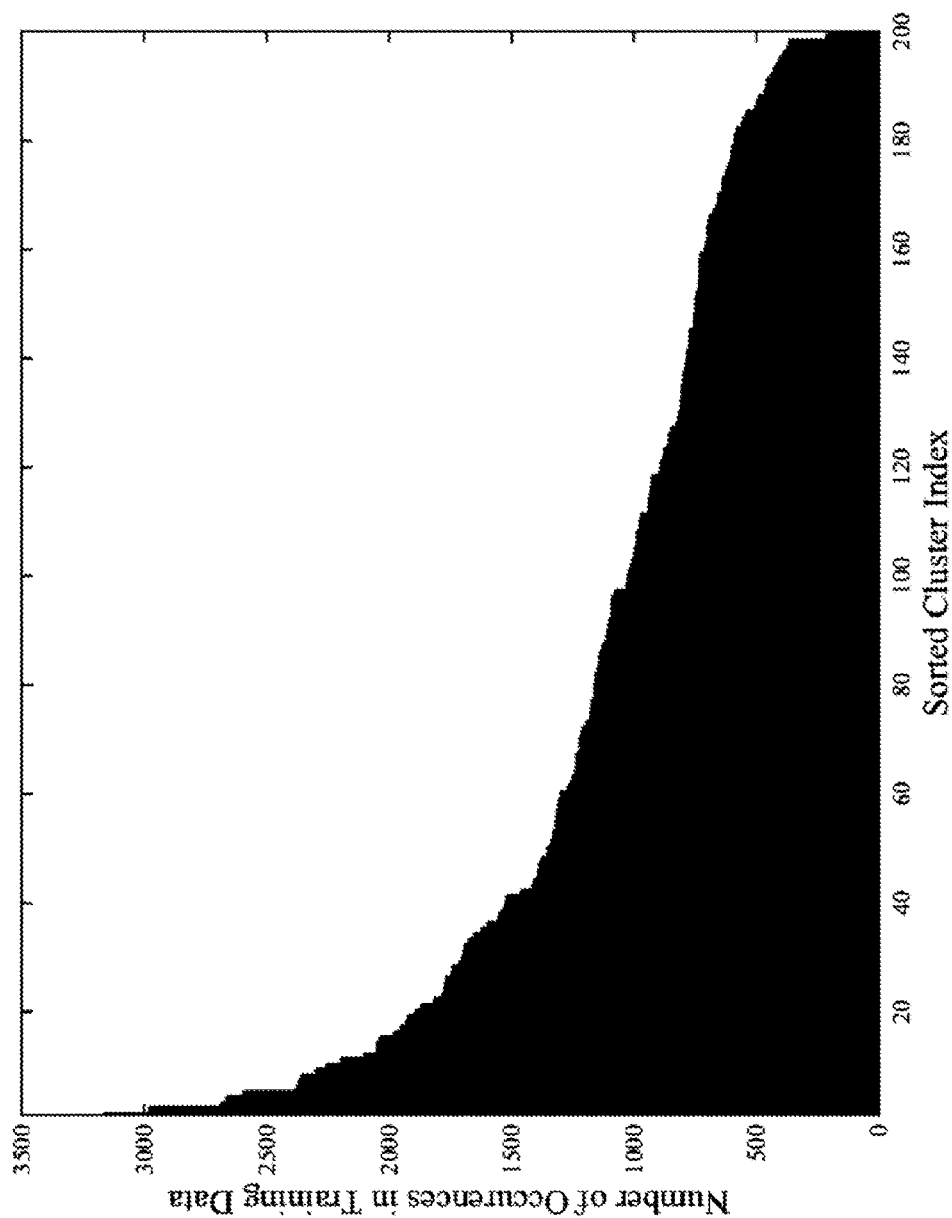
FIG. 11: Histogram illustrating the number of occurrences of each skeletal cluster. The cluster indices have been sorted by their frequency.
Figure 12:
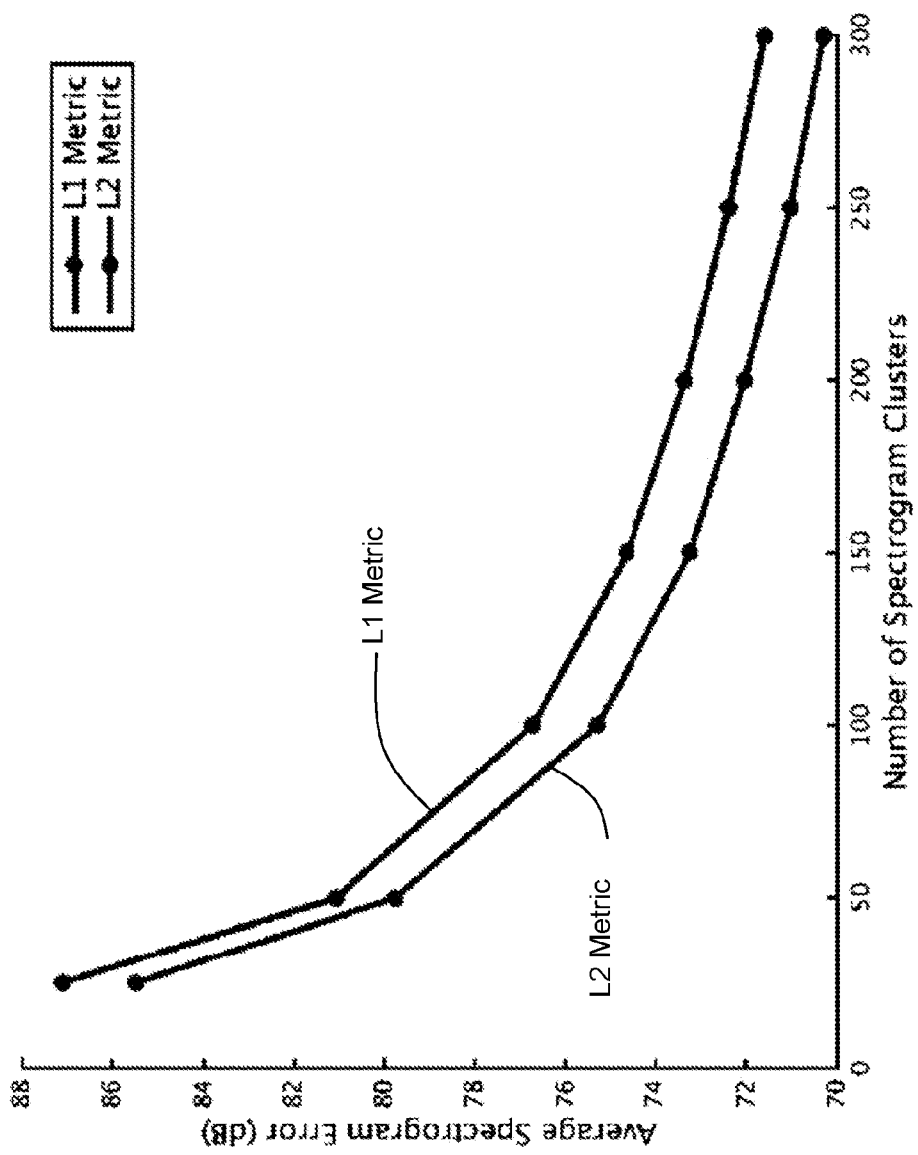
FIG. 12: Comparison of the average error between each 40 kHz spectrogram slice in the first batch of training data and the nearest spectrogram cluster for increasing numbers of cluster prototypes, K. The clustering K-means clustering procedure was run using both the $L_1$ and $L_2$ distance metrics.

FIG. 11 shows the histogram of each skeletal pose cluster in the training data for the first cross-validation batch. The cluster indices are sorted according to their frequency. Although the frequency is not uniform, the balance between cluster frequencies appears reasonable. Some actions have relatively unique skeletal poses that are not exhibited often, while many actions share similar skeletal poses that are clustered together and occur more frequently.

F. Doppler Modulation Observation Model

While the hidden variables for each of the three HMM models can all utilize the same set of skeletal pose clusters, it is necessary to develop sets of spectrogram slice clusters that are tuned to each of the three ultrasound sensors individually because they each utilize a different carrier frequency.

Figure 17:
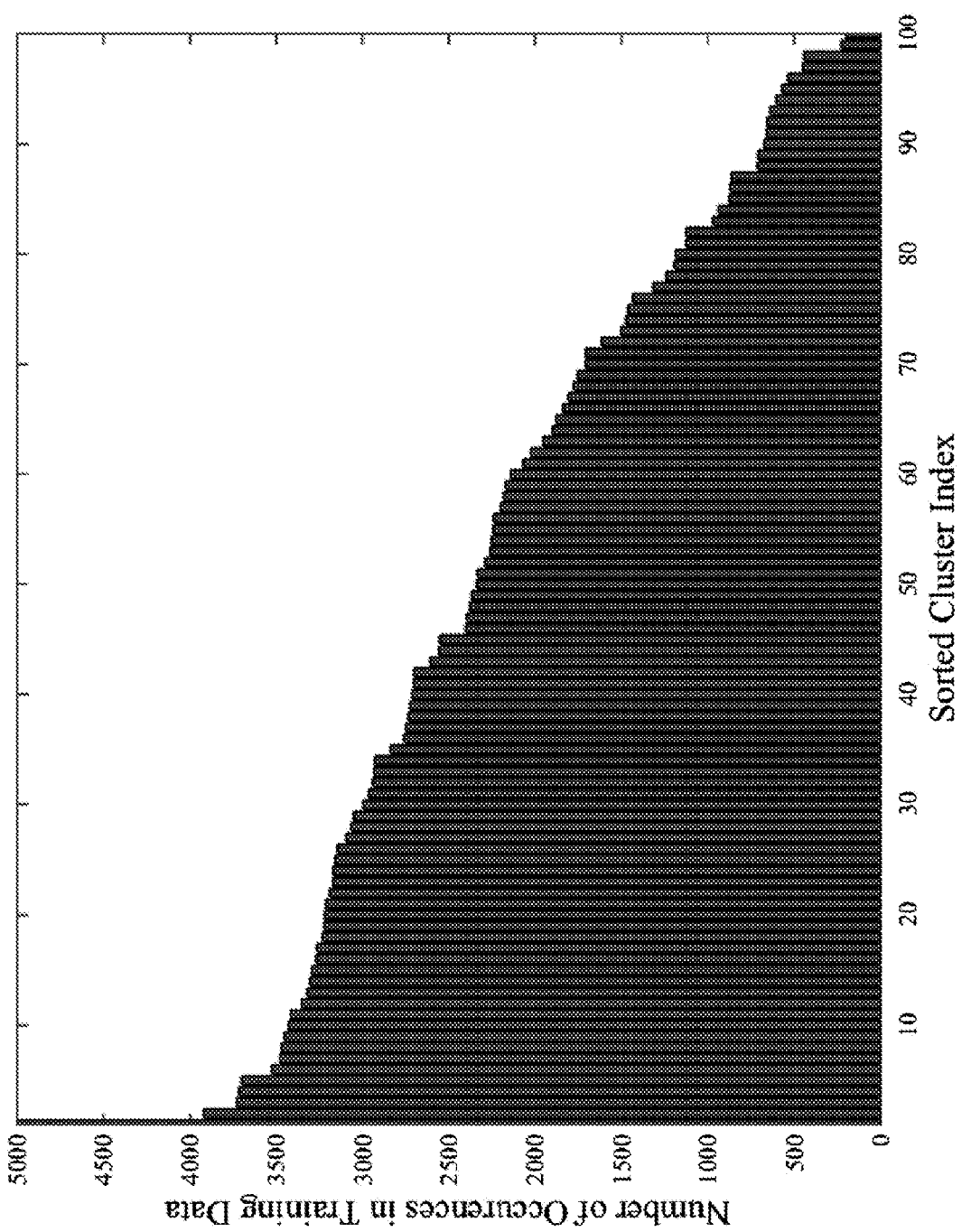
FIG. 17: Histogram illustrating the number of occurrences of each 25 kHz ultrasound cluster. The cluster indices have been sorted by their frequency.

An approach similar to the skeletal clustering was taken to quantize the spectrogram slices associated with each ultrasound sensor. The spectrogram slices from all of the training sequences were pooled together and the K-means algorithm was again used to choose a set of average clusters that were representative of the entire set. FIG. 17 shows the average error for a spectrogram slice in the first batch of 40 kHz ultrasound data over several values of K. The average cluster error was also computed using clusterings derived using both the Euclidean, or $L_2$, and $L_1$ distance metrics. Although the $L_2$ distance metric is not an obvious choice for comparing two spectrogram slices, empirical testing demonstrated very little difference between the character or performance of spectrogram clusters created using the $L_2$ distance metric versus the $L_1$ distance metric.

For clustering the ultrasound spectrogram slices, a value of K=100 was used. As the clusterings do not appear to be particularly sensitive to the choice of distance metric, the spectrogram clusters used to generate the results presented here were created using the $L_2$ distance metric, which is consistent with the metric used to cluster the skeletal poses. This spectrogram clustering process was repeated separately for the data from each of the three ultrasound sensors and for each of the cross-validation datasets.

Figure 13:
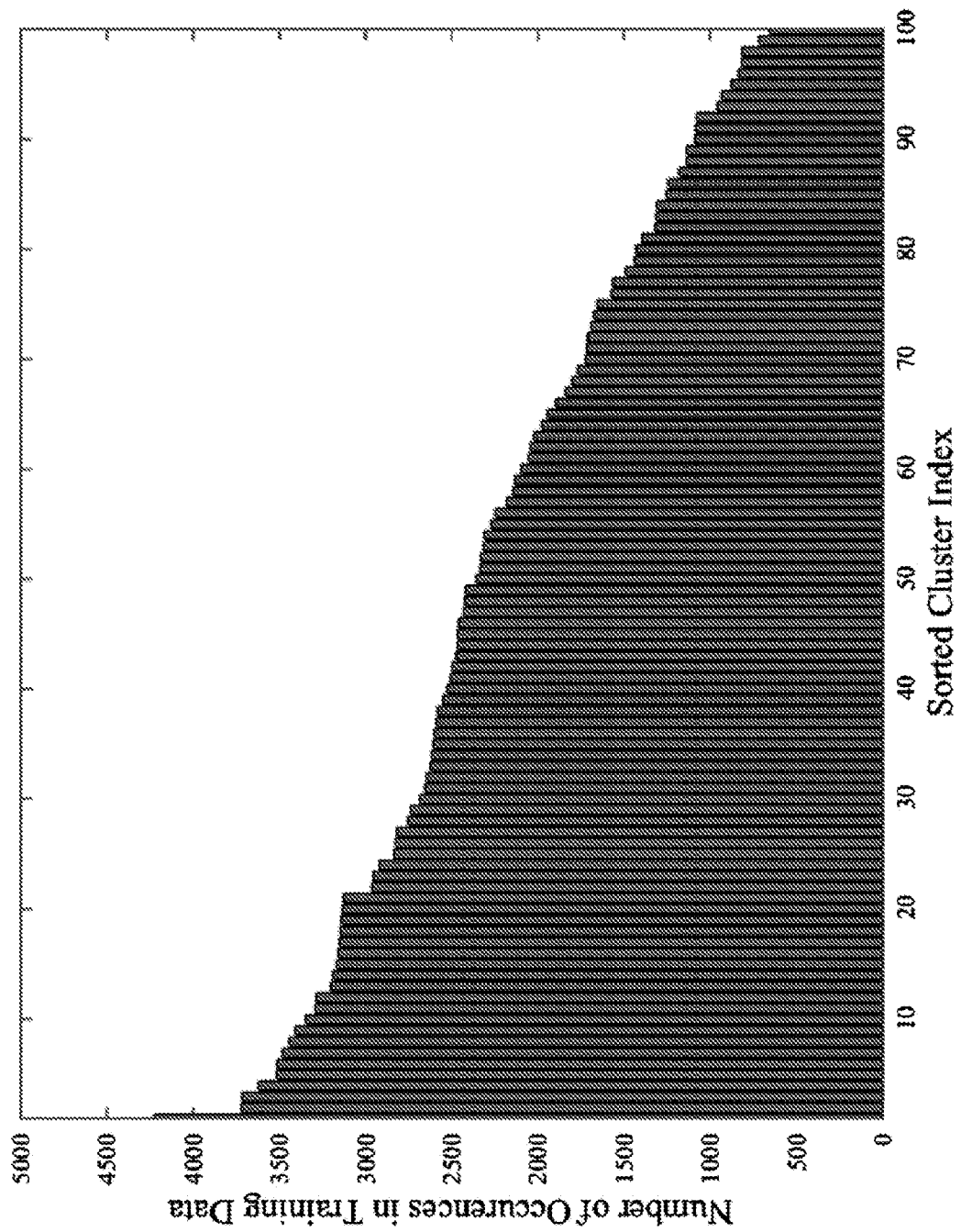
FIG. 13: Histogram illustrating the number of occurrences of each 40 kHz ultrasound cluster. The cluster indices have been sorted by their frequency.

FIG. 13 shows the histogram of each 40 kHz ultrasound cluster extracted from the first batch of cross-validation data. The cluster frequencies appear reasonable. Some are certainly more frequent than others, but no cluster dominates.

Figure 14:
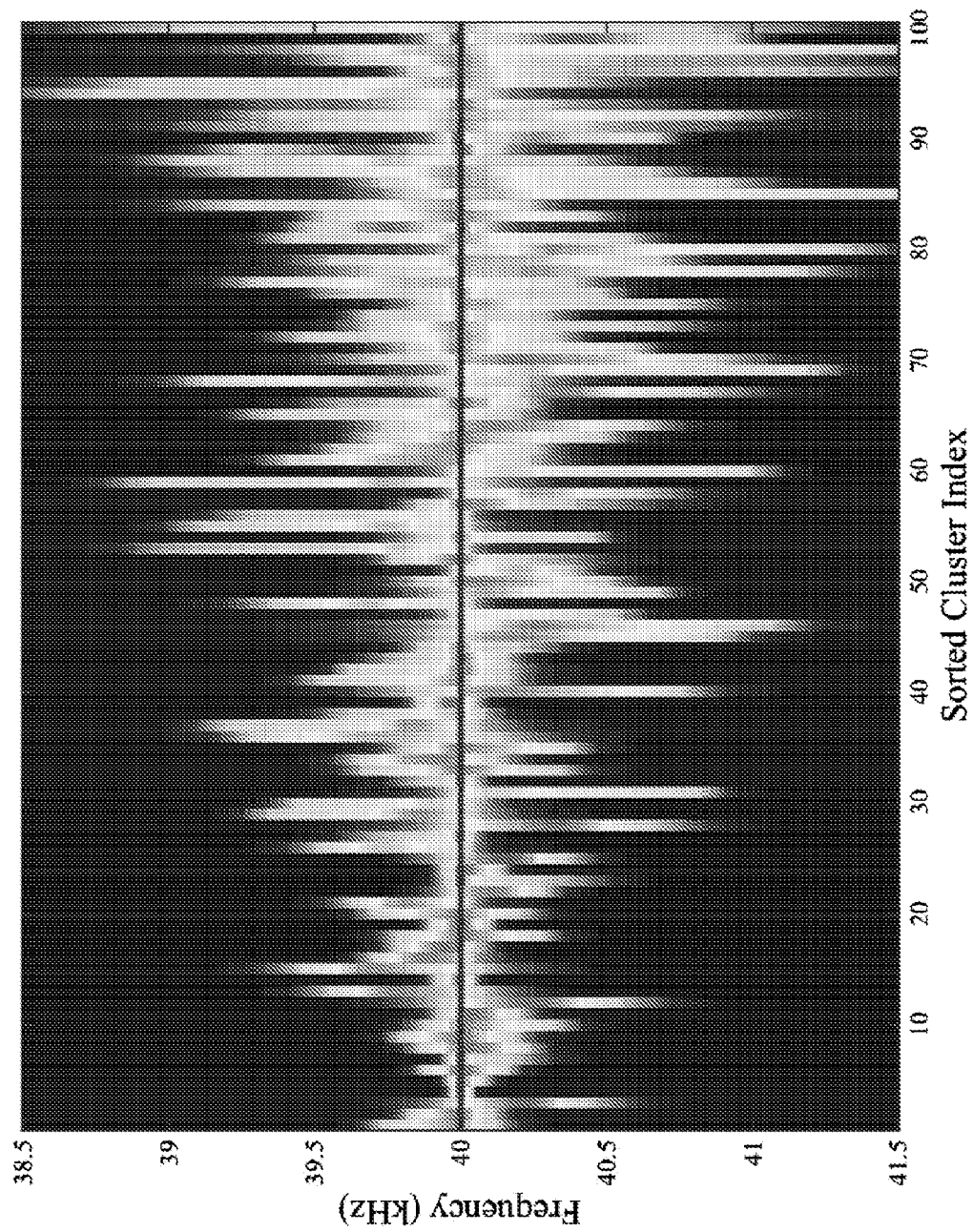
FIG. 14: The collection of 40 kHz ultrasound representative spectrogram slice cluster means, ordered by their frequency in the training data.

One advantageous feature of the spectrogram slices is that they are relatively easy to display and interpret in two-dimensions. FIG. 14 shows all of the cluster means for the 40 kHz training data. These representative spectrogram slices are sorted according to their frequency in the training data. Actions are still more often composed of periods of little movement, with large motions being relatively rare, which parallels the general trend of clusters with larger Doppler modulations being less frequent.

Figure 15:
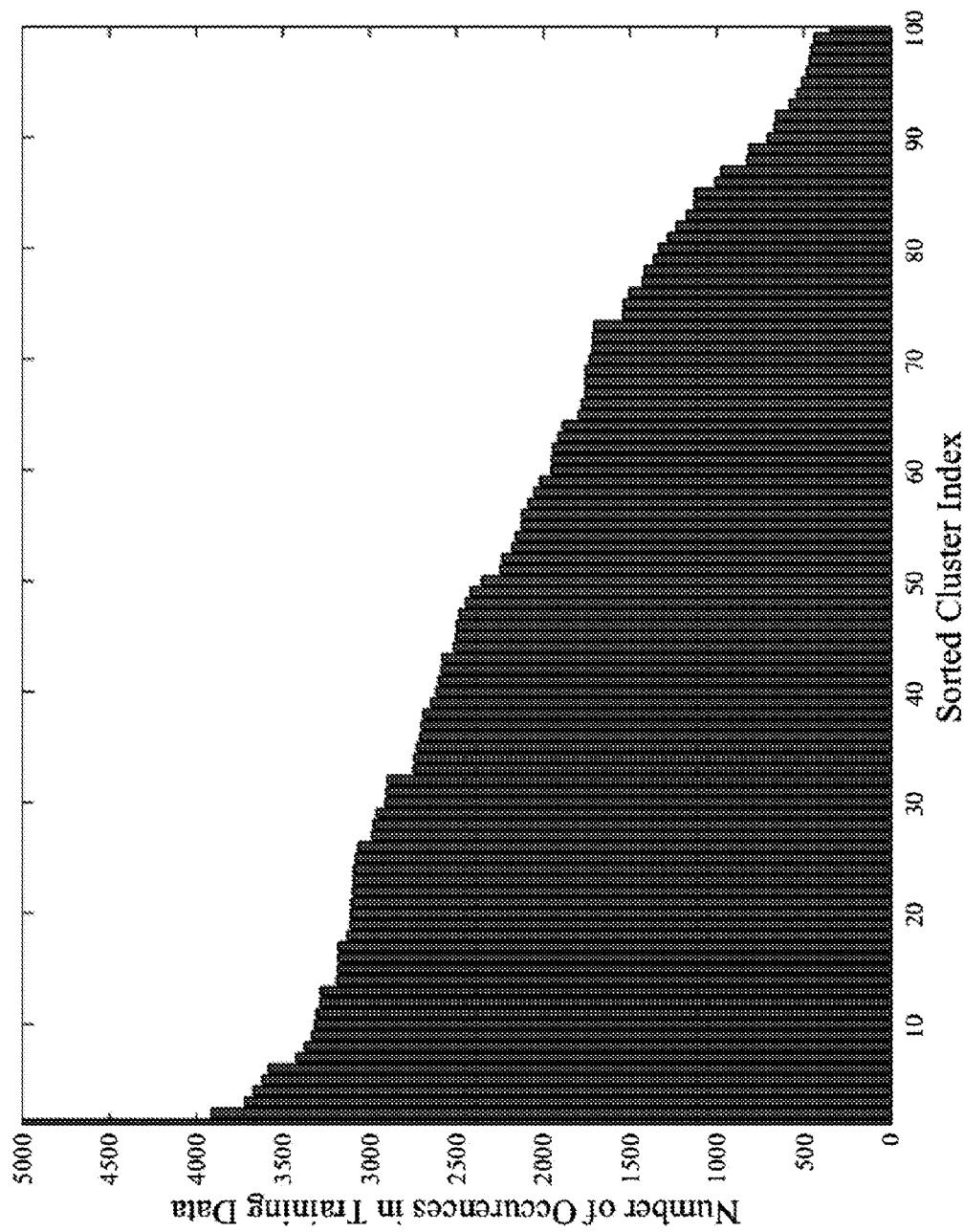
FIG. 15: Histogram illustrating the number of occurrences of each 33 kHz ultrasound cluster. The cluster indices have been sorted by their frequency.

FIG. 15 shows the histogram of each 33 kHz ultrasound cluster extracted from the first batch of cross-validation data. The distribution is slightly more skewed than the one for the 40 kHz data.

Figure 16:
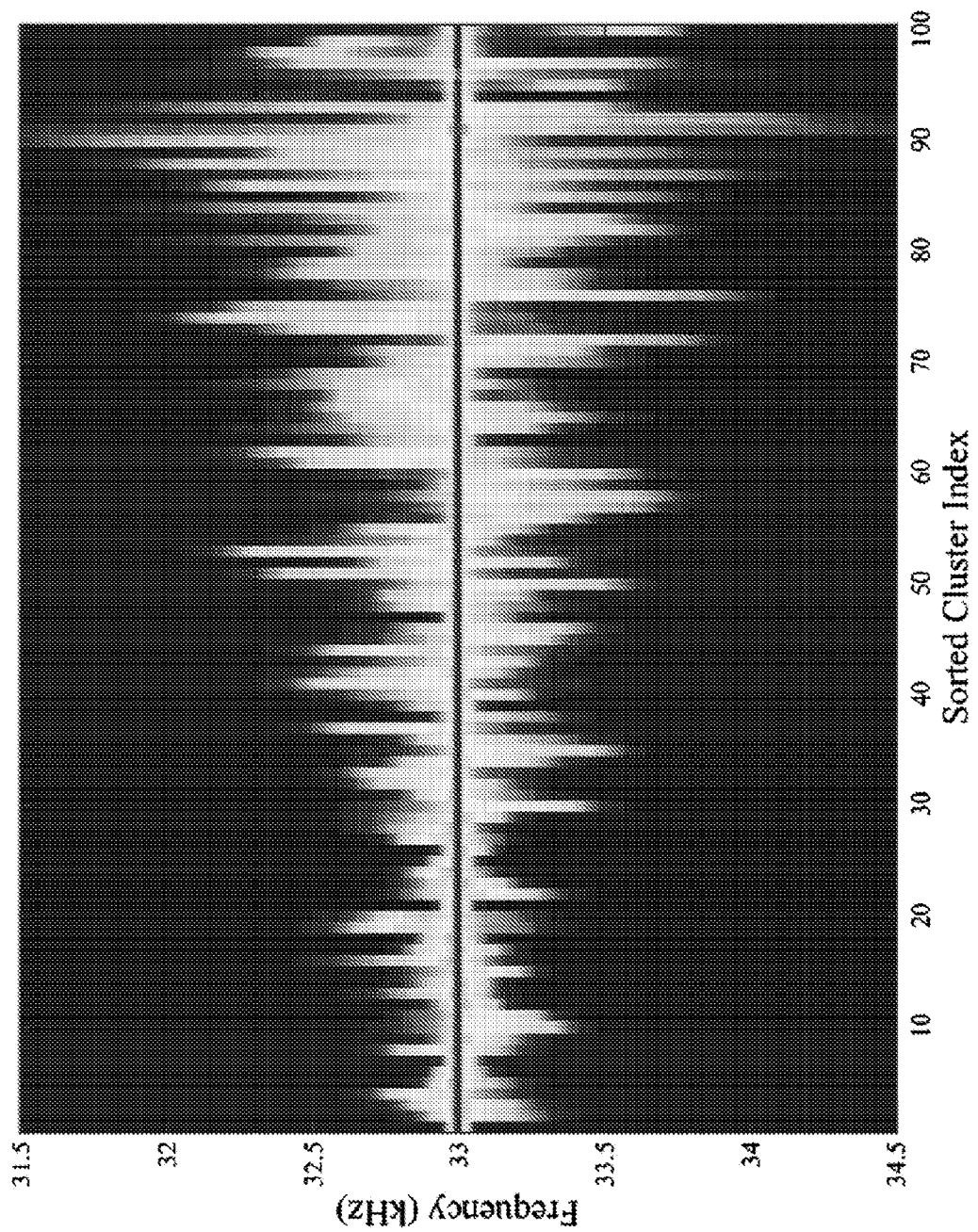
FIG. 16: The collection of 33 kHz ultrasound representative spectrogram slice cluster means, ordered by their frequency in the training data.

FIG. 16 shows all of the cluster means for the 33 kHz training data. The clusters are very similar in character to those culled from the 40 kHz data. The modulations are smaller overall, but this is due to the lower carrier frequency and the fact that the sensor was positioned to the side of the majority of the actions in the JHUMMA dataset. The side sensors tended to observe smaller velocity components for the majority of actions. This is also supported by the histogram of the clusters, which indicates that the higher modulation clusters, indicative of more motion towards the side sensors, are less frequent compared to the histogram of the 40 kHz sensor, which was positioned directly in front of most of the actions.

Figure 18:
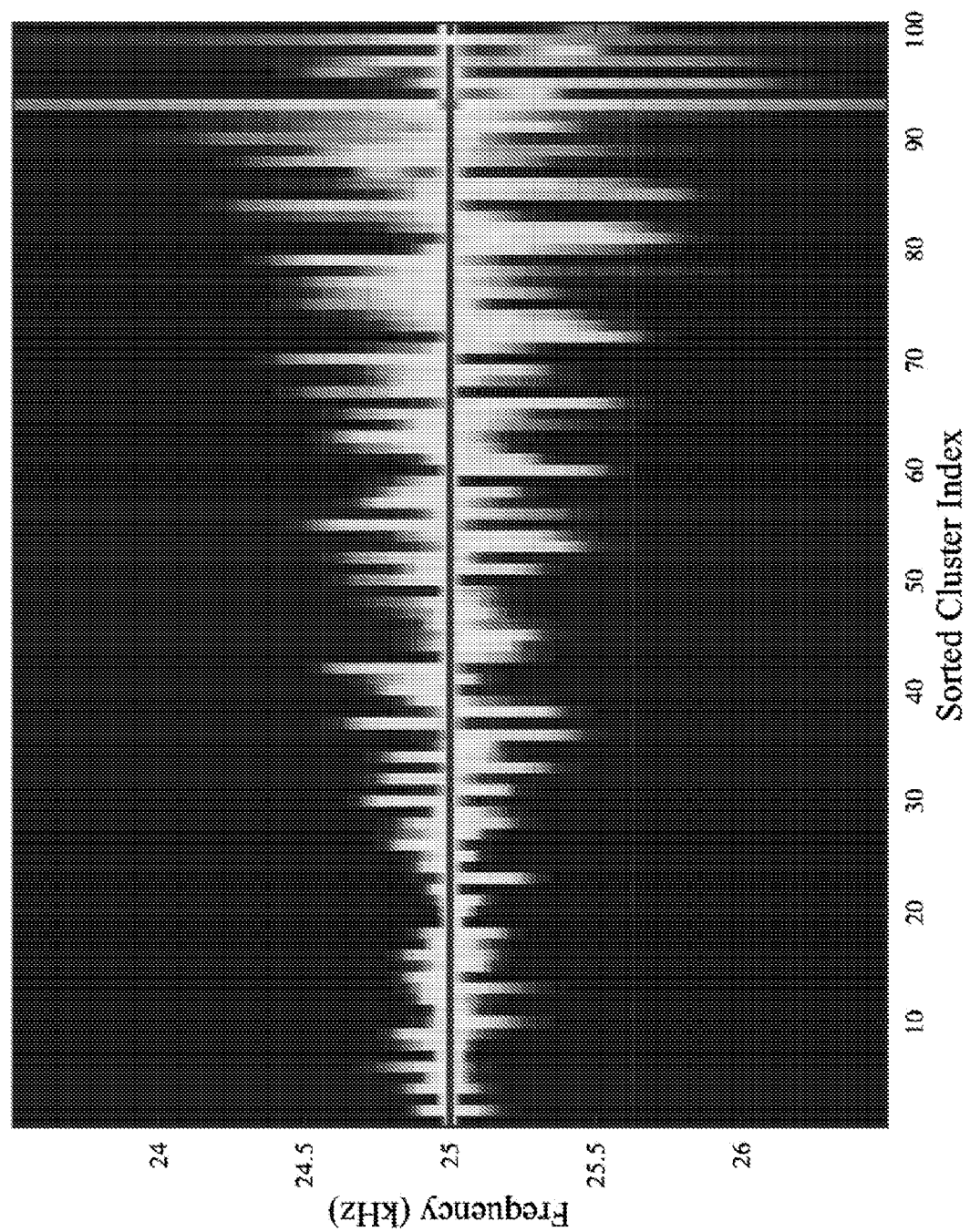
FIG. 18: The collection of 25 kHz ultrasound spectrogram slice cluster means, ordered by their frequency in the training data.

FIG. 17 shows the frequency of each 25 kHz ultrasound cluster extracted from the first batch of cross-validation data. Similar to the 33 kHz spectrogram slice clusters, the 25 kHz spectrogram slice clusters also appear to have a more skewed distribution than the 40 kHz spectrogram slice clusters. This is in line with the less variable nature of both the positioning of the sensor off to the side and the lower magnitude of the 25 kHz modulations. FIG. 18 shows all of the cluster means for the 25 kHz training data.

Human Action Recognition Results

Once an appropriate vocabulary of skeletal pose prototypes was constructed from the training data and the alphabets of spectrogram slice prototypes were learned separately for each of the ultrasound frequencies, the parameters for each of the actions classes and ultrasound sensors were computed using Equations (13), (14), and (15). To classify a novel test sequence from one of the ultrasound sensors, it was first translated into a sequence of spectrogram slice prototypes. This was done by choosing the prototype with the smallest Euclidean distance from each spectrogram slice in the test sequence. Once the test data was translated into spectrogram prototypes v, the most likely sequence of hidden skeletal pose prototypes $h_a^*$ was computed using the Viterbi algorithm, described in Section B. This procedure was repeated for each set of parameters $\theta_a$. Note that only the parameters trained for that particular ultrasound frequency were considered, and the subscript on the most likely hidden sequence was used to indicate the action the set of HMM parameters used to produce it was trained on.

The log-likelihood of a hidden sequence h and an observed sequence v, normalized for the number of time steps in the sequences, is $$\mathcal{L}_a(h, v) = \log \pi_a(h_0) + \sum_{t=1}^{T} \log A(h_{t-1}, h_t) + \sum_{t=1}^{T} \log B(v_t, h_t) - \log T. \quad (22)$$

After computing the log-likelihood of the hidden sequence produced by each action model, the sequence was classified as the action that best modeled the sequence. That is, $$\hat{a} = \operatorname*{argmax}_{a} \mathcal{L}_a(h, v). \quad (23)$$

Figure 19:
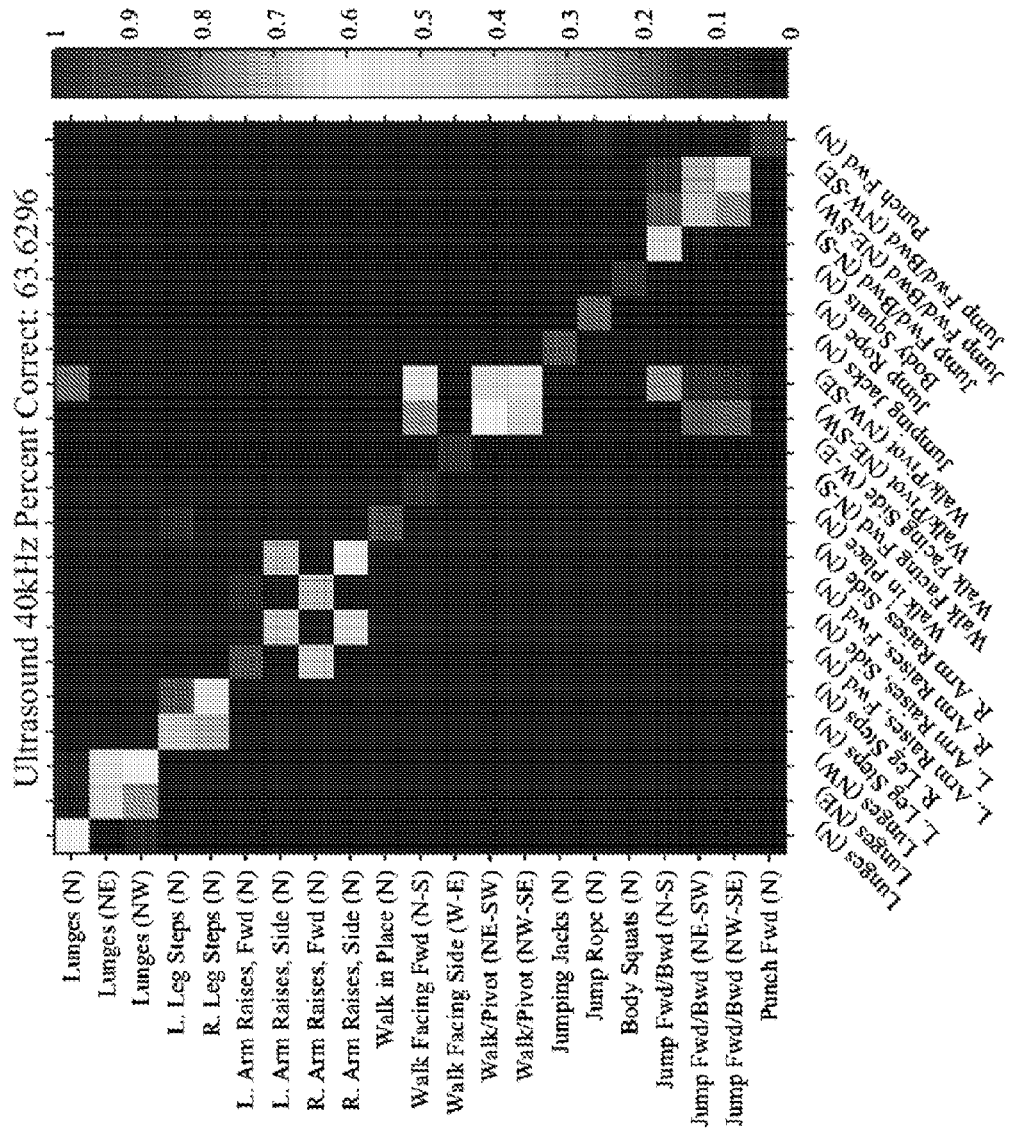
FIG. 19: Confusion matrix enumerating the action classification decisions resulting from the 40 kHz ultrasound model.

FIG. 19 shows the confusion matrix for the action classification task that results from HMMs trained on the 40 kHz ultrasound data. Overall, the HMM model correctly classified 63.63% of the 2,700 test examples in the JHUMMA dataset. There were twenty-one actions, so classifying the actions by chance would yield a classification rate of under 5%. These results were compiled using all five of the cross-validation batches.

The confusion matrix indicates that the model tends to make very specific types of errors. It has significant difficulty distinguishing left versus right orientation among the action classes that have a similar action but different orientation. This is evident by the blocks of misclassification errors that are formed around many of the actions that have multiple orientations. One such example is the classification of the left leg steps and the right leg steps. The classifier places almost all of the probability mass on one of those two actions, but there is a lot of error between them. Recall that the 40 kHz ultrasound sensor was positioned to the north of the actor, which is roughly the line of symmetry for left versus right actions. With limited spatial information in the modulations, distinguishing between arm raises to one side or the other is difficult and results in significant classification errors. On the other hand, the 40 kHz ultrasound HMM does a good job of predicting actions with unique orientations such as punching and jumping jacks. This indicates that the modulations themselves are reasonable informative patterns to use for classifying coarse-grained action sequences.

Figure 20:
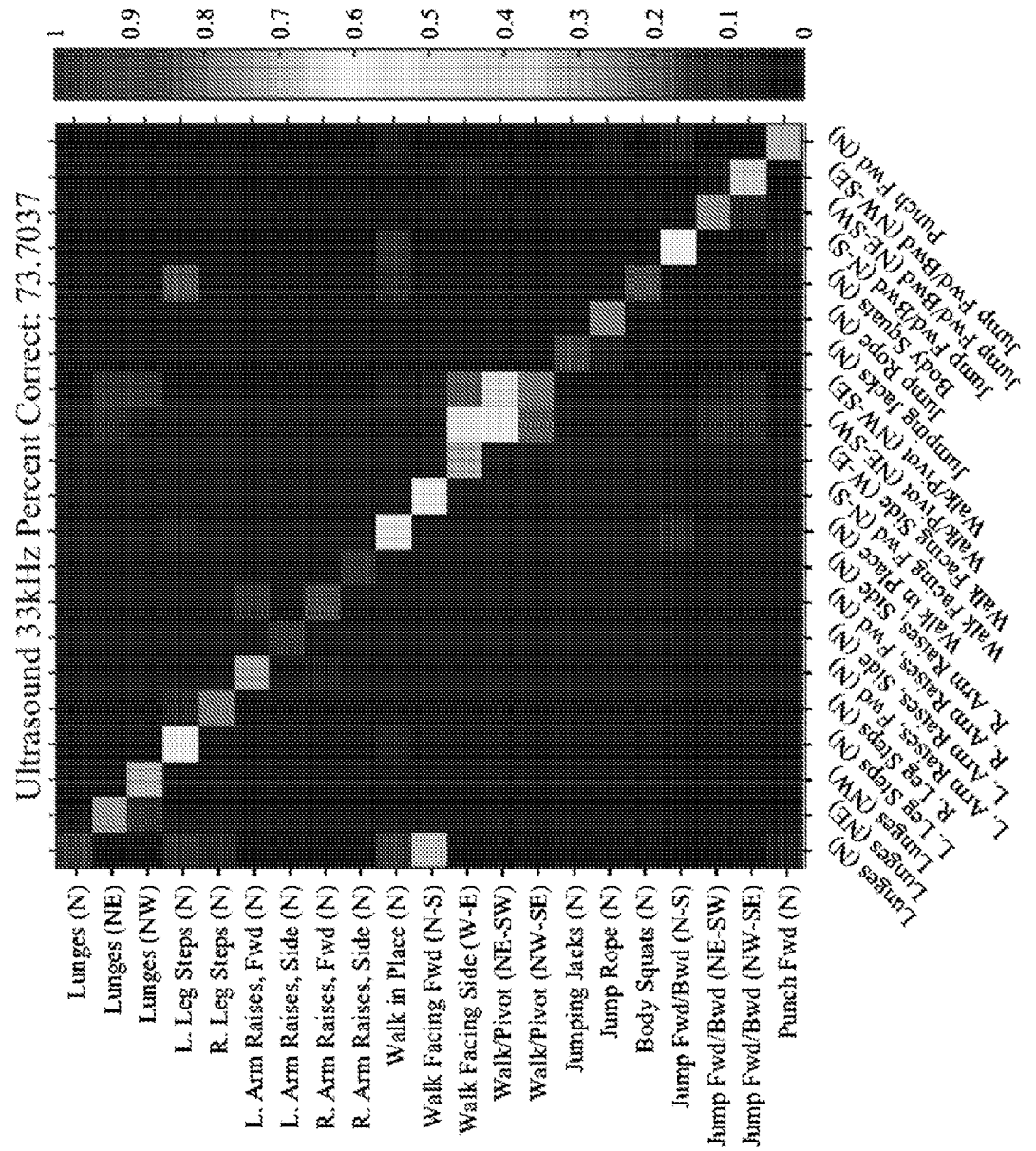
FIG. 20: Confusion matrix enumerating the action classification decisions resulting from the 33 kHz ultrasound model.

FIG. 20 shows the confusion matrix for the action classification task that results from HMMs trained on the 33 kHz ultrasound data. Overall, the HMM model correctly classified 73.70% of the 2,700 test examples in the JHUMMA dataset. Almost all of the actions with multiple orientations were symmetric with respect to the North to South axis of the JHUMMA setup. Therefore, it makes sense that the HMM trained on the micro-Doppler modulations recorded by the 33 kHz ultrasound sensor, which was off to the West, made fewer errors than the 40 kHz ultrasound sensor. In fact, the one set of actions that did have some orientations facing the 33 kHz sensor, walking back and forth, exhibited the same block error patterns in the confusion matrix as are evident in the 40 kHz ultrasound classifications.

Figure 21:
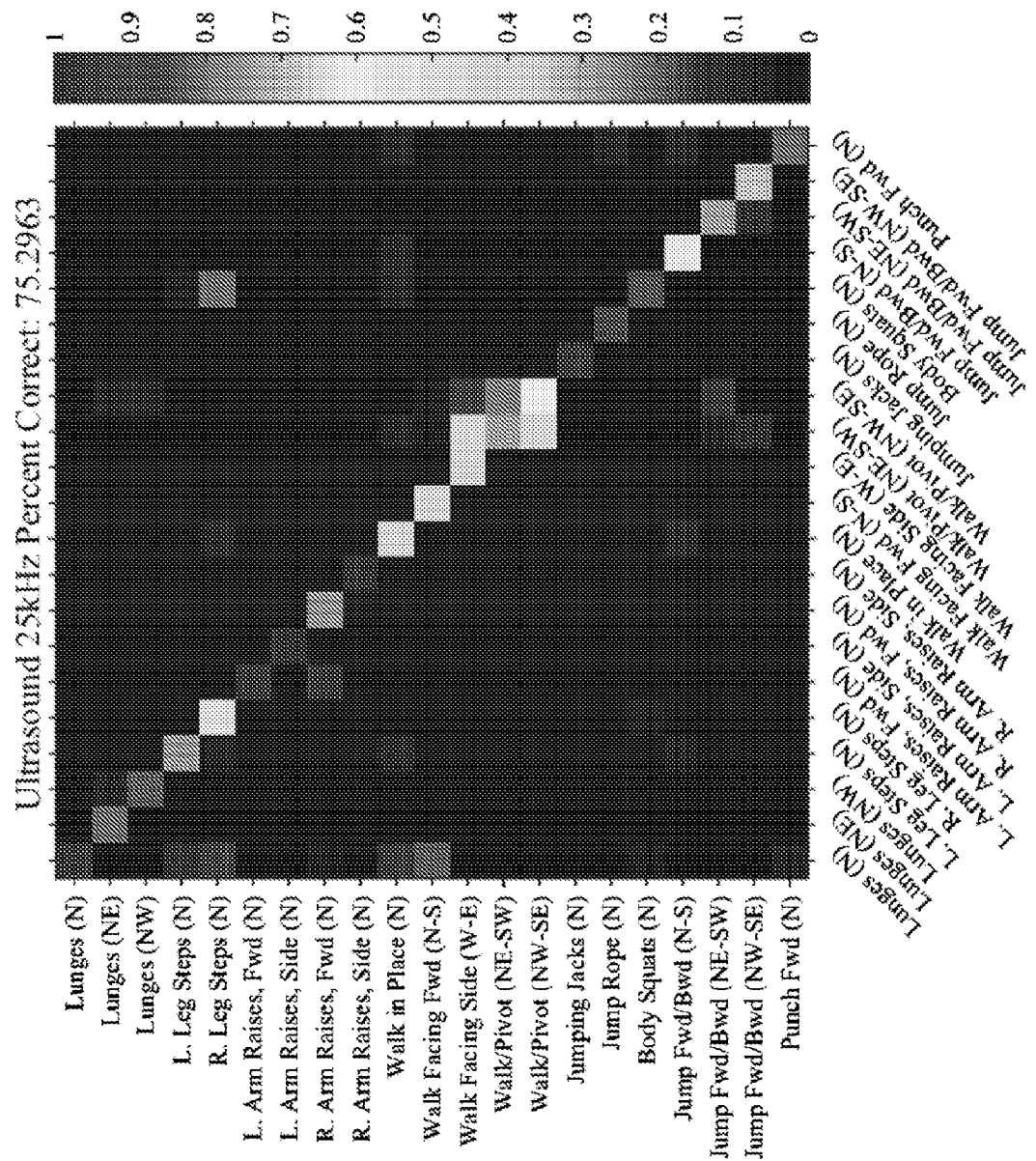
FIG. 21: Confusion matrix enumerating the action classification decisions resulting from the 25 kHz ultrasound model.

FIG. 21 shows the confusion matrix for the action classification task that results from HMMs trained on the 25 kHz ultrasound data. Overall, the HMM model correctly classified 75.30% of the 2,700 test examples in the JHUMMA dataset. The errors made by the HMM model trained on data from the 25 kHz ultrasound sensor, which was positioned to the East, is qualitatively similar to the errors made by the 33 kHz ultrasound sensor. This is reasonable as both sensors were on the same cardinal axis and, therefore, encountered the same ambiguities due to the orientation of the actions in the JHUMMA dataset.

Given that the position of the ultrasound sensor has a significant effect on the classification accuracy of the model trained on data recorded by it, a fourth model that is a fusion of all three individual ultrasound HMMs was created to investigate the benefits of combining multiple ultrasound sensors to disambiguate the orientations of the actions. The combined model was constructed as a product of the individual models by summing the log-likelihoods for each action that were produced by the individual ultrasound models prior to choosing the most likely action. A test sequence v is now classified as $$\hat{a} = \underset{a}{\mathrm{argmax}}\ (\mathcal{L}_a^{40}(h, v) + \mathcal{L}_a^{33}(h, v) + \mathcal{L}_a^{25}(h, v)). \quad (24)$$

Figure 22:
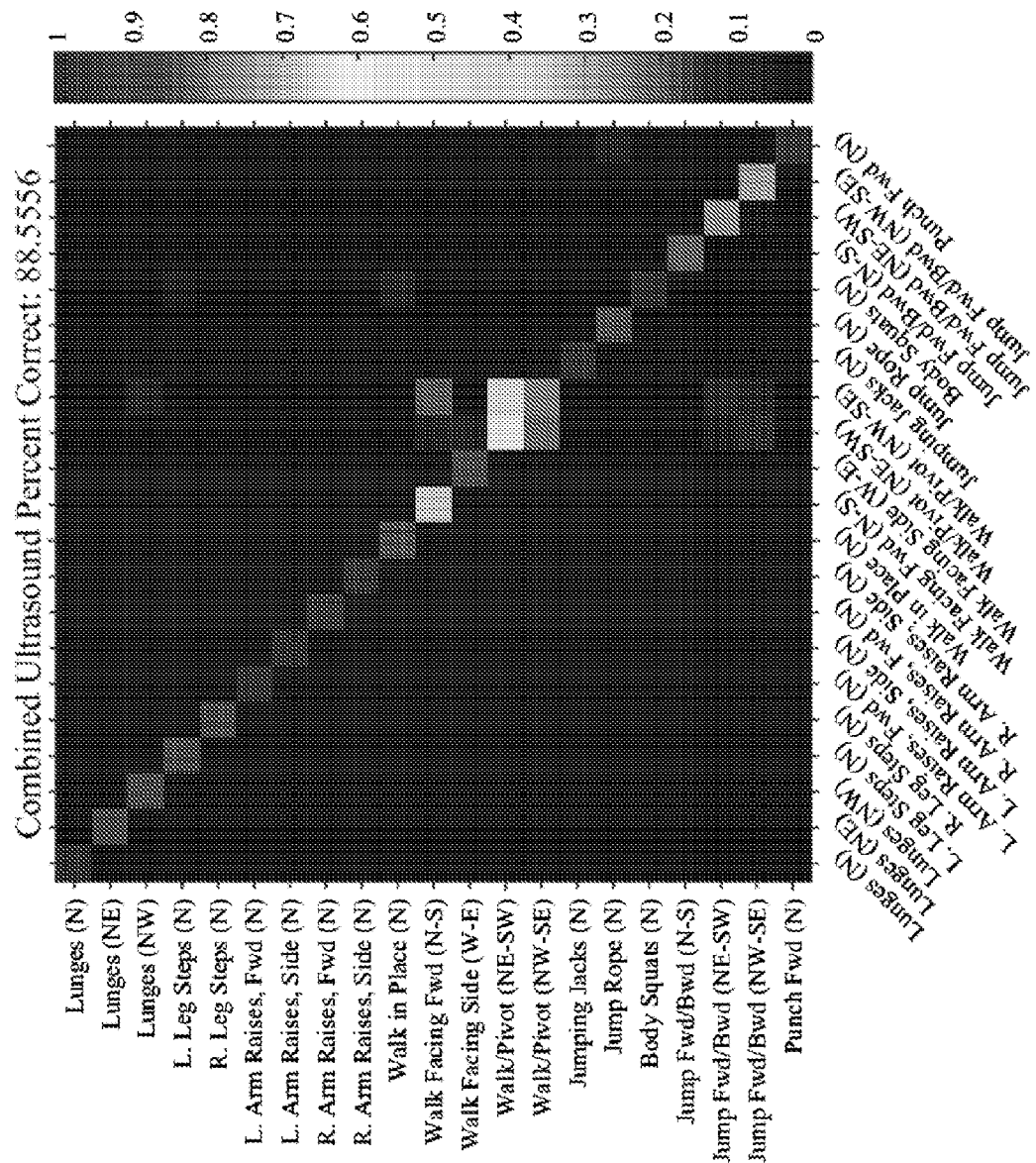
FIG. 22: Confusion matrix enumerating the action classification decisions resulting from combining the output of the three ultrasound models as a product of experts.

FIG. 22 shows the confusion matrix for the action classification task that results from combining each of the individual ultrasound HMM as a "product of experts" model. Overall, the HMM model correctly classified 88.56% of the 2,700 test examples in the JHUMMA dataset. Combining the output of the individual HMM models gives a significant boost in classification performance and appears to be a reasonable approach to leveraging multiple ultrasound sensor units.

Further Discussion

Table I gives a more detailed breakdown of the exact classification rates for each of the three individual ultrasound models as well as the product of experts model combining them all. Table II presents a comparison of classification performance for several different numbers of skeleton pose cluster prototypes. On the left side, the overall classification results for the action sequences are shown. On the right side, the pose classification rate for the hidden sequence of cluster prototypes predicted from the data of each ultrasound band are shown. The pose classification rate is computed by comparing the closest skeletal pose prototype, at each time step in a test sequence, to the skeletal pose prototype predicted by the HMM given the test sequence of ultrasound modulations.

TABLE I

Action Classification Performance on the JHUMMA Dataset

| Action Label | 25 kHz | 33 kHz | 40 kHz | Combined | Test Examples |
|---|---|---|---|---|---|
| Lunges (N) | 95.38 | 95.38 | 59.23 | 100.00 | 130 |
| Lunges (NE) | 81.54 | 75.38 | 40.77 | 91.54 | 130 |
| Lunges (NW) | 83.85 | 73.08 | 60.77 | 87.69 | 130 |
| L. Leg Steps (N) | 75.83 | 53.33 | 67.50 | 87.50 | 120 |
| R. Leg Steps (N) | 46.67 | 80.83 | 64.17 | 93.33 | 120 |
| L. Arm Raises, Fwd (N) | 96.15 | 73.85 | 90.77 | 100.00 | 130 |
| L. Arm Raises, Side (N) | 99.23 | 100.00 | 68.46 | 100.00 | 130 |
| R. Arm Raises, Fwd (N) | 76.15 | 91.54 | 31.54 | 96.92 | 130 |
| R. Arm Raises, Side (N) | 100.00 | 99.23 | 54.62 | 100.00 | 130 |
| Walk in Place (N) | 39.23 | 45.38 | 89.23 | 85.38 | 130 |
| Walk Facing Fwd (N-S) | 66.92 | 53.85 | 7.69 | 69.23 | 130 |
| Walk Facing Side (W-E) | 40.77 | 29.23 | 98.46 | 89.23 | 130 |
| Walk/Pivot (NE-SW) | 74.62 | 57.69 | 60.77 | 64.62 | 130 |
| Walk/Pivot (NW-SE) | 58.46 | 80.77 | 65.38 | 78.46 | 130 |
| Jumping Jacks (N) | 95.38 | 93.85 | 93.08 | 98.46 | 130 |
| Jump Rope (N) | 86.15 | 78.46 | 83.85 | 84.62 | 130 |
| Body Squats (N) | 84.62 | 89.23 | 100.00 | 100.00 | 130 |
| Jump Fwd/Bwd (N-S) | 53.08 | 56.92 | 37.69 | 83.85 | 130 |
| Jump Fwd/Bwd (NE-SW) | 73.85 | 77.69 | 32.31 | 76.92 | 130 |
| Jump Fwd/Bwd (NW-SE) | 70.00 | 68.46 | 37.69 | 74.62 | 130 |
| Punch Fwd (N) | 81.67 | 72.50 | 95.00 | 98.33 | 120 |
| Overall | 75.30 | 73.70 | 63.63 | 88.56 | 2700 |

TABLE II

Action and Pose Classification Performance on the JHUMMA Dataset

| Number of Clusters | Action Classification | | | Pose Classification | | |
|---|---|---|---|---|---|---|
| | 25 kHz | 33 kHz | 40 kHz | 25 kHz | 33 kHz | 40 kHz |
| 100 | 73.56 | 72.89 | 60.63 | 25.36 | 25.53 | 20.91 |
| 150 | 74.07 | 74.00 | 64.00 | 23.34 | 23.25 | 19.80 |
| 200 | 75.30 | 73.70 | 63.63 | 22.12 | 21.80 | 17.97 |
| 300 | 75.11 | 74.63 | 62.67 | 19.30 | 19.39 | 15.82 |

In general, more skeletal pose prototypes result in a more expressive state space that is able to model the actual recorded skeletal poses more closely. However, this precision comes at the price of a significantly larger model that now has many more parameters to estimate from the same fixed pool of training data. This is a classic model selection tradeoff and the results in Table II illustrate this. The action classification rates generally increase with the number of skeletal pose prototypes. However, the pose classification rates increase with fewer skeletal pose prototypes. This is reasonable because fewer prototypes make estimating the closest one significantly easier. Overall, using 200 skeletal pose prototypes, the conclusion drawn from the tradeoff in FIG. 8, seems to be a reasonable compromise between these two trends.

Convolutional Deep Belief Network Exemplary Embodiment

In this non-limiting embodiment, a conditional deep belief network (CDBN), a type of deep neural network architecture that incorporates a limited temporal history, is developed to interface with the JHUMMA dataset. The CDBN is a more sophisticated probabilistic graphical model than the HMM NPEFM and is capable of hallucinating more convincing micro-Doppler modulations. Deep neural networks have had significant success in recent years learning hierarchical representations of sensory input. The CDBN was originally developed in and used to model motion capture data.

In this non-limiting embodiment, a CDBN is used to learn representations of both the ultrasound modulations and the skeletal poses. The model that learns a direct representation of the ultrasound modulations can generate novel sequences, however, the model does not offer any control over parameters related to the environment or sensor configuration. On the other hand, the model that learns a direct representation of skeletal poses can be configured to generate novel sequences for different situations. The rotational skeletal representation allows the sequences to be adapted to different humans by swapping the limb lengths. Moreover, the generated sequences can be coupled with a Doppler-physics model, which allows the sensor geometry to be configurable. This combination of models provides a framework for generating new examples of ultrasound modulations that can be adapted to new situations.

1. Restricted Boltzmann Machine

Figure 23:
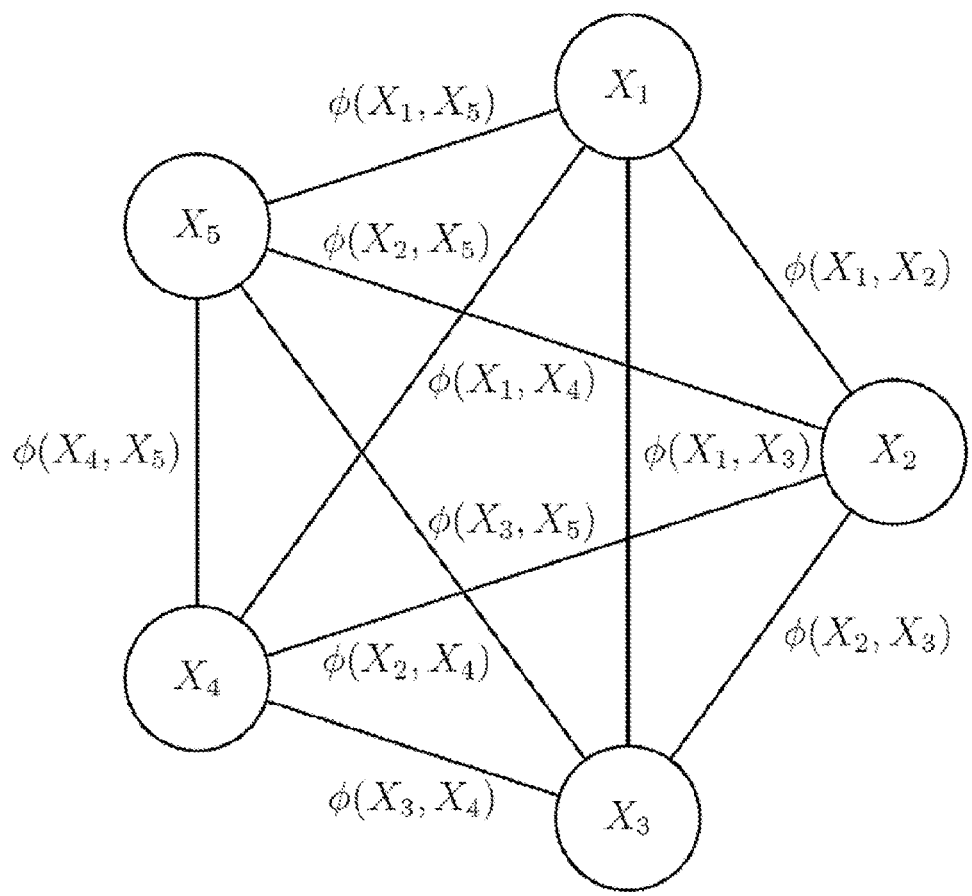
FIG. 23: Diagram of a simple MRF.

Deep belief networks are generative statistical models traditionally comprising a hierarchical layering of restricted Boltzmann machines (RBMs). An RBM is a particular type of undirected probabilistic graphical model. Undirected probabilistic graphical models are also known as Markov networks, or Markov random fields (MRFs), and were originally developed in the field of statistical physics. In an MRF, the random variables $X_1, \ldots, X_N$ are represented by nodes and the edges between the nodes indicate a direct probabilistic interaction between the two random variables. The interaction between random variables, for example $X_L$ and $X_j$, is captured by a factor $\phi(X_i, X_j)$, that is a function of the variables. In general, factors are simply functions that map a set of random variables to a non-negative value and are not limited to pairwise terms. FIG. 23 illustrates a simple MRF that has five random variables. In this example, the graph is fully connected, with a factor linking every pair of random variables.

The joint probability distribution of any MRF can be expressed as a normalized product of all the factors. Suppose that an MRF has N random variables, $X = X_1, \ldots, X_N$, and K factors, $\Phi = \{\phi_1(D_1), \ldots, \phi_K(D_K)\}$, where $D_j$ is some set of the random variables X. Then the joint distribution of the MRF is:

$$P_\Phi = (X_1, \ldots, X_N) = \frac{1}{Z} \cdot \tilde{P}_\Phi(X_1, \ldots, X_N), \quad (25)$$

where $\tilde{P}_\Phi(X_1, \ldots, X_N) = \Pi_{j=1}^{K} \phi_j(D_j)$ and $Z = \Sigma_{X_1, \ldots, X_N} \tilde{P}_\Phi(X_1, \ldots, X_N)$. In general, $\tilde{P}_\Phi(X_1, \ldots, X_N)$ is an unnormalized distribution and the partition function Z is used to normalize it. For most MRFs, the partition function is notoriously difficult to compute.

If the sum of the log factors is substituted into Equation (25), then it is recognizable as the Gibbs equation, which is in fact the form of the joint probability for any MRF. The log of a factor is generally referred to as a potential function. Thus, $$P_\Phi(X_1, \ldots, X_N) = \frac{1}{Z} \cdot \prod_{j=1}^{K} \phi_j(D_j) \quad (26)$$

$$= \frac{1}{Z} \cdot \exp\left(\sum_{j=1}^{K} \log \phi_j(D_j)\right) \quad (27)$$

$$= \frac{1}{Z} \cdot \exp^{-E(X_1, \ldots, X_N)}, \quad (28)$$

where the energy function $E(X_1, \ldots, X_N) = \Sigma_{j=1}^{K} \log \phi_j(D_j)$.

A Boltzmann machine (BM) is an MRF where the factors between the random variables that compose the energy function have been restricted to linear functions. The random variables are also typically constrained to be binary and are differentiated by whether they are observed, called visible nodes, or unobserved, called hidden nodes. Therefore, the energy function is restricted to the form, $$E(H_1 = h_1, \ldots, H_M = h_M, V_1 = v_1, \ldots, V_N = v_N) = -\Sigma_{i=1}^{N} \Sigma_{j=1}^{M} W_{ij} v_i h_j - \Sigma_{i=1}^{N} a_i v_i - \Sigma_{j=1}^{M} b_j h_j - \Sigma_{j=1}^{M} \Sigma_{k=1}^{M} U_{jk} h_j h_k - \Sigma_{i=1}^{N} \Sigma_{k=1}^{N} V_{ik} v_i v_k \quad (29)$$

There are N visible variables and M hidden variables. Here, $W_{ij}$ are the connection weights between hidden nodes and visible nodes. The visible node bias terms are at and the hidden node bias terms are $b_i$. The parameters $U_{jk}$ and $V_{ik}$ are the connection weights between hidden nodes and the connection weights between visible nodes, respectively. The bias terms can also be cast as connection weights by including a node, whose value is always one, and connecting each other node to it via the bias connection. Even with these restrictions, BMs are capable of capturing complex distributions quite accurately. Unfortunately, it is very difficult to do learning efficiently in BMs. However, if additional assumptions are made about the structure of the network, the learning process can be greatly simplified and implemented efficiently.

In particular, if the visible and hidden random variables in a BM are separated into two disjoint sets such that the connections in the network are restricted to only involve variables from opposite sets, then learning can be implemented quite efficiently via approximate Markov chain Monte Carlo (MCMC) sampling methods. An MRF with this network topology condition is known as a restricted Boltzmann machine (RBM).

Figure 24:
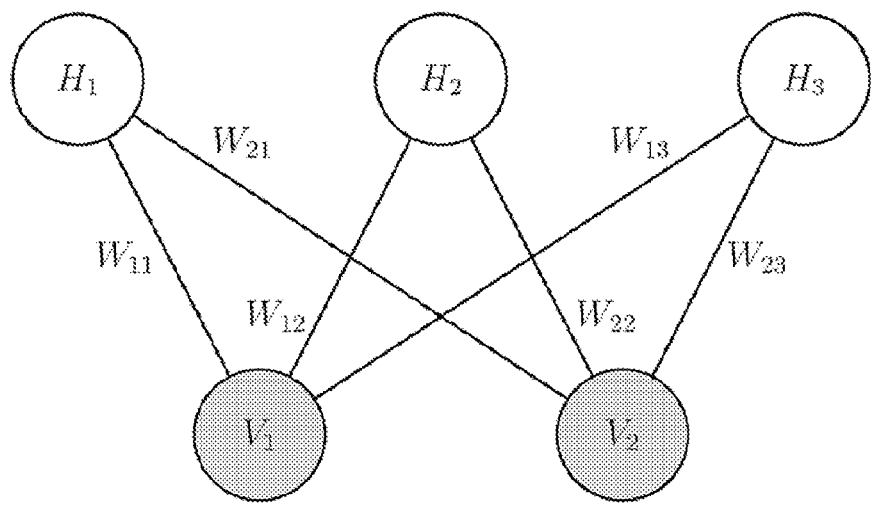
FIG. 24: Diagram of a simple RBM.

FIG. 24 illustrates a simple RBM, where the five nodes have been split into a group of three hidden nodes and two visible nodes. In this arrangement, the bipartite structure of an RBM, that restricts connections to only exist between the two sets, is evident. The reason this structure is critical for efficiently implementing learning algorithms is that all of the nodes in one set are independent of each other given all the nodes in the other set. This allows for blocked sampling algorithms that can sample an entire set of variables at once, given the other set of variables. Without the independence structure asserted by the restricted connections, sampling each node would generally be a serial process.

Given the bipartite structure restricting the connections between the hidden and visible random variables, the energy function of an RBM is, $$E(H_1=h_1, \ldots, H_M=h_M, V_1=v_1, \ldots, V_N=v_N) = -\sum_{i=1}^{N}\sum_{j=1}^{M} W_{ij} v_i h_j - \sum_{i=1}^{N} a_i v_i - \sum_{j=1}^{M} b_j h_j \quad (30)$$

Here, $W_{ij}$ are the connection weight parameters between the ith node in the visible set and the jth node in the hidden set. The visible bias parameters are $a_i$ and the hidden bias parameters are $b_j$. In summary, the parameters for an RBM are $\theta=(W, a, b)$.

Although RBMs are just a particular type of MRF, they are often used as building blocks in neural network models because they can be interpreted as the connections between two layers of neurons. Historically, the visible set of random variables is labeled as such because those are the random variables that are mapped to input features of the data. Then, the hidden random variables are trained to turn on and off the connection weights such that correlations between visible feature nodes are learned by the RBM.

In Section 2, the RBM is extended to include a notion of temporal history, called a conditional restricted Boltzmann machine (CRBM). In Section 3, the restriction to binary random variables is relaxed, allowing the visible layer to represent real-valued input. However, the hidden random variables are still restricted to binary values. In Section 4, multiple CRBM layers are combined in a hierarchy to form a conditional deep belief network (CDBN), where the output of the first layer is used to train the second layer.

2. Conditional Restricted Boltzmann Machine

Figure 25:
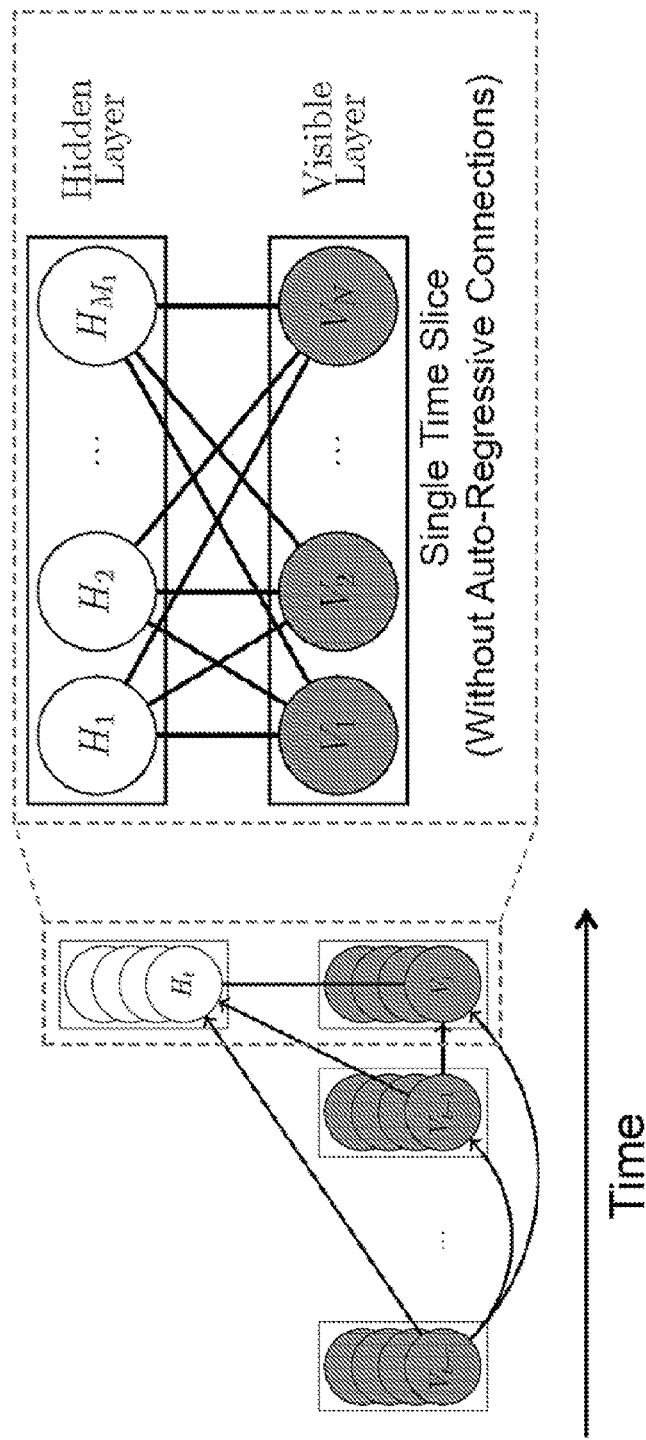
FIG. 25: Diagram of a CRBM.

The conditional restricted Boltzmann machine (CRBM) is an extension of the RBM that incorporates a temporal history. Consider a single input vector $v_t \in \{0,1\}^N$ at time step t. The vector contains N features, which are mapped to the visible random variables $V_t$ in the current time slice. There are undirected connections between these visible units and the hidden units $H_t \in \{0,1\}^M$. Alone, these connections form an unaltered RBM for the input vector at time step t. However, the CRBM incorporates additional directed autoregressive connections from the input vectors at the $\tau$ previous time steps. This necessitates a temporal sequence to the input data. The variable $\tau$ indicates the size of the temporal history buffer used by the CRBM and is referred to as the autoregressive order of the model. FIG. 25 illustrates the graphical architecture of the model.

The autoregressive directed connections from previous visible time steps to both the current visible units $V_t$ and the current hidden units $H_t$ in the CRBM can be thought of as dynamic biases. Given the temporal history $V_{t-\tau}, \ldots, V_{t-1}$, then the energy function of the CRBM is $$E(V_t=v_t, H=h_t | V_{t-1,\ldots,t-\tau}=v_{t-1,\ldots,t-\tau}) = \underbrace{-\sum_{i=1}^{N}\sum_{j=1}^{M} W_{ij} v_i h_j}_{\text{Undirected Connections}} - \underbrace{\sum_{i=1}^{N}\left(a_i + \sum_{k=1}^{\tau} A_{ji} v_{t-k}\right) v_i}_{\substack{\text{Visible to Visible} \\ \text{Autoregressive Connections} \\ \text{Visible Biases}}} - \underbrace{\sum_{j=1}^{M}\left(b_j + \sum_{k=1}^{\tau} B_{ji} v_{t-k}\right) h_j}_{\substack{\text{Visible to Hidden} \\ \text{Autoregressive Connections} \\ \text{Hidden Biases}}}. \quad (31)$$

Note that $v_t=v_1, \ldots, v_N$ and $h_t=h_1, \ldots, h_M$. As the temporal history is given, the contribution of the directed autoregressive connections can be directly computed and added to the appropriate bias terms. The parameters of a CRBM are $\theta=(W, a, b, A, B)$, where the autoregressive connection weights are actually sets of weights, one matrix for each time step in the buffer.

3. Accommodating Real-Valued Input

One way of accommodating real-valued random variables in the set of visible nodes is the Gaussian CRBM (GCRBM). The energy function of the GCRBM, $$E(V_t=v_t, H=h_t | V_{t-1,\ldots,t-\tau}=v_{t-1,\ldots,t-\tau}) = \frac{1}{2}\sum_{i=1}^{N}\frac{\left(v_i - a_i - \sum_{k=1}^{\tau} A_{ki} v_{t-k}\right)^2}{\sigma_i^2} - \sum_{i=1}^{N}\sum_{j=1}^{M} W_{ij}\frac{v_i}{\sigma_i^2} h_j - \sum_{j=1}^{M}\left(b_j + \sum_{k=1}^{\tau} B_{kj} v_{t-k}\right) h_j, \quad (32)$$

is derived in a similar manner to the RBM.

In principle, the parameters $\sigma_i$ can be learned during training, but it is not a straightforward procedure. In practice, it may be preferable to normalize the features of the input data so that they are each zero-mean and have a standard deviation $\sigma_i=1$.

4. Conditional Deep Belief Network

In order to learn more complex distributions, RBMs are often stacked in layers such that the hidden random variables in the first layer are the visible random variables in the second layer. This procedure can include many layers stacked on top of each other and is called a deep belief network (DBN).

Figure 26:
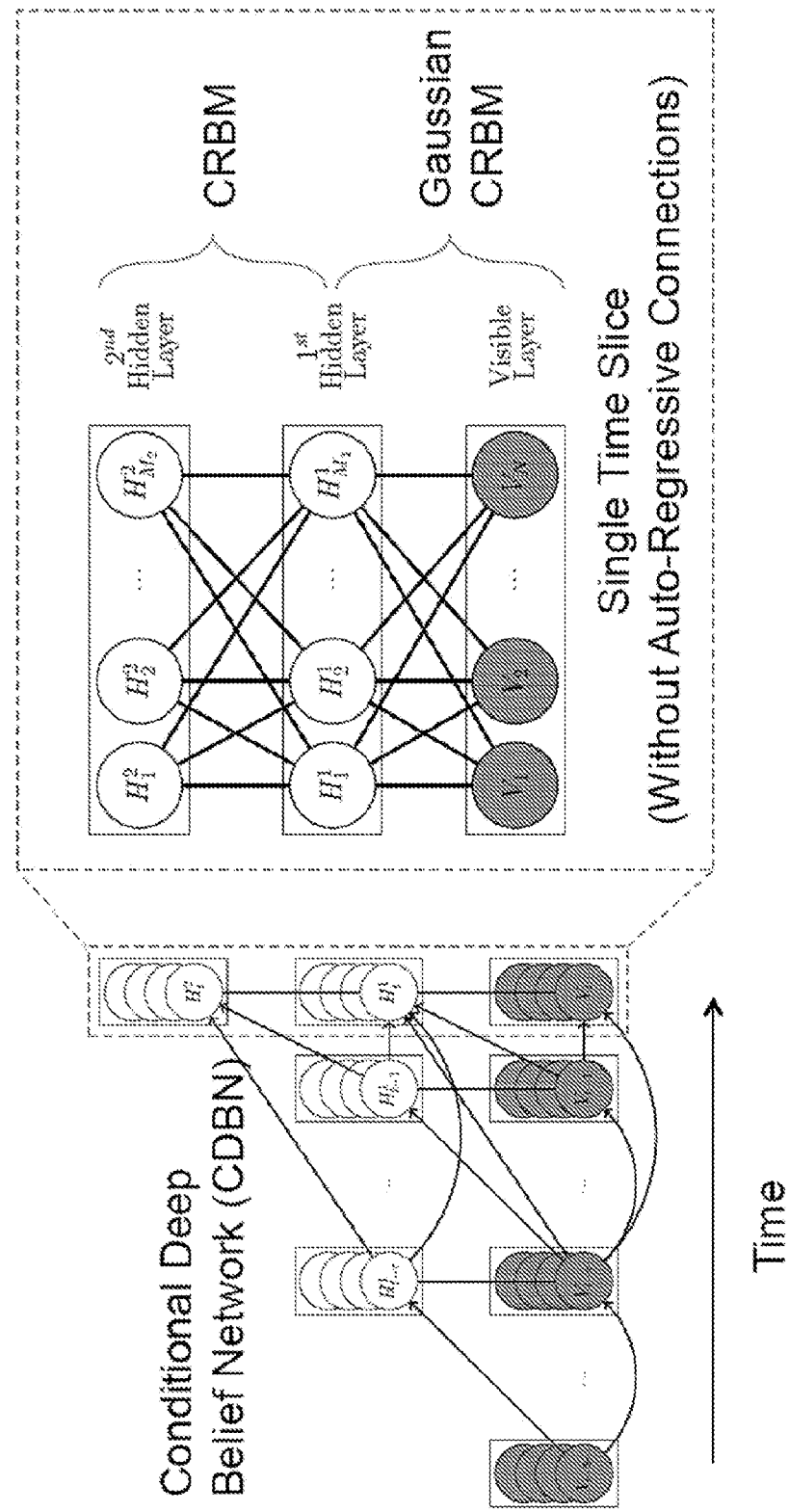
FIG. 26: Diagram of a CDBN.

The same procedure applies to CRBMs. In this work, two layers, which is the simplest model that can learn hierarchical representations, are used. FIG. 26 illustrates the architecture of the Conditional DBN (CDBN). The bottom layer is a GCRBM, while the second layer is regular binary CRBM. Note that if any more layers were included in the CDBN, they would also be binary CRBMs so that the hidden layer of the lower CRBM is compatible with the visible layer of the CRBM on top of it.

Another aspect of the CDBN is the temporal history buffer required to support multiple layers. In FIG. 26, each layer has the same autoregressive order, i. In general, each layer could have a different autoregressive order. However, the overall temporal buffer required to support all of the layers is the sum of the autoregressive orders for each layer. The reason is that a sufficient buffer must exist to support enough time steps in the first hidden layer so that there is enough of a temporal buffer for the second hidden layer. This results in a temporal "fanout" in terms of the number of buffered time steps in each layer. This is of practical concern because most sequential data is collected as a time series. Therefore, the first samples cannot be used to train the model because they do not have enough previous samples to support the required temporal buffer. In the case of FIG. 26, the first $2\times\tau$ data points are not eligible to train the model.

5. Training Model Parameters

Usually the parameters of a probabilistic graphical model are trained using maximum likelihood estimation (MLE). Unfortunately, there is no analytical MLE solution for the parameters of the Gibbs distribution. In such cases, the usual approach is to fall back on gradient ascent and maximize the likelihood of the observed, or visible, units.

The joint probability of any MRF with observed visible nodes and unobserved hidden nodes is, $$P_\theta(V = v, H = h) = \frac{1}{Z}\exp(-E_\theta(V = v, H = h)), \quad (33)$$

where the partition function $Z=\tau_v, \tau_h, \exp(-E_\theta(V=v, H=h))$. In order to make the notation more concise, the realizations of the hidden and visible random variables are omitted from the remainder of the calculations in this section. The marginal distribution of the visible nodes is found by summing out the hidden variables in the joint distribution. This results in, $$P_\theta(V) = \sum_{h'} P_\theta(V, H) \quad (34)$$

$$= \frac{1}{Z}\sum_{h'}\exp(-E_\theta(V, H)).$$

The conditional distribution of the hidden nodes given the visible nodes is, $$P_\theta(V \mid H) = \frac{P_\theta(V, H)}{P_\theta(V)} \quad (35)$$

$$= \frac{\exp(-E_\theta(V, H))}{\sum_{h'}\exp(-E_\theta(V, H))}$$

The log-likelihood of the MRF is, $$\mathcal{L}_v(\theta) = \log(P_\theta(V)) \quad (36)$$

$$= \log\left(\sum_{h'}\exp(-E_\theta(V, H))\right) -$$

$$\log\left(\sum_{v'}\sum_{h'}\exp(-E_\theta(V, H))\right).$$

Taking the derivative of the log-likelihood yields, $$\frac{\partial}{\partial \theta}\mathcal{L}_v(\theta) = \quad (37)$$

$$\frac{\partial}{\partial \theta}\log\left(\sum_{h'}\exp(-E_\theta(V, H))\right) - \frac{\partial}{\partial \theta}\log\left(\sum_{v'}\sum_{h'}\exp(-E_\theta(V, H))\right) =$$

$$-\sum_{h'}P_\theta(H \mid V)\frac{\partial}{\partial \theta}E_\theta(V, H) + \sum_{v'}\sum_{h'}P_\theta(V, H)\frac{\partial}{\partial \theta}E_\theta(V, H) =$$

$$-\sum_{h'}P_\theta(H \mid V)\frac{\partial}{\partial \theta}E_\theta(V, H) +$$

$$\sum_{v'}P_\theta(V)\sum_{h'}P_\theta(H \mid V)\frac{\partial}{\partial \theta}E_\theta(V, H).$$

Note that both the joint distribution of the MRF and the conditional distribution of the hidden nodes given the visible nodes, both of which were defined earlier, end up being components of the derivative of the log-likelihood. Unfortunately, evaluating the first term of the log-likelihood requires iterating over all possible values of the hidden variables and the second term requires iterating over all possible values of both the hidden and the visible variables, is not tractable. To avoid this computational burden, Gibbs sampling is used to estimate the log-likelihood.

Due to the bipartite structure of the connections between the visible and hidden nodes in a CRBM, each of the hidden nodes are independent from each other given the visible nodes, and each of the visible nodes are independent from each other given the hidden nodes. Therefore, the conditional distributions of the CRBM factorize as $$P_\theta(H_t \mid V_t, \ldots, V_{t-\tau}) = \prod_{j=1}^{M} P(H_j \mid V_t, \ldots, V_{t-\tau}) \quad (38)$$

and $$P_\theta(V_t \mid H_t, V_{t-1}, \ldots, V_{t-\tau}) = \prod_{i=1}^{N} P(V_i \mid H_t, V_{t-1}, \ldots, V_{t-\tau}) \quad (39)$$

For the CRBM, these single node conditional densities are given by $$P(H_j \mid V_t, \ldots, V_{t-\tau}) = \sigma\left(\sum_{i=1}^{N} W_{ij}v_{t,i} + b_j + \sum_{k=1}^{\tau} B_{kj}v_{t-k}\right) \quad (40)$$

and $$P(V_j \mid H_t, V_{t-1}, \ldots, V_{t-\tau}) = \sigma\left(\sum_{j=1}^{M} W_{ij}h_j + a_i + \sum_{k=1}^{\tau} A_{ki}v_{t-k}\right), \quad (41)$$

where $\sigma(\cdot)$ denotes the sigmoid function.

Using these simplified distributions for the CRBM, the derivative of the log-likelihood with respect to the undirected connection weights is, $$\frac{\partial \mathcal{L}_{V=v}(\theta)}{\partial W_{ij}} = -\sum_{h'}P_\theta(H = h' \mid V = v)\frac{\partial E_\theta(V = v, H = h')}{\partial W_{ij}} + \quad (42)$$

$$\sum_{v'}\sum_{h'}P_\theta(V = v' \mid H = h')\frac{\partial E_\theta(V = v', H = h')}{\partial W_{ij}} =$$

$$\sum_{h'}P_\theta(H = h' \mid V = v)v_j h_i -$$

$$\sum_{v'}P_\theta(V = v')\sum_{h'}P_\theta(H = h' \mid V = v')v_i h_j =$$

$$P_\theta(H_j = 1 \mid V = v)v_i - \sum_{v'}P_\theta(V = v')P_\theta(H_j = 1 \mid V = v')v_i,$$

where the realizations of the random variables have been specified to avoid confusion with respect to the summations. Note that this derivation assumes binary valued random variables. The derivative of the log-likelihood can be computed in a similar manner for the CRBM bias parameters. This is the derivative for a single training example v. Given a full set of training data, $\mathcal{D} = \{v_1, \ldots, v_D\}$, that has D examples, the derivative of the undirected connection weights is, $$\frac{1}{D}\sum_{v' \in \mathcal{D}}\frac{\partial \mathcal{L}_{V=v'}(\theta)}{\partial W_{ij}} = \quad (43)$$

$$\frac{1}{D}\sum_{v' \in \mathcal{D}}\left(\mathbb{E}_{P_\theta(H=h \mid V=v')Q(V=v')}[v_i h_j] - \mathbb{E}_{P_\theta(V=v, H=h)}[v_i h_j]\right),$$

where the distribution $Q(V=v')$ is the true, but unknown distribution of the training data. Unfortunately, this the second term is still to difficult to sample from because it would require running a Gibbs sampling chain until it converges to the true distribution of the CRBM, $P_\theta(V, H)$.

Fortunately, Hinton developed an approximation for the second term computed using samples from the CRBM after just k iterations of blocked Gibbs sampling. The approximation works well in practice for training the CRBM parameters with gradient ascent. In fact, RBMs are often trained with a single sampling step such that k=1. This approximation for the log-likelihood gradient is known as the k-step contrastive divergence (CD-k), defined by $$CD_k(\theta, v^{(0)}) = -\sum_h P_\theta(H=h|V=v^{(0)})\frac{\partial E_\theta(V=v^{(0)}, H=h)}{\partial \theta} + \sum_h P_\theta(H=h|V=v^{(k)})\frac{\partial E_\theta(V=v^{(k)}, H=h)}{\partial \theta}. \quad (44)$$

Here the superscript $(0, \ldots, k)$ denotes the number of sampling steps required to produce a particular sample. Samples are produced by initializing $v^0$ to a training example $v \in D$. Then Equations (40) and (41) can be used iteratively to generate the sequence of samples $$v^{(0)} \Rightarrow h^{(1)} \Rightarrow v^{(1)} \Rightarrow h^{(2)} \Rightarrow v^{(2)} \Rightarrow \ldots \Rightarrow h^{(k)} \Rightarrow v^{(k)}. \quad (45)$$

Using CD-k, iterative gradient ascent to update the parameters of the CRBM can be performed according to the following update rule, $$\theta^{(t+1)} = \theta^{(t)} + \overbrace{\underbrace{\eta CD_k(\theta, v^{(0)})}_{\text{Contrast Divergene Gradient Approximation}} + \underbrace{\lambda \theta^{(t)}}_{\text{Weight Decay}} + \underbrace{\nu \Delta \theta^{(t-1)}}_{\text{Momentum}}}^{\Delta \theta^{(t)}} \quad (46)$$

These parameter updates include a weight decay regularization term and a momentum term that promotes larger step sizes in areas where the gradient is large.

In practice, the standard approach to unsupervised training in a CDBN is to train the parameters of each CRBM layer one at a time in a greedy fashion. The first layer to be trained is the bottom layer that interfaces directly with the features in the training set D. Equation (46) is used to update the parameters for a set number of iterations, or epochs, through the training set. Once the parameters for the first layer are trained they are held fixed. The training set is then propagated through the first layer to produce a transformed training set that is used to train the parameters of the second layer in the same way as those of the first. This procedure is repeated until all layers of the CDBN are trained.

6. Hallucinating Novel Doppler Modulations from Ultrasound

In order to use the CDBN to generate, or hallucinate, novel examples of motions, a network is trained on data from the JHUMMA dataset for a set of actions. In principle, a network could be trained on the entire dataset, but the real valued visible units in the Gaussian CRBM have difficulty modeling the variation across all twenty-one actions and thirteen trials in the dataset. In order for the real-valued data to be processed by the Gaussian CRBM, each feature is normalized across the training data to a standard normal. Unfortunately, this representation is not the best model for the variability in the data across entire JHUMMA dataset. Therefore, smaller models were trained to demonstrate the capabilities of the system on smaller subsets of actions, where the variability is less extreme.

Once a CDBN is trained, generating a new sequence from the distribution simply requires a seeded history buffer. By buffering with data from a particular action, it is highly likely that the hallucinated sequence will correspond to that action, although there is nothing preventing the model from switching to another action that it was trained on. Once the buffer is fixed, blocked Gibbs sampling is used to generate a novel sequence from the distribution encoded by the CDBN. This procedure uses the same sampling equations described in Section 5 to iteratively update the visible and hidden layers. For all of the generated sequences shown in this section, thirty iterations of blocked Gibbs sampling were used to hallucinate the visible layer at each time step.

Figure 27:
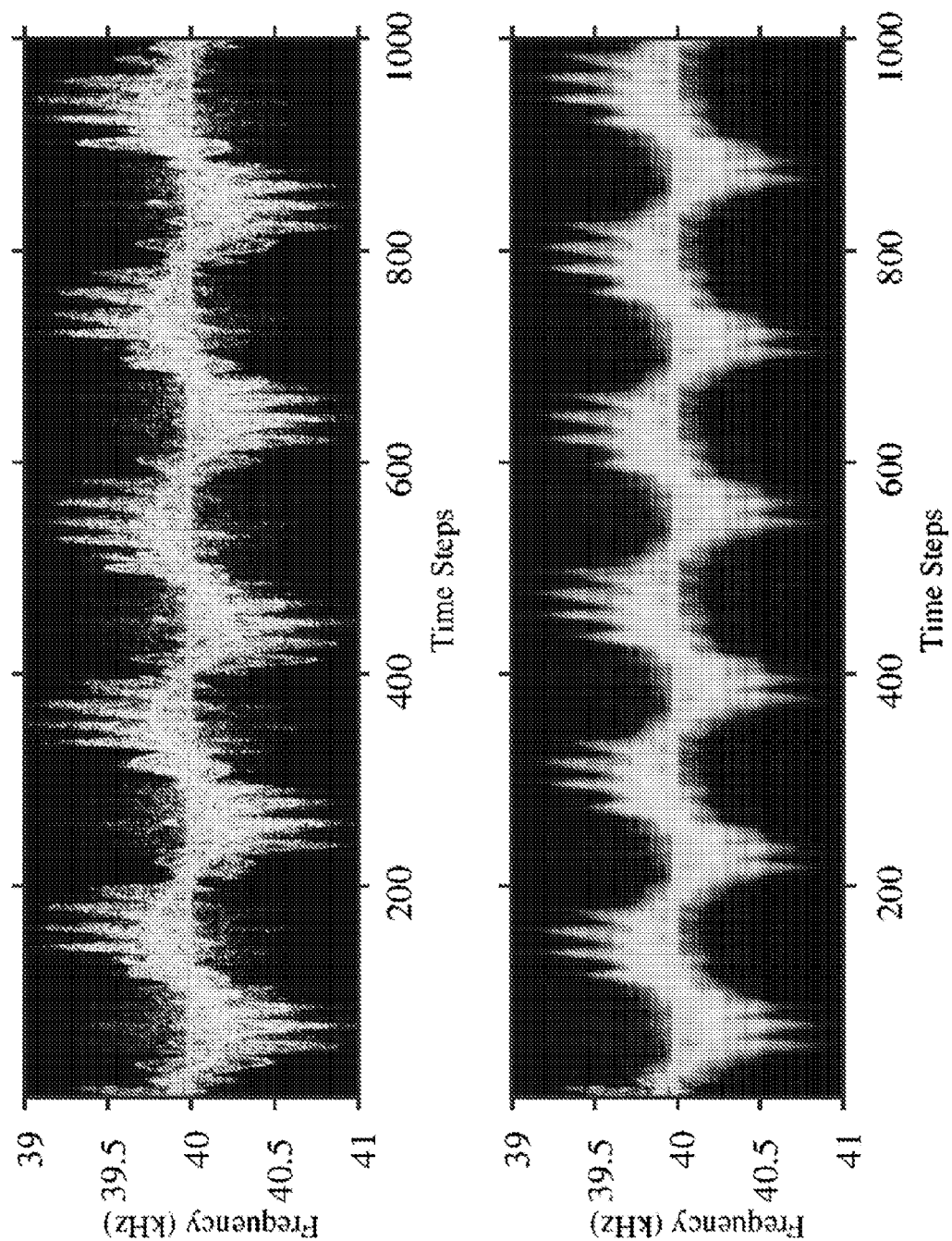
FIG. 27: The top spectrogram shows a recorded ultrasound sequence of walk and pivot data. The first fourteen frames were used to seed the CRBM and sampling the model produced the hallucination shown in the bottom spectrogram.

The lower spectrogram of FIG. 27 shows a sequence of ultrasound modulations generated from a two layer CDBN trained on 40 kHz ultrasound data. The autoregressive order of the CDBN was set to $\tau=7$ time steps. Both layers shared the same autoregressive order, so the model was seeded with the first 14 spectrogram slices of the 40 kHz ultrasound test sequence shown in the upper spectrogram of FIG. 27. The visible layer was composed of 328 real-valued nodes that map directly to the spectrogram frequency bins. Each of the two hidden layers contained 300 binary nodes. The model parameters were trained on 3,790 spectrogram slices of the "walk and pivot" action from the JHUMMA dataset. These slices were pulled from two trials of the same actor.

FIG. 27 demonstrates that the CDBN model does a significantly better job of modeling long-term temporal correlations than an exemplary HMM model developed. Due to the finite state space limitations of the HMM, the state space would have to grow very large to accommodate the same temporal history and still represent the set of skeletal poses well.

With only a very short window of seed data, the CDBN model recognizes the walking pattern and is able to hallucinate a reasonable set of modulations. In particular, it accurately captures the overall cadence of the walking motion and the back and forth movement of the torso. However, it fails to maintain the proper number of sub modulations in each period of the walking motion. This is akin to adding or subtracting limbs from the human. By incorporating a physical notion of the human body, it should be possible to avoid these types of errors.

7. Hallucinating Novel Doppler Modulations from Skeletal Sequences

Figure 28:
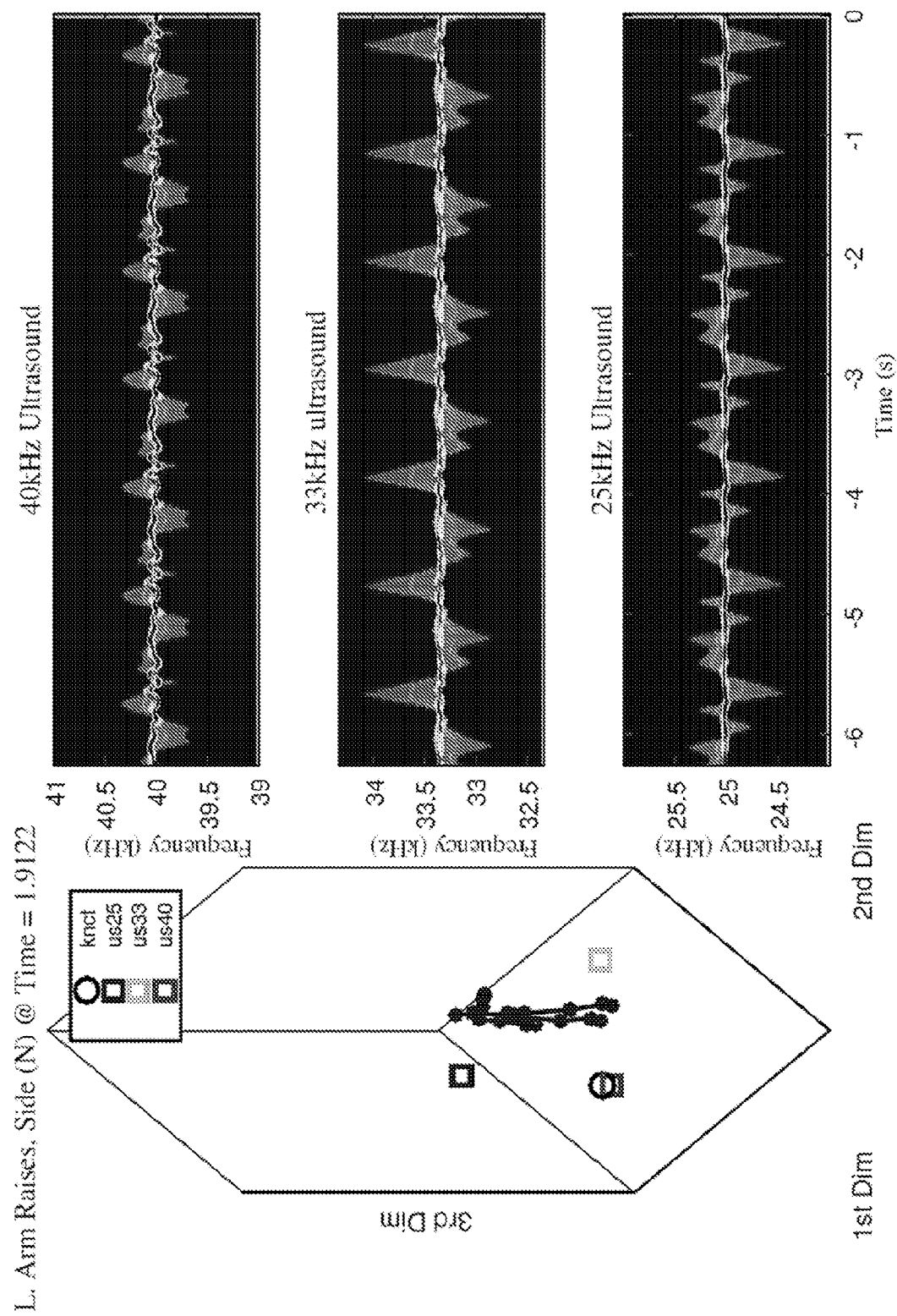
FIG. 28: Three simulated ultrasound modulations of left arm raises to the side. They were generated by a CDBN trained to model the skeletal motions for these actions and then processed through the Doppler-physics model.

FIG. 28 shows a sequence of ultrasound modulations generated from a two layer CDBN trained on kinect data for the side arm raise actions from the JHUMMA dataset. The output of the CDBN was then processed by a Doppler-physics model. The autoregressive order of the CDBN was set to $\tau=7$ time steps. Both layers shared the same autoregressive order, so the model was seeded with 14 skeletal poses. Each of the two hidden layers contained 500 nodes. All 57 rotation features, plus the three translation parameters for the skeleton were learned by the CDBN. The model was trained on 1,961 skeletal poses derived from both the left and right "arm raises" for a single actor, but seeded with a buffer of left arm raises.

The hallucination produced by the model is remarkable stable over many repetitions. Due to the relative simplicity of the skeletal pose representation, the distribution learned by the CDBN is able to produce a skeletal sequence that approximates the action well. By running the Doppler-physics model three times, where each simulation is configured to mimic one of the three ultrasound sensors used in the JHUMMA dataset, the combination of the two models is able to predict the acoustic modulations for a novel action.

Figure 29:
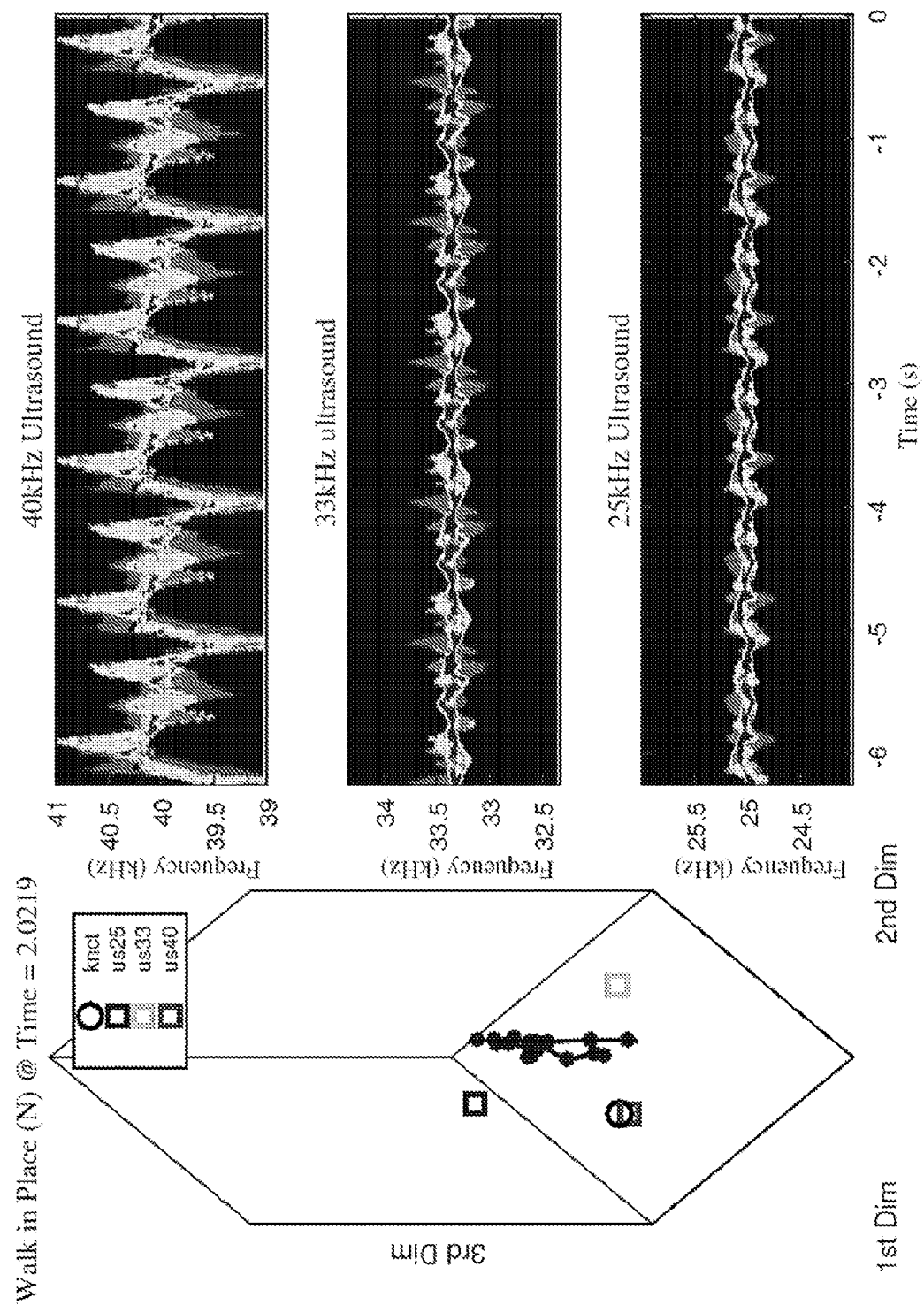
FIG. 29: Three simulated ultrasound modulations of walking in place. They were generated by a CDBN trained to model the skeletal motions for these actions and then processed through the Doppler-physics model.

FIG. 29 shows a sequence of ultrasound modulations generated from a two layer CDBN trained on Kinect data for the walk-in-place action from the JHUMMA dataset. The model parameters were identical to those described for the arm raise model. The model was trained on 5,150 skeletal poses derived from both "walking in place" and "walking forwards and backwards" for a single actor, but seeded with a buffer of the "walking in place" action.

Figure 30:
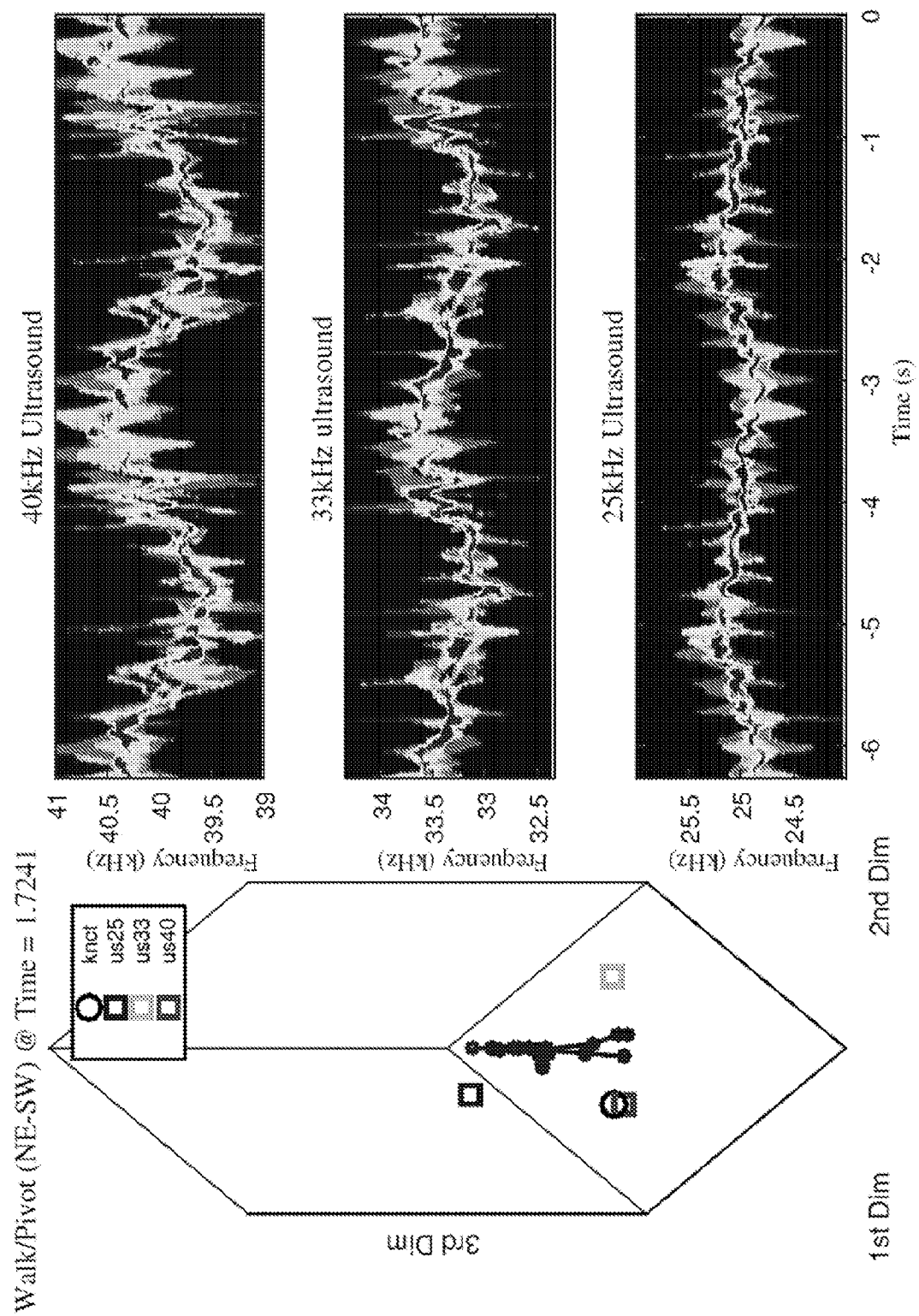
FIG. 30: Three simulated ultrasound modulations of walking and pivoting. They were generated by a CDBN trained to model the skeletal motions for these actions and then processed through the Doppler-physics model.

FIG. 30 shows a sequence of ultrasound modulations generated from a two layer CDBN trained on Kinect data for the walk-in-place action from the JHUMMA dataset. The model parameters were identical to those described for the arm raise model. The model was trained on 3,790 skeletal poses derived from "walk and pivoting" for a single actor.

The CDBN trained on skeletal frames does a much better job of learning the sequence of individual limb actions for the walking motion. This results in a much more consistent sequence of long-term modulation patterns than the CDBN trained on the ultrasound data.

8. Configuring Limb Lengths

Figure 31:
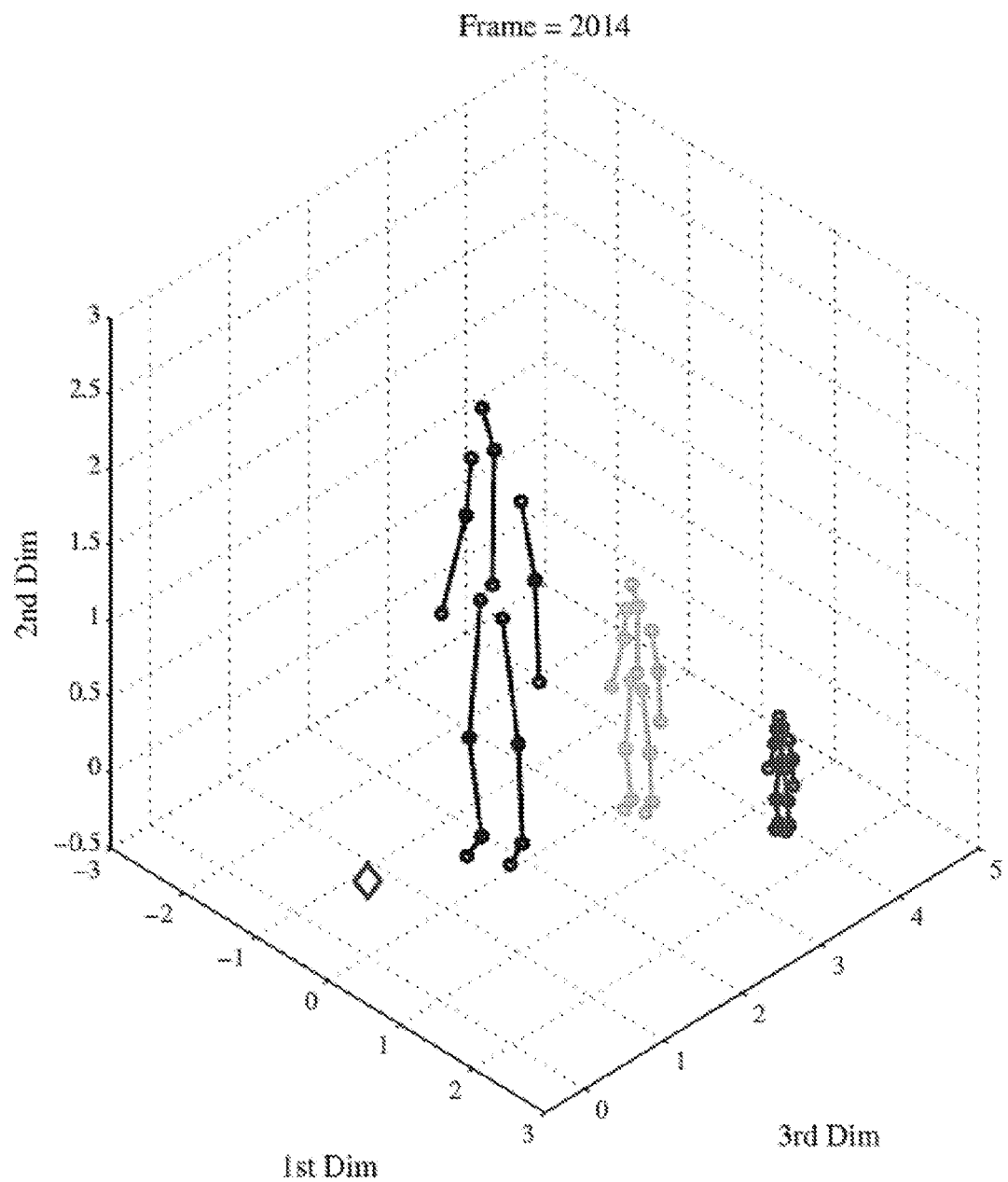
FIG. 31: Sequence of skeletal walking data hallucinated by a CDBN trained on Kinect skeletal frames. Two additional sequences were generated by doubling and halving the original limb lengths of the human body model.
Figure 32:
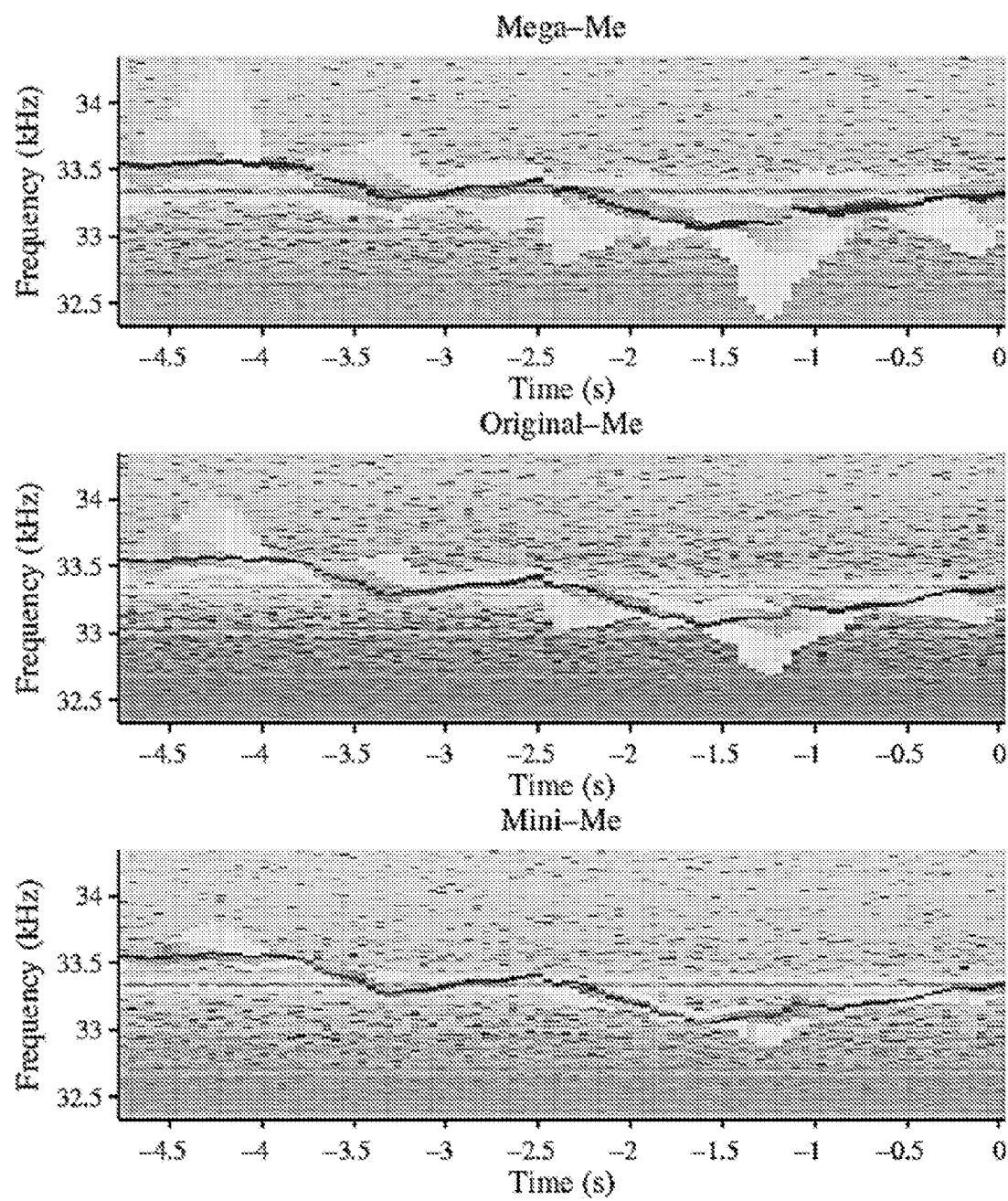
FIG. 32: The ultrasound modulations generated by the physics-based model of a human walking in FIG. 31.

One of the advantages to building a CDBN that learns the underlying skeletal representation is having access to configurable parameters like the human lib lengths. The CDBN has simply learned the relative rotations of the limbs, so adjusting the limb lengths allows for the model to be adapted to mimic people of different sizes. FIG. 32 shows the results from doubling and halving the original limb lengths (see FIG. 31) for a walking sequence hallucinated by the CDBN. The associated spectrograms show the output of the Doppler-physics model given each of the three skeleton models. The scaling on the spectrograms is different because it was derived from a demonstration of the Doppler-physics model and a CDBN trained on an older dataset that was not part of the JHUMMA and used a different noise model to scale the background of the Doppler-physics model. However, the implementation of the Doppler-physics model is otherwise identical.

The skeleton with the longest limbs generates the fastest limb velocities because it has to move its limbs a longer distance in the same time period. The Doppler modulations predicted by the physics model have correspondingly larger magnitudes. Conversely, the smaller skeleton has slower limb velocities, which result in smaller Doppler modulations.

Long Short-Term Memory Exemplary Embodiment

I. Introduction

Human actions occur in three-dimensional space and evolve over time. Most actions of note involve complicated sequences of simple motions. Classifying these actions requires systems capable of learning the time dependencies between these simpler motions in a high-dimensional setting. In this section, we present LSTM- and HMM-based action recognition systems using micro-Doppler signals. Exemplary experiments utilized data from the Johns Hopkins University MultiModal Action (JHUMMA) dataset. As discussed above, the dataset contains both Microsoft Kinect and micro-Doppler recordings of a set of twenty-one actions performed by different actors. In both the HMM and LSTM classification systems only the micro-Doppler recordings were used for classification. However, the HMM system relied on the Microsoft Kinect sensor data for training while the LSTM system did not. We found that the LSTM-based systems outperform the HMM based classifiers.

II. Dataset

Figure 33:
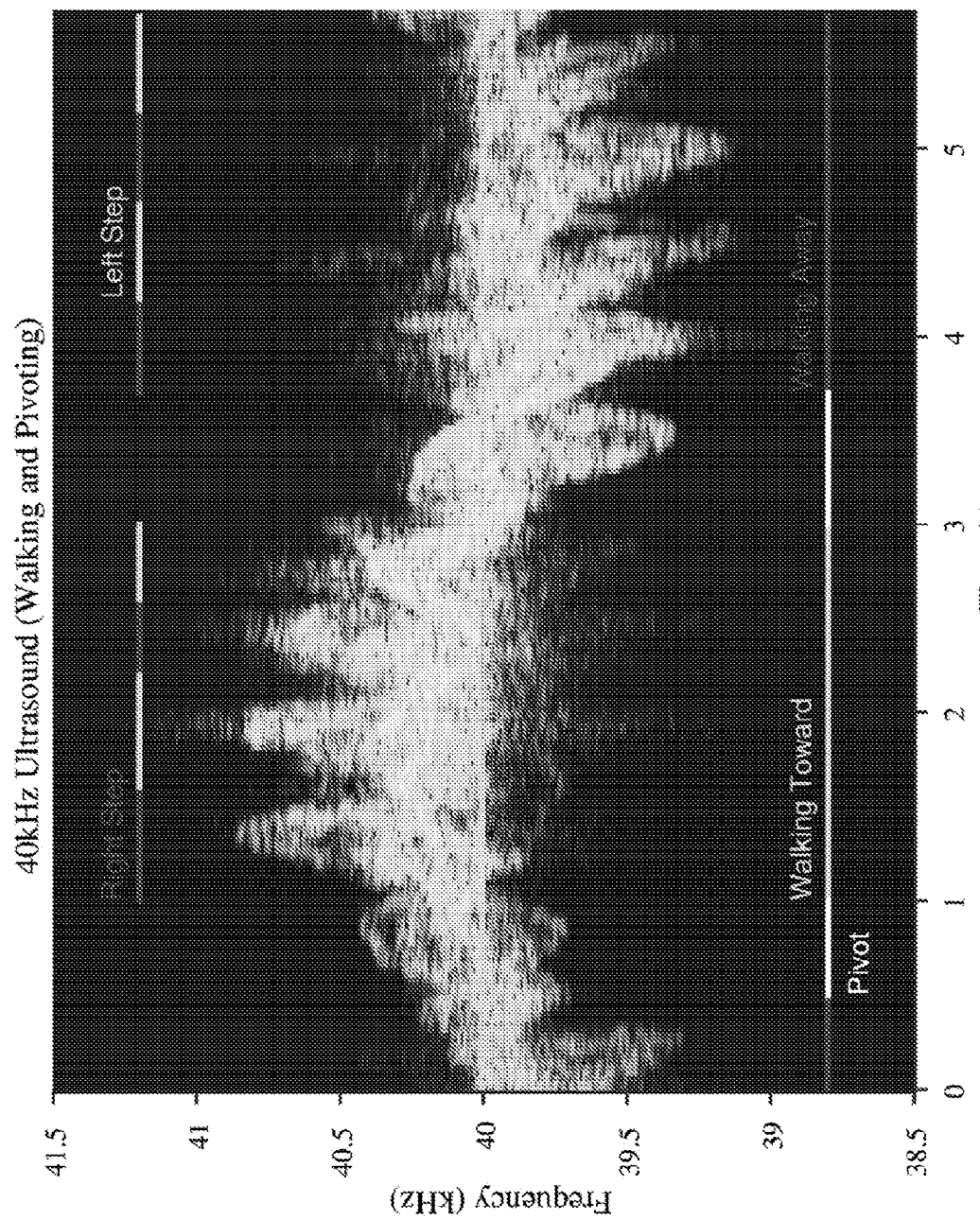
FIG. 33: Annotated spectrogram representation of Doppler modulations for a human walking toward an ultrasound sensor, pivoting, and walking back away from it.

The shift in frequency observed when either the source or observer of a sound is moving is known as the Doppler Effect. If the object itself contains moving parts, each part contributes its own Doppler shift proportional to the object's radial velocity component with respect to the receiver. All of the scattered waves are additive, and the resulting modulation is a superposition of the individual components known as the micro-Doppler effect. The micro-Doppler effect results in a reflected signal that is a combination of frequency, amplitude, and phase modulation. By applying a short-term Fourier transform (STFT), the changes in frequency are more readily apparent. FIG. 33 shows an example taken from the JHUMMA of a micro-Doppler spectrogram of a human actor walking and pivoting.

The JHUMMA dataset used in this disclosure contains micro-Doppler signatures from three ultrasound sensors as well as Microsoft Kinect RGB-D data. From the Kinect data, only the skeletal data component was used. A schematic of the individual sensor locations is shown in FIG. 4. All actions were performed within a demarcated bounding box referenced to a virtual north. This area was located on a large open stage to minimize uninteresting reflections from nearby objects. The three ultrasound sensors emitted frequencies at 25 kHz, 33 kHz, and 40 kHz, and were located to the east, west, and north of the bounding box, respectively. A Kinect sensor was placed directly on top of the 40 kHz ultrasound sensor. The STFT was applied to waveforms recorded from each sensor. The STFT representation was band-limited to 1.5 kHz above and below the carrier frequency, resulting in 327, 328, and 328 spectrogram frequency bins respectively. The twenty-one actions recorded in the JHUMMA dataset are enumerated in Table III along with their orientations in the bounding box. These actions were recorded by thirteen actors. However, thirty repetitions are missing resulting in a total of 2,700 recorded actions.

TABLE III

Script of actions nominally demonstrated by each actor.

| Action | Orientation | Repetitions/Duration |
|---|---|---|
| Lunges | N | 10 Per Leg (Alternating) |
| Lunges | NE | 10 Per Leg (Alternating) |
| Lunges | NW | 10 Per Leg (Alternating) |
| L. Leg Steps | N | 10 |
| R. Leg Steps | N | 10 |
| L. Arm Raises, (Forward) | N | 10 |
| L. Arm Raises, (Sideways) | N | 10 |
| R. Arm Raises, (Forward) | N | 10 |
| R. Arm Raises, (Sideways) | N | 10 |
| Walk in Place | N | 20 Steps |
| Walk Facing Forward | N-S | 10 cycles |
| Walk Facing Sideways | W-E | 10 cycles |
| Walk and Pivot | NE-SW | 10 cycles |
| Walk and Pivot | NW-SE | 10 cycles |
| Jumping Jacks | N | 10 |
| Jump Rope | N | 10 |
| Body Squats | N | 10 |
| Jump Forward then Backward | N-S | 10 sets |
| Jump Forward then Backward | NE-SW | 10 sets |
| Jump Forward then Backward | NW-SE | 10 sets |
| Punch Forward | N | 10 Per Arm (Alternating) |

III. Methods

In non-limiting test embodiments, we trained four classifiers in total-two HMM-based and two LSTM-based. The HMM classifiers were trained using both spectrogram data from the ultrasound sensors and skeletal data from the Kinect sensor. The LSTM classifiers were trained using spectrograms alone. The classifiers were evaluated using two different cross validation schemes. The first divides the data set into five folds, where two repetitions of each action are set aside as test data for each user. The second cross validation scheme uses a leave one user out approach (LOUO) to ensure that classification generalizes to new users.

A. Hidden Markov Model

In our experiments, we used two HMM based models. In each model, the ultrasound spectrogram recordings were regarded as visible emissions and the skeletal positions recorded by the Kinect were regarded as latent states. Both the spectrograms and the skeletal positions were clustered using k-means. Thus, the emissions and latent states were both discrete.

We used a product of experts (POE) model as a baseline upon which to compare our experiments. In such a system, an HMM for each action is trained for each sensor. At test time, the clustered spectrogram recordings were shown to each model and the log-likelihood was found. Denoting the sequence of spectrogram clusters as X, and denoting the log-likelihoods of a $\mathcal{L}$ given action for the 25 kHz, 33 kHz, and 40 kHz, as $\mathcal{L}_a^{25}(X)$, $\mathcal{L}_a^{33}(X)$, and $\mathcal{L}_a^{40}(X)$ respectively, the action was classified using a product of experts decision rule as shown in Equation (47). Following the system described above, this system uses 200 skeletal clusters and 100 spectral clusters in each HMM model.

$$\hat{a} = \operatorname*{argmax}_{a}(\mathcal{L}_a^{40}(X) + \mathcal{L}_a^{33}(X) + \mathcal{L}_a^{25}(X)). \tag{47}$$

Noting that the POE baseline failed to discriminate between some diagonally oriented actions in previous experiments, an HMM system was trained using a concatenation of the spectrogram data for all sensors. It was hypothesized that this concatenation would enable the model to learn the coupling of forward-facing and lateral motion required to discriminate between diagonal directions. To accommodate the increased size of the concatenated spectrogram feature vector, 200 spectral k-means clusters were used in the stacked HMM system.

B. Long Short-Term Memory Model

Figure 34:
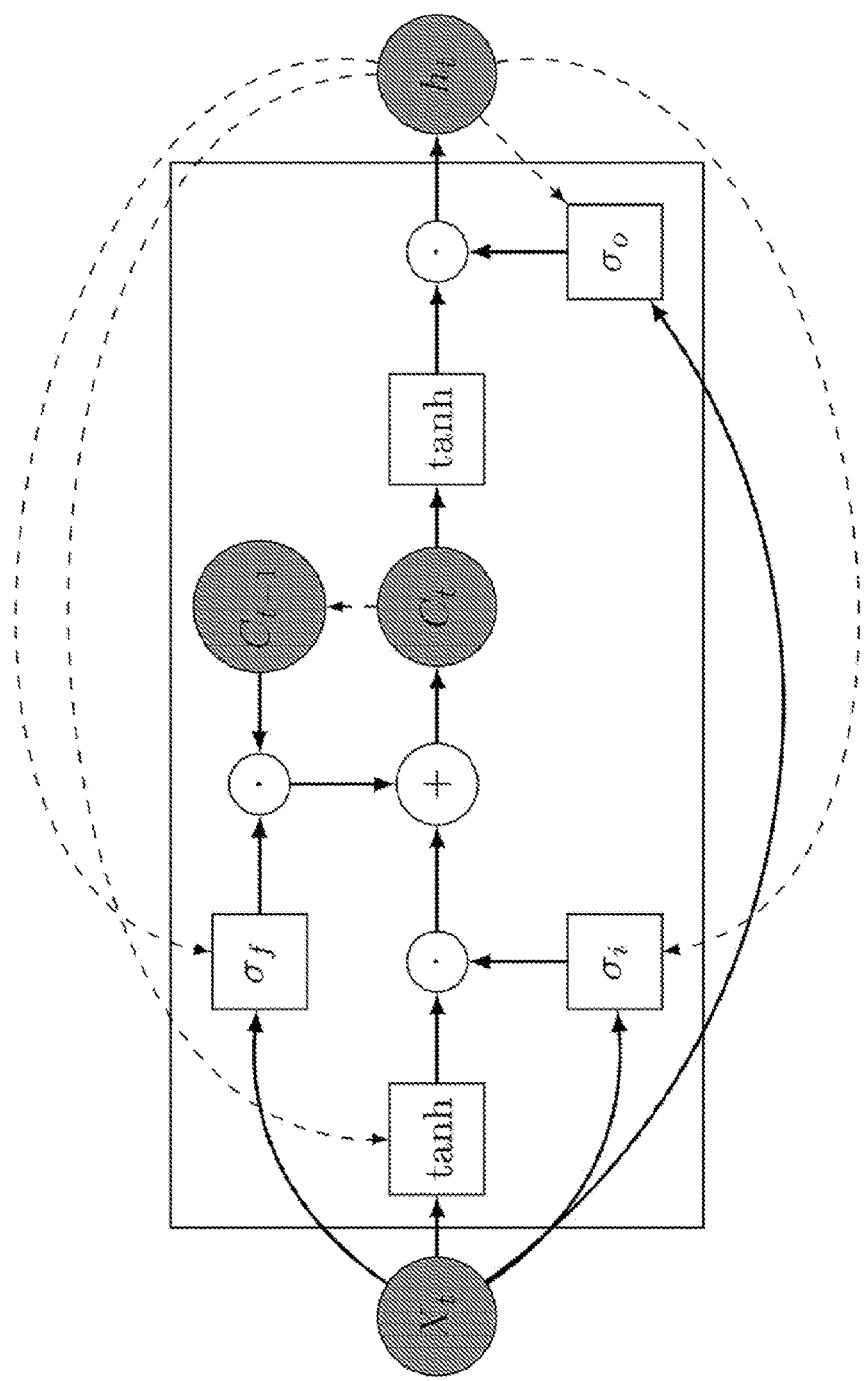
FIG. 34: Schematic of an LSTM node (dashed lines indicate a recurrent connection).
Figure 35:
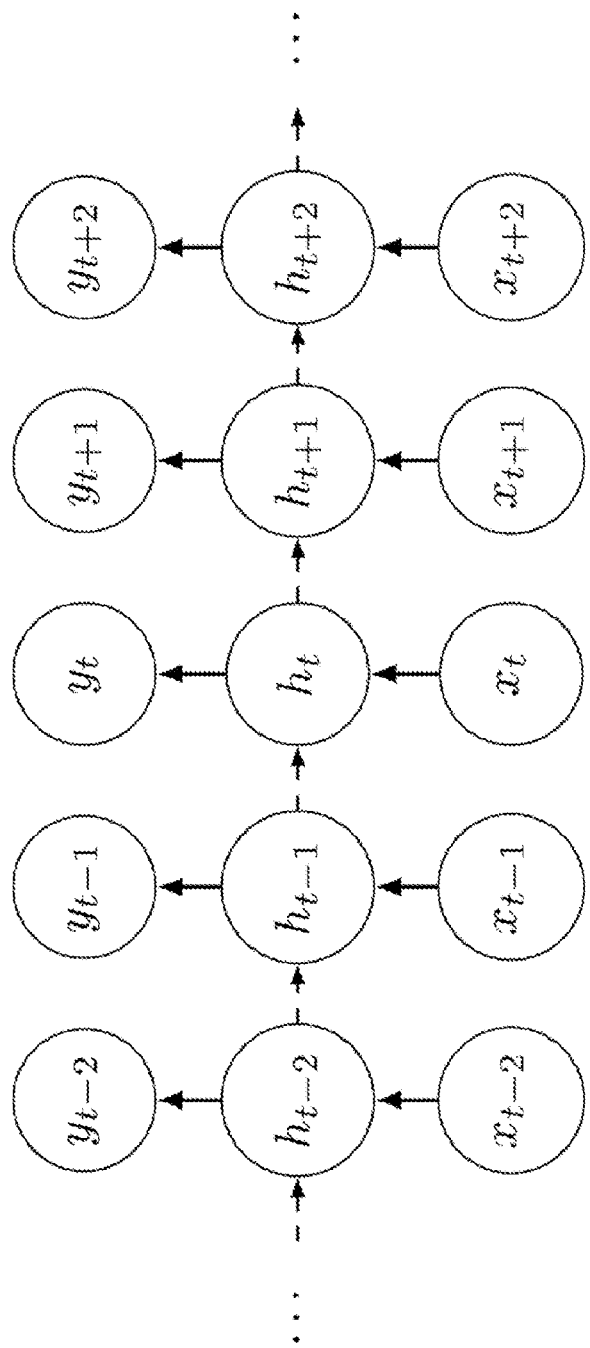
FIG. 35: Schematic of an LSTM network unrolled over time (dashed lines indicate a recurrent connection).

An LSTM model is a recurrent neural network architecture capable of learning complex dependencies across time. Equations (48)-(53) detail the procedure to update each node at a given timestep. In these equations $i_t$, $f_t$, and $o_t$ represent the value of the input, forget, and output gates, respectively. $\tilde{C}_t$ represents the update to the hidden state and $C_t$ represents the current hidden state. $h_t$ is the output of a given node. Each node of the LSTM network maintains a hidden state that is updated at each timestep. In addition, each node contains an input, output, and forget gate, capable of controlling the behavior of the node depending on the current value of the hidden state. This architecture is thus capable of learning time dependencies in the data that a feedforward neural net is incapable of learning. A schematic diagram of the LSTM node architecture is shown in FIG. 34. A diagram of an LSTM network with one hidden layer unrolled over time is shown in FIG. 35.

$$i_t = \sigma(W_i X_t + U_i h_{t-1} + b_i) \tag{48}$$

$$f_t = \sigma(W_f X_t + U_f h_{t-1} + b_f) \tag{49}$$

$$o_t = \sigma(W_o X_t + U_o h_{t-1} + b_o) \tag{50}$$

$$\tilde{C}_t = \tan h(W_c X_t + U_c h_{t-1} b_c) \tag{51}$$

$$C_t = i_t \cdot \tilde{C}_t + f_t \cdot C_{t-1} \tag{52}$$

$$h_t = o_t \cdot \tan h(C_t) \tag{53}$$

In test embodiments, we used a Keras implementation of an LSTM running on a Theano backend. In training, the normalized spectrogram was shown to the LSTM as well as the action label associated with the recording at each timestep. The skeletal pose data was not used. The training parameters used are shown in Table IV. We used the Adam optimizer with a dropout of 0.5. Each of the networks were trained for 200 epochs. A categorical cross entropy loss was used. Two exemplary LSTM networks were evaluated—a one-layer architecture with 1,200 hidden nodes, and a two-layer architecture with two 800 hidden node hidden layers.

TABLE IV

Training parameters for LSTM networks.

| Default Training Parameters | |
|---|---|
| Number of epochs | 200 |
| Seed | 1337 |
| Optimizer | Adam |
| Dropout | 0.5 |
| Max Sequence Length | 404 |
| Batch Size | 100 |

C. Cross-Validation

Two cross-validation schemes were used in our experiment. The first cross validation scheme divides the dataset into five folds. Whenever possible, two examples of each action performed by each user were placed into all folds. Each of the folds was used for testing once, while the remaining four were used in training. Thus, examples of each actor performing each action are present in both test and training sets. Noting the great degree of similarity in a given actor's set of performances of a single action, this potentially allows the classifiers to overfit to actor-specific performances. In order to test the ability of the classifiers to generalize to new actors, a leave-one-user-out cross validation scheme was also used. Each actor's data was used for testing once, while the remaining data was used for training. Given the thirteen total actors, this resulted in thirteen folds. In both cases, results reported in Table V have been averaged across all folds.

TABLE V

Classification accuracy for all models.

| Model | 5 Fold | LOUO |
|---|---|---|
| POE Baseline | 87.8889 | 67.963 |
| Stacked HMM | 93.6296 | 89.0 |
| LSTM 800 | 98.1852 | 95.6296 |
| LSTM 1200 | 97.5926 | 95.7037 |

IV. Results

A. Five Fold Cross Validation

Figure 36:
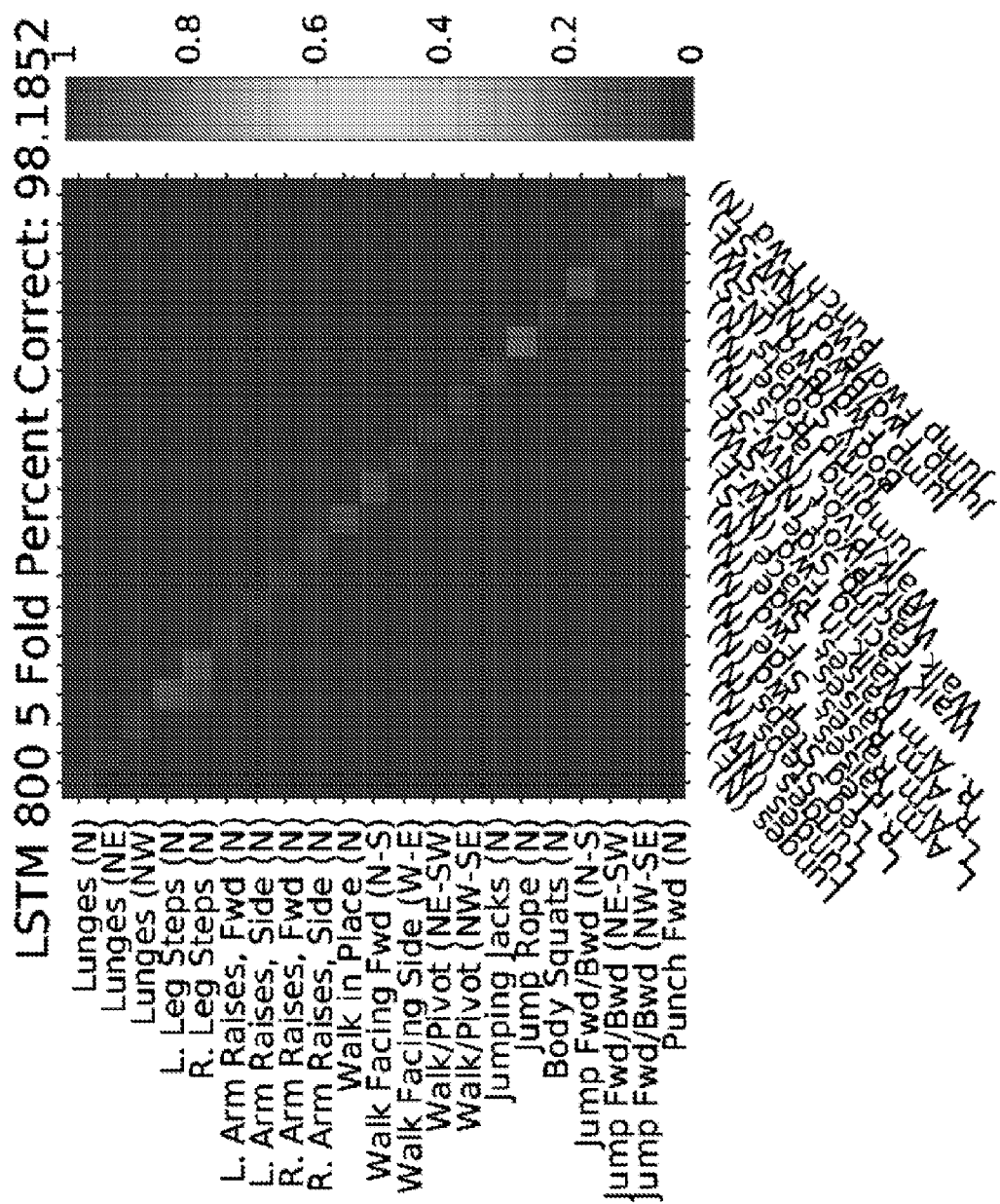
FIG. 36: Confusion matrix for LSTM with two 800 hidden node layers.
Figure 37:
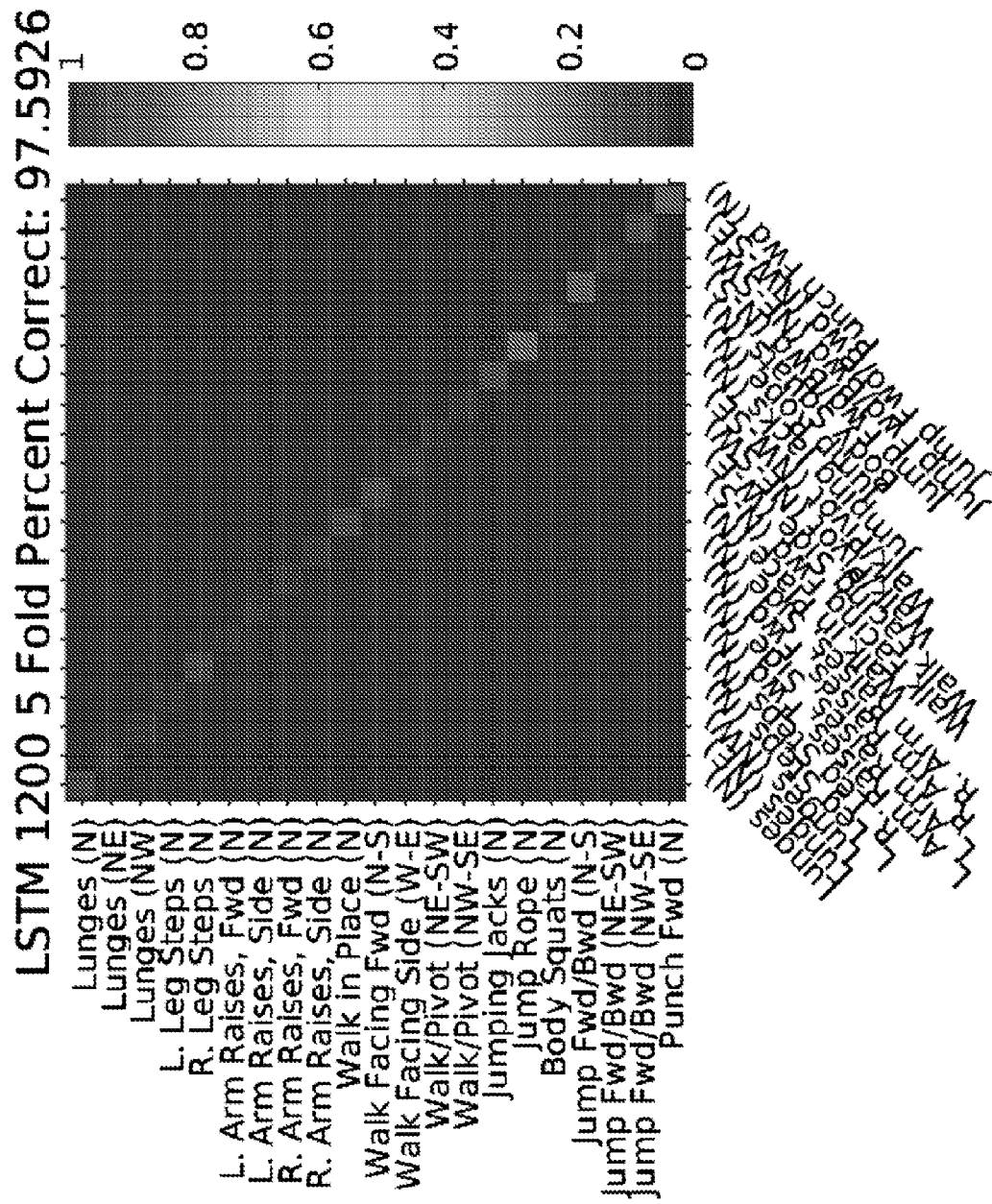
FIG. 37: Confusion matrix for LSTM with one 1200 hidden node layer.

Confusion matrices for the classification systems are shown in FIG. 36 and FIG. 37. The product of experts baseline model achieved a classification accuracy of 87.8889%, suffering from confusion in the diagonally oriented walk and pivot actions. This confusion was resolved in the stacked data HMM classifier, which achieved a classification accuracy of 93.6296%. The LSTM classifiers further outperformed the HMM POE baseline, with the two-layer LSTM 800 classifier achieving an accuracy of 98.1852%.

B. LOUO Cross Validation

Figure 38:
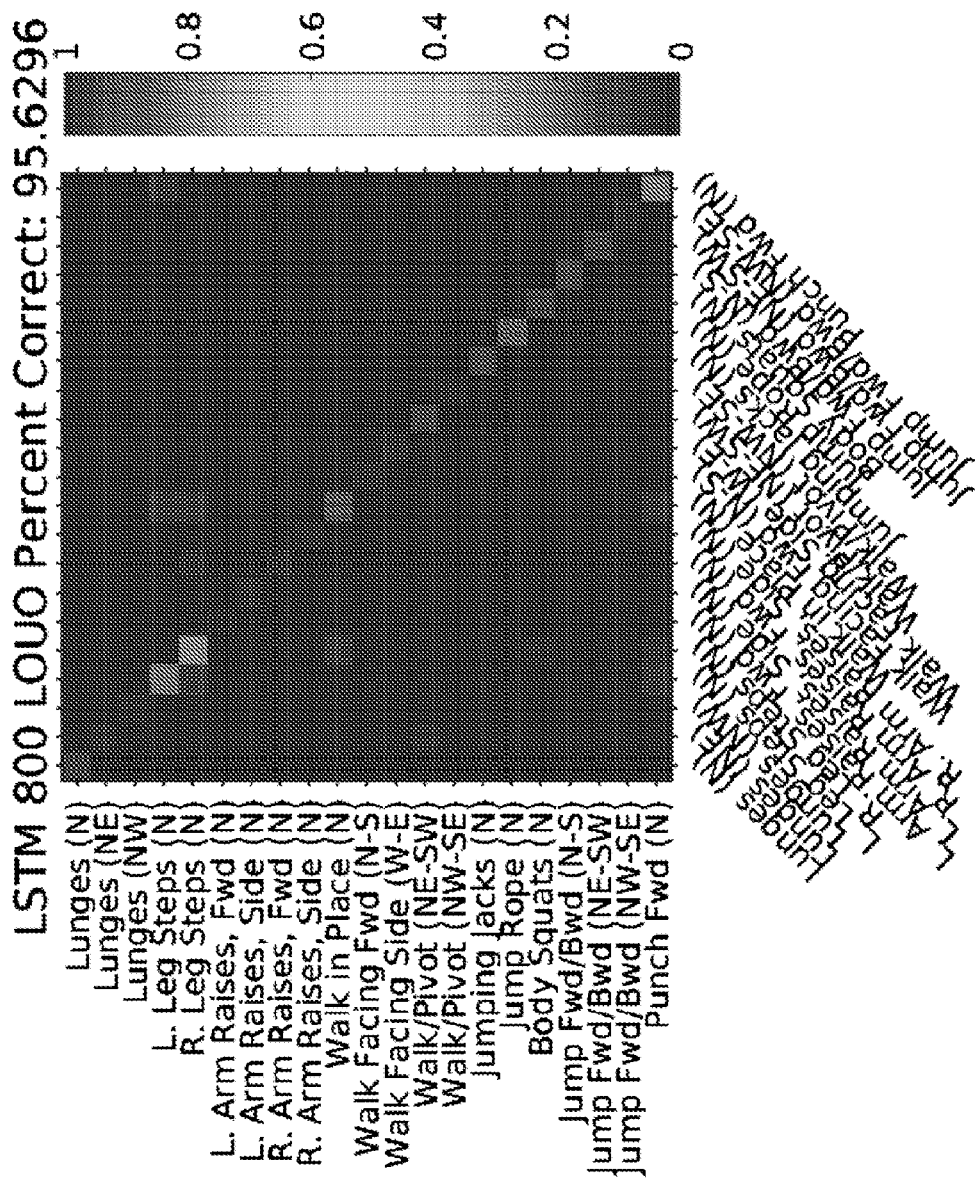
FIG. 38: Confusion matrix for LSTM with two 800 hidden node layers.
Figure 39:
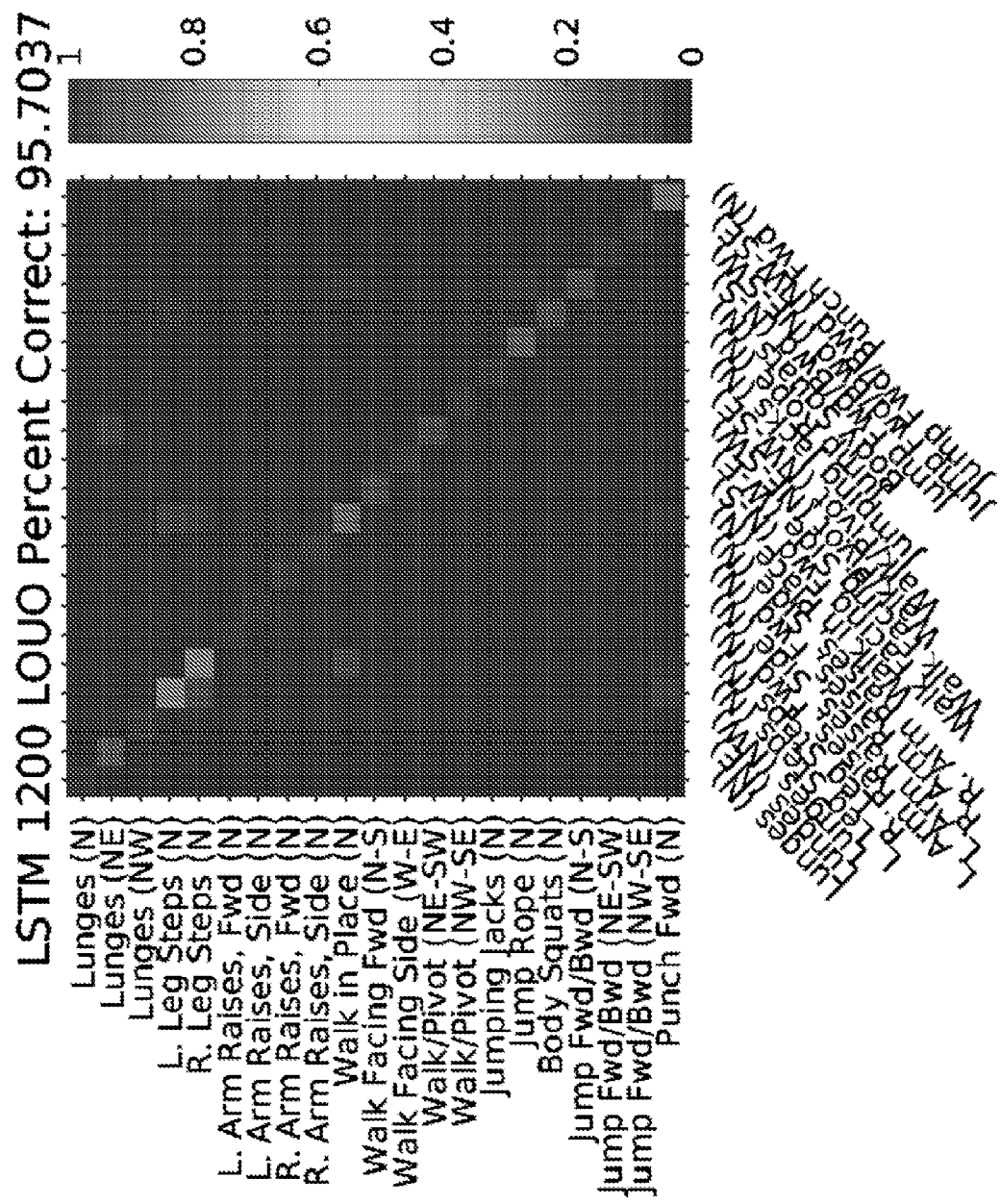
FIG. 39: Confusion matrix for LSTM with one 1200 hidden node layer.

Confusion matrices for the classification systems are shown in FIG. 38 and FIG. 39. The LOUO cross validation scheme resulted in lower overall classification accuracies. The baseline POE HMM model performed substantially worse, achieving a classification accuracy of 67.963%. However, the stacked HMM model still performed relatively well achieving an accuracy of 89.0%. Again, the LSTM classifiers outperformed the HMM classifiers, with the one layer LSTM 1200 model achieving a slightly higher accuracy of 95.7037%.

V. Conclusions

Based on the present embodiment, one having skill in the art will understand that recurrent neural networks, and in particular, the long short-term memory model, are suitable for application in action recognition using micro-Doppler signatures. The exemplary LSTM classifiers used in this embodiment outperformed HMM based classifiers by substantial margins. Furthermore, the exemplary LSTM classifiers were trained without using the Kinect data required by the tested HMM models. In addition, we have found that embodiments of a single classifier using a concatenation of data from each sensor may outperform a product-of-experts-based model. We believe this gain in performance is due to the coupling of the lateral and forward-backward motion captured by the concatenated data. A product-of-experts test model trained on separate sensors was unable to correctly capture the correlations between orthogonal dimensions present in diagonal motion.

Although the present disclosure has been described with respect to one or more particular embodiments, it will be understood that other embodiments of the present disclosure may be made without departing from the spirit and scope of the present disclosure.

What is claimed is:

1. A system for action recognition of sensed motion, comprising:
   a first micro-Doppler sensor configured to produce a spectrogram of a sensed motion;
   a splitter configured to receive the spectrogram from the first micro-Doppler sensor and segment the spectrogram into a sequence of spectrogram slices, each spectrogram slice of the sequence of spectrogram slices having a pre-determined time period;
   an artificial neural network ("ANN") for classifying sensed motion, the ANN comprising a recognition layer configured to receive the sequence of spectrogram slices from the splitter as an input vector.

2. The system of claim 1, wherein the ANN is a recurrent neural network ("RNN").

3. The system of claim 2, wherein the recognition layer comprises a plurality of hidden Markov models ("HMM"), each HMM corresponding to a hidden sequence of skeletal poses and a visible sequence of spectrogram slice prototypes.

4. The system of claim 3, wherein the recognition layer further comprises a Viterbi module configured to receive a plurality of spectrogram slice prototypes and to find a most likely sequence of skeletal pose prototypes.

5. The system of claim 2, wherein the recognition layer comprises one or more long short-term memory layers.

6. The system of claim 1, wherein the ANN is a convolutional deep belief network ("CDBN").

7. The system of claim 1, wherein the micro-Doppler sensor is an ultrasound sensor.

8. The system of claim 1, further comprising one or more additional micro-Doppler sensors, each additional micro-Doppler sensor configured to produce a spectrogram of the sensed motion.

9. The system of claim 8, wherein the splitter is further configured to concatenate the spectrograms from the first micro-Doppler sensor and the one or more additional micro-Doppler sensors; and wherein the recognition layer is configured to receive the concatenated spectrograms as the input vector.

10. The system of claim 8, further comprising one or more additional ANNs, each ANN corresponding to an additional micro-Doppler sensor of the one or more additional micro-Doppler sensors and having a recognition layer configured to receive a plurality of spectrogram slices as an input vector.

11. The system of claim 1, further comprising a motion sensor configured to produce RGB-D data of a sensed motion, and where the input vector further comprises a sequence of RGB-D data.

12. A method for action recognition of sensed motion, comprising:
   capturing a spectrogram of a sensed motion using a micro-Doppler sensor;
   segmenting the captured spectrogram into a sequence of spectrogram slices, each spectrogram slice of the sequence of spectrogram slices having a pre-determined time period; and
   classifying the sequence of spectrogram slices as an action using an artificial neural network ("ANN") having a recognition layer configured to receive the sequence of spectrogram slices as an input vector.

13. The method of claim 12, further comprising translating each spectrogram slice of the sequence of spectrogram slices into a spectrogram slice prototype based on the Euclidean distance between each spectrogram slice and each spectrogram slice prototype.

14. The method of claim 13, wherein the recognition layer comprises a plurality of hidden Markov models ("HMM"), each HMM corresponding to a hidden sequence of skeletal poses and a visible sequence of spectrogram slice prototypes; and classifying the sequence of spectrogram slices further comprises:
   computing, using each HMM, a most likely sequence of hidden skeletal poses;
   computing a log-likelihood of each of the most likely sequences of hidden sequence of skeletal poses and the visible sequence of spectrogram slice prototypes; and
   selecting the action based on the computed log-likelihoods.

15. The method of claim 14, wherein a Viterbi algorithm is used to compute a maximum a posteriori (MAP) estimate.

16. The method of claim 12, further comprising capturing additional spectrograms of the sensed motion using additional micro-Doppler sensors.

17. The method of claim 16, further comprising concatenating the spectrogram and the additional spectrograms.

* * * * *